(12) United States Patent
Kondo

(10) Patent No.: US 7,814,509 B2
(45) Date of Patent: Oct. 12, 2010

(54) RECEIVING APPARATUS, RECEIVING METHOD, STORAGE MEDIUM, AND PROGRAM

(75) Inventor: Tetsujiro Kondo, Tokyo (JP)

(73) Assignee: Sony Corporation (JP)

( * ) Notice: Subject to any disclaimer, the term of this patent is extended or adjusted under 35 U.S.C. 154(b) by 1227 days.

(21) Appl. No.: 10/935,872

(22) Filed: Sep. 8, 2004

(65) Prior Publication Data

US 2005/0091680 A1    Apr. 28, 2005

(30) Foreign Application Priority Data

Sep. 8, 2003    (JP)    ............................. P2003-315455

(51) Int. Cl.
*H04N 7/16*    (2006.01)
(52) U.S. Cl. .............................. 725/12; 725/10; 725/37; 725/46; 725/85
(58) Field of Classification Search .................. 725/12, 725/10, 46, 37
See application file for complete search history.

(56) References Cited

U.S. PATENT DOCUMENTS

| | | | | |
|---|---|---|---|---|
| 4,672,437 | A * | 6/1987 | Casper | 348/126 |
| 6,057,885 | A * | 5/2000 | Horishi et al. | 348/450 |
| 6,813,775 | B1 * | 11/2004 | Finseth et al. | 725/46 |
| 7,324,742 | B2 * | 1/2008 | Miyazaki | 386/131 |
| 2002/0036717 | A1 * | 3/2002 | Abiko et al. | 348/700 |
| 2002/0126120 | A1 * | 9/2002 | Snowdon et al. | 345/440 |
| 2003/0007090 | A1 * | 1/2003 | Miyazaki | 348/441 |
| 2003/0061059 | A1 * | 3/2003 | Ghela | 705/1 |
| 2003/0078966 | A1 * | 4/2003 | Kinjo | 709/203 |
| 2005/0055472 | A1 * | 3/2005 | Krzyzanowski et al. | 710/5 |

FOREIGN PATENT DOCUMENTS

| | | |
|---|---|---|
| JP | 6-046479 A | 2/1994 |
| JP | 7-095475 A | 4/1995 |
| JP | 10-313445 A | 11/1998 |
| JP | 11-355731 A | 12/1999 |
| JP | 2000-122767 A | 4/2000 |
| JP | 2000-165769 A | 6/2000 |
| JP | 2000-172394 A | 6/2000 |
| JP | 2000-341596 A | 12/2000 |
| JP | 2001-090356 A | 4/2001 |
| JP | 2001-333030 A | 11/2001 |
| JP | 2002-290765 A | 10/2002 |
| JP | 2002-290848 A | 10/2002 |
| JP | 2002-325215 A | 11/2002 |
| JP | 2003-219287 A | 7/2003 |

* cited by examiner

*Primary Examiner*—Joseph P Hirl
*Assistant Examiner*—Jivka Rabovianski
(74) *Attorney, Agent, or Firm*—Lerner, David, Littenberg, Krumholz & Mentlik, LLP

(57) ABSTRACT

A receiving apparatus receives a broadcast program in a manner convenient for users depending on the content of the broadcast program. A tuner selects a broadcast program that matches the preference of users of respective rooms in a building in which the receiving apparatus is installed on the basis of preference information stored in a memory. Sensors disposed in the respective rooms detect whether the users are present in the respective rooms. A controller controls selectors so as to select displays and speakers located in rooms in which users are present so that the users in the respective rooms can view and/or listen to the program. The receiving apparatus may be applied to a television set or the like.

24 Claims, 32 Drawing Sheets

FIG. 3A

| GENRE | RESIDENT | PRIORITY |
|---|---|---|
| SPORTS (GENERAL) | Mr/Ms A, Mr/Ms B, Mr/Ms C | 4 |
| SOCCER | Mr/Ms A, Mr/Ms B | 2 |
| THE MAJORS | Mr/Ms A, Mr/Ms C | 3 |
| ANIMATIONS | Mr/Ms D, Mr/Ms E | 5 |
| NEWS (GENERAL) | Mr/Ms D | 1 |
| DRAMAS | Mr/Ms C, Mr/Ms E | 6 |

FIG. 3B

| RESIDENT | ROOM | DISPLAY | SENSOR |
|---|---|---|---|
| Mr/Ms A | ROOM #1 | DISPLAY #1, SP1 | SENSOR #1 |
| Mr/Ms B | ROOM #2 | DISPLAY #2, SP2 | SENSOR #2 |
| Mr/Ms C | ROOM #3 | DISPLAY #3, SP3 | SENSOR #3 |
| Mr/Ms D | ROOM #4 | DISPLAY #4, SP4 | SENSOR #4 |
| Mr/Ms E | ROOM #5 | DISPLAY #5, SP5 | SENSOR #5 |

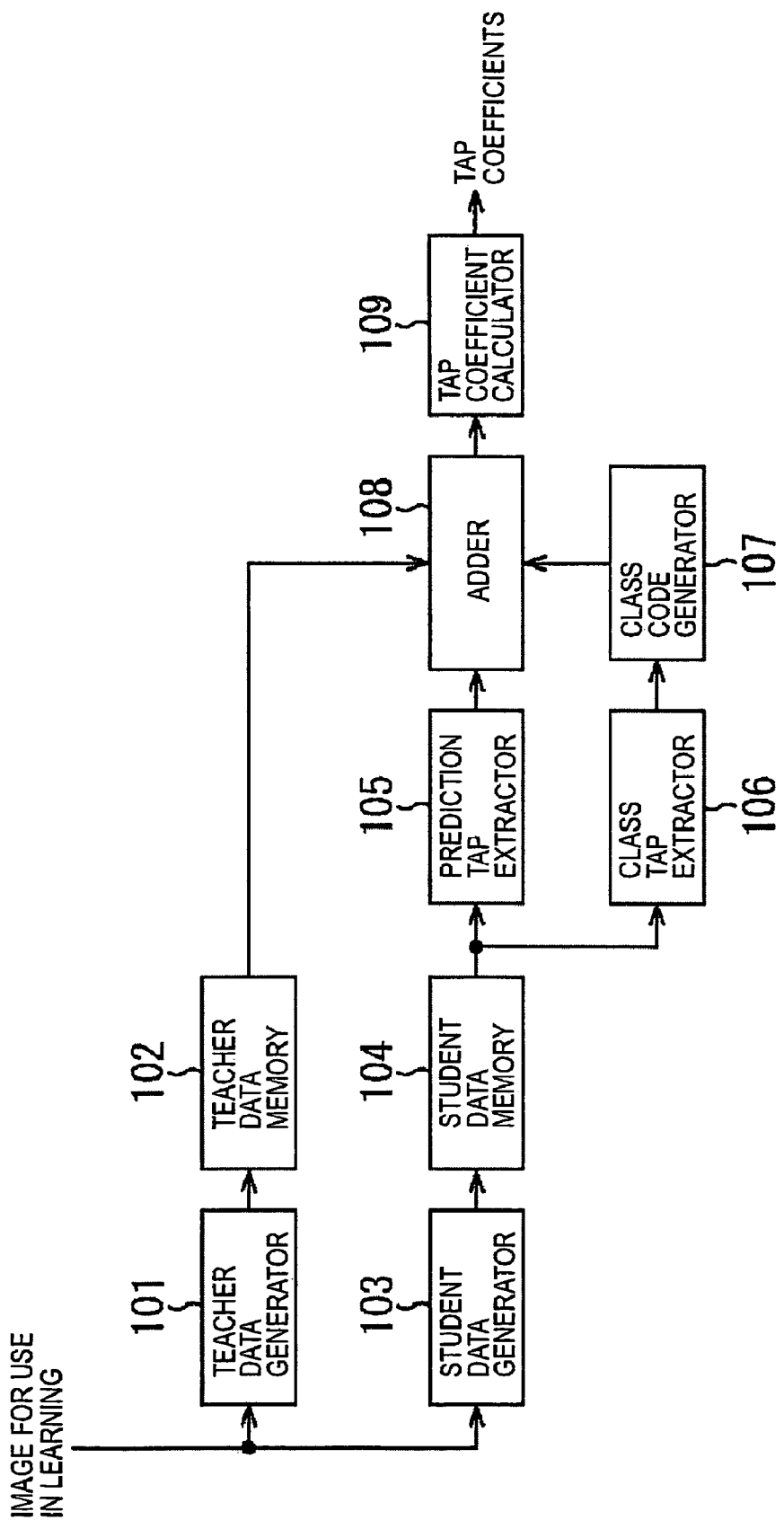

FIG. 23

| RESIDENT | PATTERN INFORMATION |
|---|---|
| Mr/Ms A | PATTERN INFORMATION A |
| Mr/Ms B | PATTERN INFORMATION B |
| Mr/Ms C | PATTERN INFORMATION C |
| Mr/Ms D | PATTERN INFORMATION D |
| Mr/Ms E | PATTERN INFORMATION E |

RECEIVING APPARATUS, RECEIVING METHOD, STORAGE MEDIUM, AND PROGRAM

CROSS-REFERENCE TO RELATED APPLICATIONS

The present invention claims priority from Japanese Application No. 2003-315455 filed Sep. 8, 2003, the disclosure of which is hereby incorporated by reference herein.

BACKGROUND OF THE INVENTION

The present invention relates to a receiving apparatus, a receiving method, a storage medium, and a program, and particularly to a receiving apparatus, a receiving method, a storage medium, and a program which allow a user to view broadcast programs in a convenient manner depending on the features of a building and depending on the contents of broadcast programs received by a receiving apparatus installed in the building.

A receiving apparatus is known which receives a broadcast signal, such as a ground-based analog broadcast signal, a BS (Broadcasting Satellite) broadcast signal, a CS (Communication Satellite) digital broadcast signal, or a ground-based digital broadcast signal, and outputs video data and audio data of the received broadcast signal to a display or a speaker connected to the receiving apparatus. Such a receiving apparatus is used, for example, in a television set. In other words, a television set is constructed by combining such a receiving apparatus, a display, and a speaker in an integrated fashion.

If a user operates a dedicated remote commander (also called a remote controller), an operation command is transmitted to the receiving apparatus. The receiving apparatus selects a channel in accordance with the command received from the remote commander, and outputs a video signal and an audio signal of a broadcast program of the selected channel to the display or the speaker. Thus, the user can watch the program of the selected channel.

In digital broadcasting which is becoming increasingly popular, a very large number of channels are available. However, the operation of selecting a desired channel from such a large number of channels is a troublesome job for users.

To make it easier for a user to select a channel in a digital broadcast receiving apparatus, it has been proposed to register a set of favorite channels (Japanese Unexamined Patent Application Publication No. 2000-165769).

It is also known to build a virtual channel which presents only particular programs specified by a user so that the user can receive desired programs without having to perform a channel selection operation (Japanese Unexamined Patent Application Publication No. 2000-341596).

The conventional techniques described above are intended to improve the operability in selecting a channel in a receiving apparatus such as that used in a television set or the like.

The receiving apparatus and the television set using such a receiving apparatus are usually used inside a house or a building.

However, no technique is known which allows a receiving apparatus to be used in a manner adapted to features of a house or a building where the receiving apparatus is installed. For example, when a plurality of users reside in a single house or building, each user mainly uses his/her room almost exclusively. In this case, the receiving apparatus installed in each room can be adjusted depending on the preference of the user of the room such that particular channels can be easily selected.

No technique is known to drive (control) a facility in a house or a building depending on the content of a broadcast signal received by a receiving apparatus installed in the house or the building. It is known to automatically open and close a door or a window of a house. However, the purpose is simply to reduce the job performed by a user, and the opening/closing of the door or the window is not related to the receiving apparatus installed in the house.

SUMMARY OF THE INVENTION

In view of the above, it is an object of the present invention to make it possible to view and/or listen to a broadcast program in a manner well adapted to features of a house/building depending on the content of the broadcast program received by the receiving apparatus.

In one aspect hereof, the present invention provides a receiving apparatus for receiving a broadcast program signal, including a storage unit operable to store user preference information indicating a preference of a plurality of users in terms of genres of broadcast programs; a channel selection unit operable to select a particular channel from among a plurality of channels based on the user preference information stored in the storage unit; a detection unit operable to detect whether a user who likes the genre of a program of the selected channel is present in a room of the detected user; and a display selection unit operable to select, from among a plurality of program display units disposed respectively in a plurality of rooms, a program display unit disposed in the room of the detected user, and to display the program of the selected channel on the selected program display unit.

The receiving apparatus according to the present invention may further include an other-user-image display unit operable to display an image of at least one other user such that when the detection unit detects a user's presence in rooms for a plurality of users who like the genre of the program of the selected channel, an image of the at least one other user viewing the program in the room of the at least one other user is displayed in a room other than the room of the at least one other user.

The receiving apparatus according to the present invention may further include an other-user-image taking unit operable to take the image of the at least one other user viewing the program.

In the receiving apparatus according to the present invention, the other-user-image display unit may include an image modification unit operable to modify the image of the at least one other user viewing the program.

The receiving apparatus according to the present invention may further include an other-user-image display control unit operable to control whether to display, in the room other than the room of the at least one other user, the image of the at least one other user viewing the program.

The receiving apparatus according to the present invention may further include a video signal conversion unit operable to convert a video signal of the program of the selected channel into a high-quality video signal.

In the receiving apparatus according to the present invention, the user preference information may include program genres; and the video signal conversion unit may include a classification unit operable to classify the video signal of the program of the selected channel; a coefficient storage unit operable to store prediction coefficients obtained by means of learning for each class assigned to each genre; and a calculation unit operable to generate the high-quality video signal by means of calculation based on prediction coefficients corresponding to a genre of a class output by the classification unit and also based on the video signal of the program of the selected channel.

In the receiving apparatus according to the present invention, the storage unit may store, as the user preference information, favorite genres of the plurality of users and priorities assigned to respective ones of the favorite genres; and when a plurality of programs whose genre matches the user preference are detected at the same time, the channel selection unit may select a channel of a program of a genre assigned a highest priority from among the genres of the detected plurality of programs.

The receiving apparatus according to the present invention may further include a driving unit operable to drive a wall such that when the detection unit detects that a plurality of users who like the program of the selected channel are present in their rooms, if the room of one of the plurality of users is located adjacent to the room of another one of the plurality of users, the driving unit drives a wall which is between the adjacent rooms.

The receiving apparatus according to the present invention may further include a driving control unit operable to turn the driving unit on and off.

The receiving apparatus according to the present invention may further include a recording unit operable to record a video signal and/or an audio signal on a storage medium, and when the detection unit detects that no users who like the program of the selected channel are present in their rooms, the recording unit may record the video signal and/or the audio signal of the program of the selected channel on the storage medium.

The receiving apparatus according to the present invention may further include a reproducing unit operable to reproduce the video signal and/or the audio signal recorded on the storage medium, and when the detection unit detects that the user is present in the room of the detected user, the display selection unit may select the program display unit disposed in the room of the detected user and may display the video signal and/or the audio signal of the program of the selected channel that is reproduced by the reproducing unit.

The receiving apparatus according to the present invention may further include a video signal conversion unit operable to convert the video signal of the program of the selected channel into a high-quality video signal, and the recording unit may record the high-quality video signal output by the video signal conversion unit on the storage medium.

In the receiving apparatus according to the present invention, the user preference information may include program genres; and the video signal conversion unit may include a classification unit operable to classify the video signal of the program of the selected channel; a coefficient storage unit operable to store prediction coefficients obtained by means of learning for each class assigned to each genre; and a calculation unit operable to generate the high-quality video signal by means of calculation based on prediction coefficients corresponding to a genre of a class output by the classification unit and also based on the video signal of the program of the selected channel.

The receiving apparatus according to the present invention may further include a first recording unit and a second recording unit operable to record a video signal and/or an audio signal on a storage medium, and when the program of the selected channel is of a genre that matches the preference of a plurality of users, if the detection unit detects that at least one of the plurality of users is not present in a room of the at least one user, then the first recording unit may record a video signal and/or an audio signal of the program of the selected channel on a first storage medium; and the second recording unit may record an image of the detected user who is viewing the program on a second storage medium.

The receiving apparatus according to the present invention may further include a video signal conversion unit operable to convert a video signal into a high-quality video signal, and when the detection unit detects that the user is present in the room of the detected user, the video signal conversion unit may convert a video signal of the image of the detected user who is viewing the program into the high-quality video signal; and the second recording unit may record the high-quality video signal output by the video signal conversion unit on the second storage medium.

The receiving apparatus according to the present invention may further include a first reproducing unit and a second reproducing unit operable to reproduce a video signal and/or an audio signal recorded on a storage medium, and if the detection unit detects that the at least one user has returned to the room of the at least one user, then the first reproducing unit may reproduce the video signal and/or the audio signal of the program of the selected channel from the first storage medium; the second reproducing unit may reproduce a video signal of the image of the detected user who is viewing the program from the second storage medium; the display selection unit may make a selection such that the program of the selected channel reproduced by the first reproducing unit is displayed on a program display unit disposed in the room of the at least one user; and the other-user-image display unit may display the image of the detected user who is viewing the program, reproduced by the second reproducing unit, such that the image is displayed in a room other than the room of the detected user.

The receiving apparatus according to the present invention may further include a video signal conversion unit operable to convert a video signal into a high-quality video signal, and the video signal conversion unit may convert the video signal of the program of the selected channel reproduced by the first reproducing unit into a high-quality video signal.

The receiving apparatus according to the present invention may further include a video signal conversion unit operable to convert a video signal into a high-quality video signal, and the video signal conversion unit may convert the video signal of the image of the detected user who is viewing the program, reproduced by the second reproducing unit, into a high-quality video signal.

In the receiving apparatus according to the present invention, if the detection unit detects that the at least one user has returned to the room of the at least one user, then, after an elapse of a predetermined period of time since the detection of the return of the at least one user, the first reproducing unit may reproduce the video signal and/or the audio signal of the program of the selected channel from the first storage medium; the second reproducing unit may reproduce a video signal of the image of the detected user who is viewing the program from the second storage medium; the display selection unit may make a selection such that the program of the selected channel reproduced by the first reproducing unit is displayed on a program display unit disposed in the room of the at least one user; and the other-user-image display unit may display the image of the detected user who is viewing the program, reproduced by the second reproducing unit, such that the image is displayed in a room other than the room of the detected user.

In the receiving apparatus according to the present invention, the storage unit may further store identification information identifying each user; and the detection unit may identify the plurality of users on the basis of the identification information and may detect in which room of a plurality of rooms a user is present who likes a program of the selected channel.

In another aspect hereof, the present invention provides a method of receiving a broadcast program signal, including selecting a particular channel from among a plurality of channels based on stored user preference information indicating a preference of a plurality of users in terms of program genres; detecting whether a user who likes the genre of a program of the selected channel is present in a space of the detected user; and selecting, from among a plurality of program display units disposed respectively in a plurality of spaces, a program display unit disposed in the space of the detected user, and displaying the program of the selected channel on the selected program display unit.

In yet another aspect hereof, the present invention provides a storage medium recorded with a program for processing a broadcast program signal, the program including selecting a particular channel from among a plurality of channels based on stored user preference information indicating a preference of a plurality of users in terms of program genres; detecting whether a user who likes the genre of a program of the selected channel is present in a space of the detected user; and selecting, from among a plurality of program display units disposed respectively in a plurality of spaces, a program display unit disposed in the space of the detected user, and displaying the program of the selected channel on the selected program display unit.

In still another aspect hereof, the present invention provides a system for receiving a broadcast program signal, including a processor operable to execute instructions; and instructions, the instructions including select a particular channel from among a plurality of channels based on stored user preference information indicating a preference of a plurality of users in terms of program genres; detect whether a user who likes the genre of a program of the selected channel is present in a space of the detected user; and select, from among a plurality of program display units disposed respectively in a plurality of spaces, a program display unit disposed in the space of the detected user, and display the program of the selected channel on the selected program display unit.

In a further aspect of the present invention, a receiving apparatus is provided, including storage means for storing user preference information indicating a preference of a plurality of users in terms of genres of broadcast programs; channel selection means for selecting a particular channel from among a plurality of channels based on the user preference information stored in the storage means; detection means for detecting whether a user who likes the genre of a program of the selected channel is present in a room of the detected user; and display selection means for selecting, from among a plurality of program display means disposed respectively in a plurality of rooms, program display means disposed in the room of the detected user, and for displaying the program of the selected channel on the selected program display means.

In yet a further aspect hereof, the present invention provides a receiving apparatus for receiving a broadcast program signal, including storage means for storing user preference information indicating a preference of a plurality of users in terms of genres of broadcast programs; channel selection means for selecting a particular channel from among a plurality of channels based on the user preference information stored in the storage means; detection means for detecting in which room of a plurality of rooms a user is present who likes a program of the selected channel; and display selection means for selecting, from among a plurality of program display means disposed respectively in the plurality of rooms, program display means disposed in the room of the detected user, and for displaying the program of the selected channel on the selected program display means.

In a still further aspect hereof, the present invention provides a method of receiving a broadcast program signal, including selecting a particular channel from among a plurality of channels based on stored user preference information indicating a preference of a plurality of users in terms of program genres; detecting in which space of a plurality of spaces a user is present who likes a program of the selected channel; and selecting, from among a plurality of program display units disposed respectively in a plurality of spaces, a program display unit disposed in the space of the detected user, and displaying the program of the selected channel on the selected program display unit.

In another aspect of the present invention, a storage medium is recorded with a computer-readable program for processing a broadcast program signal, the program including selecting a particular channel from among a plurality of channels based on stored user preference information indicating a preference of a plurality of users in terms of program genres; detecting in which space of a plurality of spaces a user is present who likes a program of the selected channel; and selecting, from among a plurality of program display units disposed respectively in a plurality of spaces, a program display unit disposed in the space of the detected user, and displaying the program of the selected channel on the selected program display unit.

In still a further aspect of the present invention, a system is provided for receiving a broadcast program signal. The system includes a processor operable to execute instructions; and instructions, the instructions including select a particular channel from among a plurality of channels based on stored user preference information indicating a preference of a plurality of users in terms of program genres; detect in which space of a plurality of spaces a user is present who likes a program of the selected channel; and select, from among a plurality of program display units disposed respectively in a plurality of spaces, a program display unit disposed in the space of the detected user, and display the program of the selected channel on the selected program display unit.

In yet another aspect hereof, the present invention provides a receiving apparatus for receiving a broadcast program signal, including a storage unit operable to store user preference information indicating a preference of a plurality of users in terms of genres of broadcast programs; a channel selection unit operable to select a particular channel from among a plurality of channels based on the user preference information stored in the storage unit; a detection unit operable to detect in which room of a plurality of rooms a user is present who likes a program of the selected channel; and a display selection unit operable to select, from among a plurality of program display units disposed respectively in the plurality of rooms, a program display unit disposed in the room of the detected user, and to display the program of the selected channel on the selected program display unit.

In a further aspect hereof, the present invention provides a receiving apparatus for receiving a broadcast program signal, including channel selection means for selecting a particular channel from among a plurality of channels; detection means for detecting whether a user is present in a room of the user; keyword storage means for storing at least one particular keyword; matching judgment means for determining whether a voice signal of the selected channel includes a word identical to one of the keywords stored in the keyword storage means; and display selection means for selecting, from among a plurality of program display means disposed respectively in a plurality of rooms, program display means disposed in the room of the detected user, and for displaying a program that matches the preference of the user in terms of program genres on the selected program display means.

The receiving apparatus according to this aspect of the present invention may further include facility control means for controlling a facility of a building in which the receiving apparatus is installed depending on the judgment made by the matching judgment means.

In still another aspect hereof, the present invention provides a method of receiving a broadcast program signal, including selecting a particular channel from among a plurality of channels; detecting whether a user is present in a space of the user; determining whether a voice signal of the selected channel includes a word identical to at least one stored keyword; and selecting, from among a plurality of program display units disposed respectively in a plurality of spaces, a program display unit disposed in the space of the detected user, and displaying a program that matches the preference of the user in terms of program genres on the selected program display unit.

In a further aspect hereof, the present invention provides a storage medium recorded with a computer-readable program for processing a broadcast program signal, the program including selecting a particular channel from among a plurality of channels; detecting whether a user is present in a space of the user; determining whether a voice signal of the selected channel includes a word identical to at least one stored keyword; and selecting, from among a plurality of program display units disposed respectively in a plurality of spaces, a program display unit disposed in the space of the detected user, and displaying a program that matches the preference of the user in terms of program genres on the selected program display unit.

In yet a further aspect hereof, the present invention provides a system for receiving a broadcast program signal, including a processor operable to execute instructions; and instructions, the instructions including select a particular channel from among a plurality of channels; detect whether a user is present in a space of the user; determine whether a voice signal of the selected channel includes a word identical to at least one stored keyword; and select, from among a plurality of program display units disposed respectively in a plurality of spaces, a program display unit disposed in the space of the detected user, and display a program that matches the preference of the detected user in terms of program genres on the selected program display unit.

In still another aspect hereof, the present invention provides a receiving apparatus for receiving a broadcast program signal, including a channel selection unit operable to select a particular channel from among a plurality of channels; a detection unit operable to detect whether a user is present in a room of the user; a keyword storage unit operable to store at least one particular keyword; a matching judgment unit operable to determine whether a voice signal of the selected channel includes a word identical to one of the keywords stored in the keyword storage unit; and a display selection unit operable to select, from among a plurality of program display units disposed respectively in a plurality of rooms, a program display unit disposed in the room of the detected user, and to display a program that matches the preference of the detected user in terms of program genres on the selected program display unit.

Note that the receiving apparatus may be in the form of an independent apparatus or a block disposed in an apparatus and serving to perform a receiving process.

BRIEF DESCRIPTION OF THE DRAWINGS

FIGS. 3A and 3B are diagrams showing data stored in a memory shown in FIG. 2;

FIG. 6 is a block diagram showing an example of the structure of a learning apparatus for learning tap coefficients;

FIG. 23 is a diagram showing data stored in a memory shown in FIG. 22;

DETAILED DESCRIPTION

Figure 1:
FIG. 1 is a perspective view of a house system according to the present invention.

FIG. 1 shows a house system (note that the term "system" is used in the present description to represent a logical collection of a plurality of objects wherein the objects do not necessarily need to be located in a single housing) according to the present invention.

In the house system shown in FIG. 1, broadcast signals such as television program broadcast signals transmitted in the form of radio waves from broadcast stations are received. Users residing in the house system can enjoy broadcast programs (hereinafter, referred to simply as programs unless necessary to distinguish broadcast programs from computer programs) in their rooms (not shown) in a building.

Herein, by way of example, five users reside in the house system shown in FIG. 1 (note that there is no particular restriction on the number of residents). The five users are denoted as a user A, a user B, a user C, a user D, and a user E.

Figure 2:
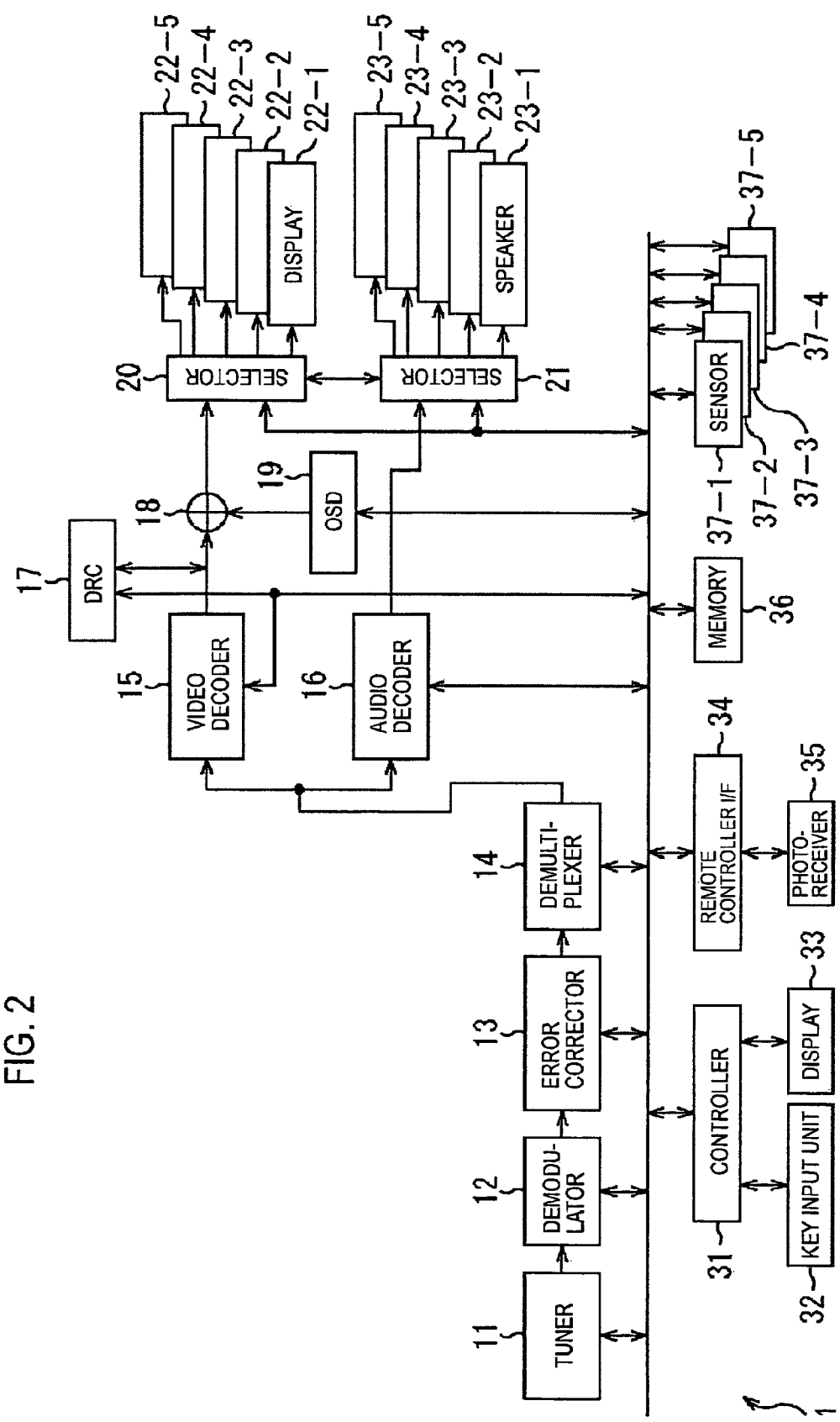
FIG. 2 is a block diagram showing a receiving apparatus according to a first embodiment of the present invention.

FIG. 2 is a block diagram of a receiving apparatus 1 according to a first embodiment, installed in the building of the house system shown in FIG. 1.

A digital broadcast signal is received by an antenna (not shown) and supplied to a tuner 11. The digital broadcast signal is digital data according to, for example, the MPEG (Motion Picture Experts Group)-2 standard and is transmitted in the form of a transport stream (TS) including a plurality of TS packets. Under the control of the controller 31, the tuner 11 selects a broadcast signal of a particular channel (frequency) from a plurality of broadcast channels received via the antenna, and supplies the broadcast signal of the selected channel to a demodulator 12.

User preference information indicating the preference in terms of genres of broadcast programs for each of the five users A to E is stored in the form a correspondence table (favorite genre table) in a memory 36 that will be described later. Data indicating priorities assigned to respective genres is also stored in the memory 36. The controller 31 controls the tuner 11 to select a channel which is broadcasting a program of a genre that meets the user's preference described in the user preference information stored in the memory 36. That is, the tuner 11 selects a particular channel from a plurality of channels supplied from the antenna based on the user preference information stored in the memory 36.

When a plurality of programs of different genres included in the favorite genre table are being broadcast at the same time, the controller 31 controls the tuner 11 according to priority information, stored in the memory 36, indicating priorities assigned to the respective genres so that a channel is selected which is broadcasting a program of a genre assigned the highest priority among the genres of programs being broadcast.

The controller 31 can detect channels and programs which meet a user's preference in terms of genres, for example, from an EPG (Electronic Program Guide).

Under the control of the controller 31, the demodulator 12 demodulates the transport stream of the broadcast signal of the selected channel supplied from the tuner 11 by means of QPSK (Quadrature Phase Shift Keying) demodulation or the like, and supplies the resultant transport stream to an error correction unit 13.

Under the control of the controller 31, the error correction unit 13 detects and corrects errors in the transport stream supplied from the demodulator 12. After completion of the error correction, the resultant transport stream is supplied to a demultiplexer 14.

Under the control of the controller 31, the demultiplexer 14 descrambles, if needed, the transport stream supplied from the error correction unit 13. Under the control of the controller 31, the demultiplexer 14 examines PIDs (Packet Identifiers) of TS packets and extracts TS packets carrying a program that meets the user's preference in terms of genres from the transport stream supplied from the error correction unit 13.

The demultiplexer 14 supplies video data of TS packets of the program of the genre preferred by the user to the video decoder 15 and supplies audio data of the TS packets to the audio decoder 16.

The video decoder 15 performs MPEG-2 decoding on the video data received from the demultiplexer 14, and supplies the resultant data to a DRC (Digital Reality Creation) unit 17 and a mixer 18.

The audio decoder 16 performs MPEG-2 decoding on the audio data received from the demultiplexer 14, and supplies the resultant data to the selector 21.

The DRC unit 17 employs the video signal (video data) output from the video decoder 15 as a first video signal, and the DRC unit 17 converts the first video signal into a second video signal in the form of a high-quality video signal (video data). The DRC unit 17 supplies (outputs) the resultant high-quality video signal (video data) to the mixer 18. Herein, the high-quality video signal (video data) refers to a video signal (video data) with an improved high resolution.

When video data is supplied to the mixer 18 from the DRC unit 17, the mixer 18 selects the supplied video data. On the other hand, when no video data is supplied from the DRC unit 17, the mixer 18 selects video data supplied from the video decoder 15. The mixer 18 superimposes the video data supplied from an OSD (On Screen Display) unit 19 on the selected video data supplied from the video decoder 15 or the DRC unit 17, and the mixer 18 supplies the resultant video data to a selector 20. In a case in which no video data is supplied from the OSD unit 19, the mixer 18 directly supplies, to the selector 20, the video data selected from those supplied from the video decoder 15 and the DRC unit 17.

Under the control of the controller 31, the OSD unit 19 generates video data indicating, for example, the channel number of the currently selected channel, a volume level, etc., and supplies the generated video data to the mixer 18.

Under the control of the controller 31, the selector 20 selects a display to which to supply the video data received from the mixer 18 from among displays 22-1 to 22-5. The selector 20 supplies the video data received from the mixer 18 to the display selected from among the displays 22-1 to 22-5. The selector 20 may select a plurality of displays from among the displays 22-1 to 22-5 and may supply video data to the selected displays.

The displays 22-1 to 22-5 are installed in respective rooms #1 to #5 of the house system shown in FIG. 1. On receiving the video data from the selector 20, the display selected from among the displays 22-1 to 22-5 converts the video data, for example, into an NTSC (National Television System Committee) format, and displays an image according to the resultant video data. Hereinafter, when it is not necessary to distinguish displays 22-1 to 22-5 from each other, a generic representation "display 22" will be used.

As for the display 22, a flat display panel such as an LCD (Liquid Crystal Display) or a PDP (Plasma Display Panel) can be used. When a display of the flat panel type is used as the display 22, the display 22 may be embedded in a wall of a room of the house system shown in FIG. 1. Alternatively, a projector may be used as the display 22. In this case, one or more walls are used as a screen.

Under the control of the controller 31, the selector 21 selects a speaker from among the speakers 23-1 to 23-5 by which to output the audio data supplied from the audio decoder 16. The selector 21 supplies the audio data received from the audio decoder 16 to the speaker selected from among the speakers 23-1 to 23-5. The selector 21 may select a plurality of speakers from among the speakers 23-1 to 23-5 and may supply audio data to the selected speakers.

Speakers 23-1 to 23-5 are installed in the respective rooms #1 to #5 of the house system shown in FIG. 1. On receiving the audio data from the selector 21, the speaker selected from the speakers 23-1 to 23-5 converts the received audio data into analog form and outputs a voice/sound. Hereinafter, when it is not necessary to distinguish speakers 23-1 to 23-5 from each other, a generic representation "display 23" will be used.

Each speaker 23 may be installed in a form integrated with a corresponding display 22 or may be installed separately such that the speaker is embedded in a wall or the floor of a room of the house system shown in FIG. 1.

The controller 31 performs various processes in accordance with a program stored in the memory 36. In those various processes, the controller 31 controls various parts such as the tuner 11, the demodulator 12, the error correction unit 13, the demultiplexer 14, the video decoder 15, the audio decoder 16, the DRC unit 17, the OSD unit 19, the selector 20, and the selector 21. If a user inputs a command via the key input unit 32 or the remote controller interface 34, the controller 31 performs an operation in accordance with the given command.

As described above, the controller 31 controls the tuner 11 to select a channel which is broadcasting a program of a genre that meets the user's preference in terms of broadcast programs in accordance with the user preference information stored in the memory 36. When sensors 37-1 to 37-5, which will be described later, detect that some user is present in his/her room (#1 to #5), the controller 31 controls the selectors 20 and 21 to select the display 22 and the speaker installed in the room of the detected user.

The key input unit 32 includes switch buttons or the like. When a switch button is pressed by a user to select a particular channel or the like, a command corresponding to the operation performed by the user is output from the key input unit 32 and supplied to the controller 31. A display 33 displays information indicating, for example, an operation status of the receiving apparatus 1, in accordance with a control signal supplied from the controller 31. More specifically, for example, the display 33 displays the channel number of a channel selected by the tuner 11.

A remote controller interface 34 receives via a photoreceiver 35 an operation control signal corresponding to an operation performed by a user and transfers the received operation control signal to the controller 31. The photoreceiver 35 receives an operation control signal transmitted from a remote commander (not shown) in response to an operation performed by a user, and the photoreceiver 35 transfers the received operation control signal to the remote controller interface 34.

The memory 36 is realized by a hard disk, a semiconductor memory, or the like and is used to store a program executed by the controller 31 in various processes. Data used in the various processes is also stored in the memory 36. The program used by the controller 31 to perform various processes may be installed into the memory 36 via a network such as the Internet or a storage medium such as a magnetic disk (such as a floppy disk), an optical disk (such as a CD-ROM (Compact Disk-Read Only Memory) or a DVD (Digital Versatile Disk)), an magnetooptical disk (such as an MD (Mini-Disk)), or a semiconductor memory.

As described above, the user preference information indicating the preference in terms of genres of broadcast programs for each of the five users A to E is stored in the form a correspondence table in the memory 36. Data indicating priorities assigned to respective genres is also stored in the memory 36.

Data indicating the correspondence among the five users A to E, the rooms #1 to #5, the displays 22-1 to 22-5, the speakers 23-1 to 23-5, and the sensors 37-1 to 37-5 is also stored in the memory 36. More specifically, the memory 36 stores information indicating which room is, for example, of the user A and which display 22, speaker 23 and sensor 37 are installed in the room of the user A.

The details of data associated with the user preference information stored in the memory 36 will be described later with reference to FIGS. 3A and 3B.

The sensors 37-1 to 37-5 are disposed in the respective rooms #1 to #5 to detect whether a user is present in the respective rooms #1 to #5. When each of the sensors 37-1 to 37-5 detects that a user is present in his/her room (#1 to #5), the sensor supplies a detection signal indicating the presence of the user to the controller 31. As described later with reference to FIG. 3B, data indicating the correspondence between the users A to E and the rooms #1 to #5 is stored in the memory 36, and thus the controller 31 can determine in which room a user is present on the basis of the detection signal supplied from the sensors 37-1 to 37-5 and the correspondence, indicated by the data stored in the memory 36, among the users A to E, the sensors 37-1 to 37-5, and the rooms #1 to #5. As for the sensors 37-1 to 37-5, for example, a temperature sensor, an infrared sensor, or an ultrasonic sensor may be user. Hereinafter, when it is not necessary to distinguish sensors 37-1 to 37-5 from each other, the generic representation "sensor 37" will be used.

In the receiving apparatus 1 constructed in the above-described manner, an image and a voice/sound of a digital broadcast program are output from the displays 22-1 to 22-5 and speakers 23-1 to 23-5 in rooms #1 to #5 only when a user is present in his/her room, as described below.

The controller 31 detects a program of a genre meeting the preference of users in terms of program genres. The tuner 11 selects a digital broadcast signal of a channel of a program of the detected genre meeting the preference of users in terms of program genres from digital broadcast signals in the form of transport streams received via the antenna. The sensors 37-1 to 37-5 detect the presence of the users A to E to determine whether a user whose registered program genre preference is met by the genre of the program detected by the controller 31 is present in his/her room.

If it is determined that a user whose registered program genre preference is met by the genre of the program detected by the controller 31 is present in his/her room, the transport stream of the program detected by the controller 31 is supplied to the demultiplexer 14 via the demodulator 12 and the error correction unit 13.

The demultiplexer 14 supplies video data of TS packets of the subject program to the video decoder 15 and supplies audio data of the TS packets to the audio decoder 16.

The video decoder 15 performs MPEG-decoding on the video data of the TS packets supplied from the demultiplexer 14 and supplies the resultant video data to the DRC unit 17. The DRC unit 17 converts the received video data into high-quality video data and supplies the resultant high-quality video data to the selector 20.

The audio decoder 16 performs MPEG-decoding on the audio data of the TS packets supplied from the demultiplexer 14 and supplies the resultant MPEG-decoded audio data to the selector 21.

The selectors 20 and 21 select displays and speakers in rooms in which users, whose preference in terms of program genres registered in the memory 36 is met by the genre of the program detected by the controller 31, are detected to be present, from among the displays 22-1 to 22-5 and the speakers 23-1 to 23-5 installed in the respective rooms #1 to #5.

Thus, when a user who likes, as one of his/her favorite genres, the genre of a received program is present in his/her room, the video image and audio data of the program are output from the display 22 and the speaker 23 installed in his/her room. Note that when two or more users of the users A to E who like, as one of their favorite genres, the genre of the received program are present in their rooms, the video image and audio data of the program are output from the displays 22 and speakers 23 installed in their respective rooms.

FIGS. 3A and 3B show data, stored in the memory 36 shown in FIG. 2, associated with the users A to E.

In the example shown in FIG. 3A, the data stored (registered) in the memory 36 represents preference information indicating which program genres are favored by which ones of users A to E and also indicating priorities assigned to the respective program genres.

In the specific example shown in FIG. 3A, the program genres stored in the memory 36 include sports (general), soccer, the majors, animations, news (general), and dramas. That is, in the present embodiment, it is assumed that the program genres include sports (general), soccer, the majors, animations, news (general), and dramas.

Users A, B, and C are registered as favoring sports (general). Users A and B are registered as favoring soccer. Similarly, users A and C are registered as favoring the majors, users D and E as favoring animations, user D as favoring news (general), and users C and E as favoring dramas.

Furthermore, in the table stored in the memory 36, the highest priority is assigned to news (general), and the 2nd highest priority is assigned to soccer. Similarly, the majors, sports (general), animations, and dramas are assigned 3rd, 4th, 5th, and 6th priorities, respectively.

Thus, when a program of one of sports (general), soccer, the majors, animations, news (general), and dramas is detected by the tuner 11, the controller 31 can determine (recognize) which user likes the genre of the program on the basis of the table data shown in FIG. 3A.

When a plurality of programs of different genres included in the favorite genre table are being broadcast at the same time, the controller 31 controls the tuner 11 to select a program of a genre assigned a higher priority on the basis of the table data shown in FIG. 3A.

As shown in FIG. 3B, the data stored in the memory 36 also includes a table indicating the correspondence between the users A to E and the rooms #1 to #5, the displays 22-1 to 22-5 (displays #1 to #5), and the speakers 23-1 to 23-5 (speakers #1 to #5).

That is, the table indicates that the room of user A is room #1, and the display and the speaker installed in room #1 are display 22-1 and speaker 23-1. The table also indicates that the room of user B is room #2, and display 22-2 and speaker 23-2 are installed in this room. Similarly, the table indicates that the rooms of users C to E are rooms #3 to #5, respectively, and displays 22-3 to 22-5 and speakers 23-3 to 23-5 are installed in the respective rooms #3 to #5.

As shown in FIG. 3B, the table data stored in the memory 36 also indicates the correspondence between rooms #1 to #5 of respective users A to E and sensors 37-1 to 37-5 (sensors #1 to #5).

That is, the table data indicates that a sensor 37-1 is installed in room #1 of user A. The table data also indicates that a sensor 37-2 is installed in room #2 of user B. Similarly, the table data indicates that sensors 37-3 to 37-5 are installed in respective rooms #3 to #5 of users C to E.

Thus, after determining which user likes the genre of a program detected by the tuner 11 on the basis of the table data shown in FIG. 3A, the controller 31 determines, on the basis of the table data shown in FIG. 3B, which room is the user's and which sensor should be used to determine whether the user who likes the genre of the program detected by the tuner 11 is present in his/her room. On the basis of the table data shown in FIG. 3B, the controller 31 can also determine which display 22 and speaker 23 are installed in the detected room. Thus, the controller 31 can determine which display 22 and speaker 23 should be selected by the selectors 20 and 21.

Figure 4:
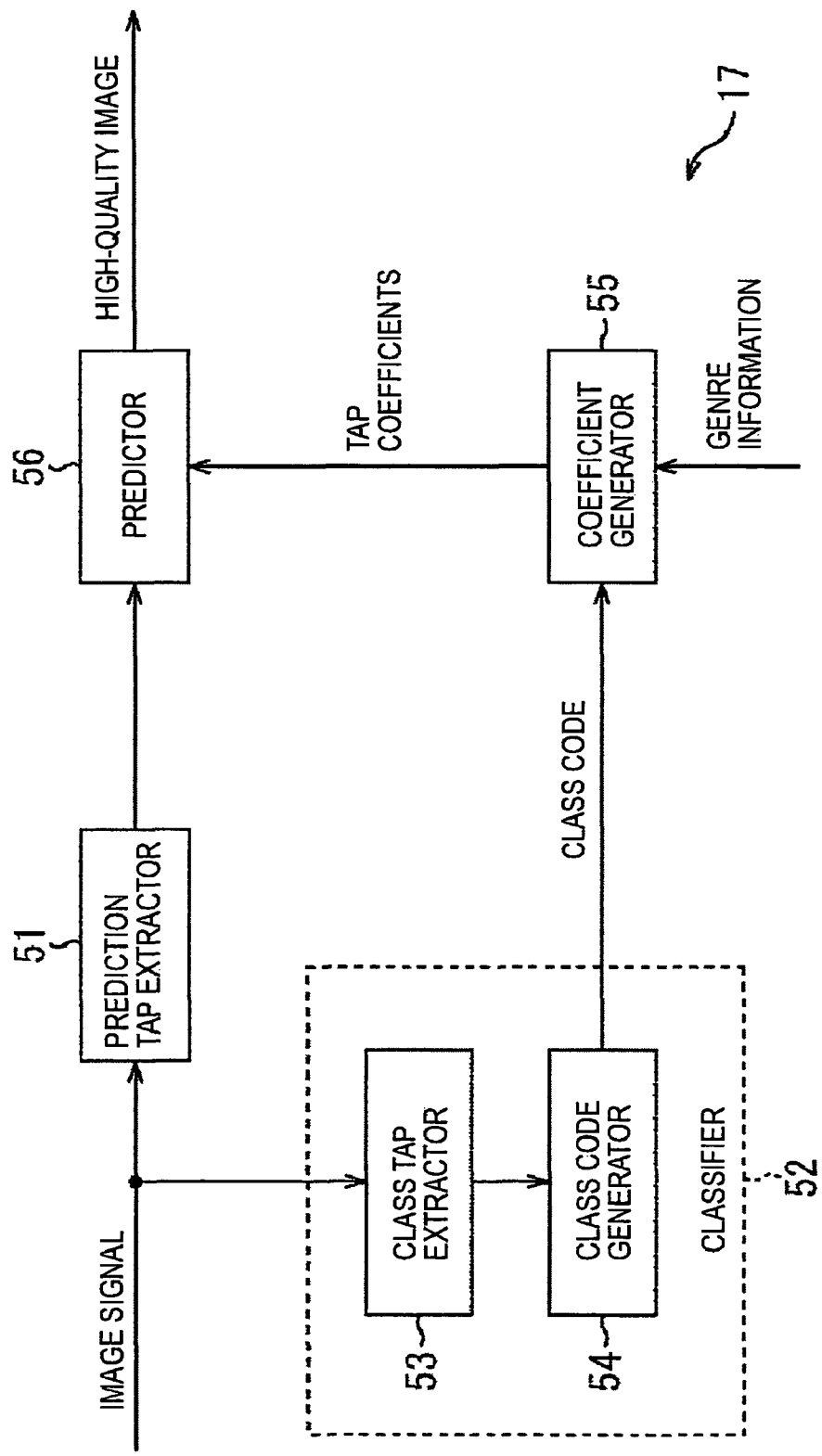
FIG. 4 is a block diagram showing the details of a DRC unit shown in FIG. 2.

FIG. 4 is a block diagram showing the details of the DRC unit 17 shown in FIG. 2. As described above, the DRC unit 17 employs the video signal output from the video decoder 15 as a first video signal, and converts the first video signal into a second video signal in the form of a high-quality video signal.

More specifically, in the DRC unit 17, the video signal supplied from the video decoder 15 is supplied as the first video signal to a prediction tap extractor 51 and a class tap extractor 53 of a classification unit 52.

The prediction tap extractor 51 employs pixels of a second video signal as a pixel of interest one by one and extracts, as prediction taps, some pixels (pixel values) of a first video signal to be used to predict the pixel value of the pixel of interest.

More specifically, the prediction tap extractor 51 extracts, as prediction taps, a plurality of pixels spatially or temporally close to a pixel of the first video signal corresponding to a pixel of interest (for example, pixels spatially or temporally closest to the pixel, corresponding to the pixel of interest, of the first video signal are extracted). The prediction tap extractor 51 supplies the extracted prediction taps to the predictor 56.

The classification unit 52, including the class tap extractor 53 and a class code generator 54, classifies the pixel of interest depending on the video signal supplied from the video decoder 15. More specifically, the class tap extractor 53 extracts class taps from the video signal supplied from the video decoder 15, and class code generator 54 generates a class code from the class taps. That is, the class tap extractor 53 extracts, as class taps, some pixels of the first video signal for use in classifying the pixel of interest into one of a plurality of classes. The prediction taps and the class taps may have the same tap structure or may have different tap structures. The class taps extracted by the class tap extractor 53 are supplied to the class code generator 54.

The class code generator 54 classifies the pixel of interest into one of the plurality of classes depending on the distribution of pixel levels of the pixels of the class taps extracted by the class tap extractor 53, and the class code generator 54 supplies the class code indicating the class to the coefficient generator 55.

The classification may be accomplished by means of, for example, an ADRC (Adaptive Dynamic Coding) process. In the ADRC process, the pixel values of pixels of the class taps are subjected to adaptive dynamic coding, and a class of the pixel of interest is determined in accordance with an ADRC code obtained in the ADRC process. In a case in which K-bit ADRC is employed, the maximum value MAX and the minimum value MIN of pixels extracted as class taps are detected, and the local dynamic range DR of the set of pixels is determined as DR=MAX−MIN. The pixel values of the class taps are then requantized into values of K bits on the basis of the dynamic range DR. More specifically, the minimum value MIN is subtracted from the pixel values of pixels of the class taps, and the resultant respective values are divided (quantized) by DR/2K. The resultant K-bit pixel values of pixels of the class taps are arranged in a predetermined order into a bit string, and the resultant bit string is output as an ADRC code. For example, in a case in which 1-bit ADRC is employed, the pixel values of respective pixels of class taps are divided by the mean value of the maximum value MAX and the minimum value MIN (the fractional portions are dropped), thereby converting the respective pixel values into 1-bit values (two-level values). The resultant 1-bit pixel values are then arranged in the predetermined order into a bit string, and the result is output as an ADRC code. The class code generator 54 generates (outputs) an ADRC code obtained by performing ADRC processing on the class tap.

Alternatively, the class code generator 54 may directly output a level distribution pattern of pixel values of pixels of class taps as a class code. However, in this case, when class taps include pixel values of N pixels each represented in K bits, a class code output from the class code generator 54 is selected from as many class codes as $(2^N)^K$, which is very huge.

Thus, it is desirable that the class code generator 54 perform classification after reducing the amount of information of class taps by means of the ADRC processing or vector quantization.

The coefficient generator 55 receives the class code from the class code generator 54 and also receives, from the controller 31, genre information indicating the genre of the program detected by the tuner 11.

The coefficient generator 55 stores tap coefficients for each class assigned to each genre, wherein the tap coefficients are obtained via learning as will be described later. The coefficient generator 55 selects tap coefficients corresponding to the genre indicated by the genre information supplied from the controller 31. Of those selected tap coefficients, a tap coefficient stored at an address corresponding to the class code supplied from the class code generator 54 (a tap coefficient represented by the class code supplied from the class code generator 54) is supplied (output) to the predictor 56.

The tap coefficients correspond to coefficients which are multiplied, in a digital filter, by input data at taps.

The predictor 56 acquires the prediction taps output from the prediction tap extractor 51 and the tap coefficients output from the coefficient generator 55, and determines a predicted value corresponding to the real value of the pixel of interest using the prediction taps and the tap coefficients according to a predetermined prediction algorithm. Thus, the predictor 56 determines the pixel value (the predicted value) of the pixel of interest, that is, the pixel value of a pixel of the second video signal, and outputs the result.

In the DRC unit 17 described above with reference to FIG. 4, tap coefficients determined for each class assigned to each genre via learning are stored in the coefficient generator 55. Alternatively, the coefficient generator 55 may store one set of coefficients for each class that is not necessarily related to a genre, and may supply (output) to the predictor 56 tap coefficients stored at an address corresponding to a class code supplied from the class code generator 54.

A DRC unit having a similar structure to that of the DRC unit 17 described above may be disposed, for use in the processing of audio signals, between the audio decoder 16 and the selector 21 of the receiving apparatus 1 shown in FIG. 2. In this case, the additional DRC unit employs the audio data output from the audio decoder 16 as a first audio signal (first audio data), and converts the first audio signal into a high-quality audio signal. The resultant high-quality audio signal is supplied (output) to the selector 21.

Figure 5B:
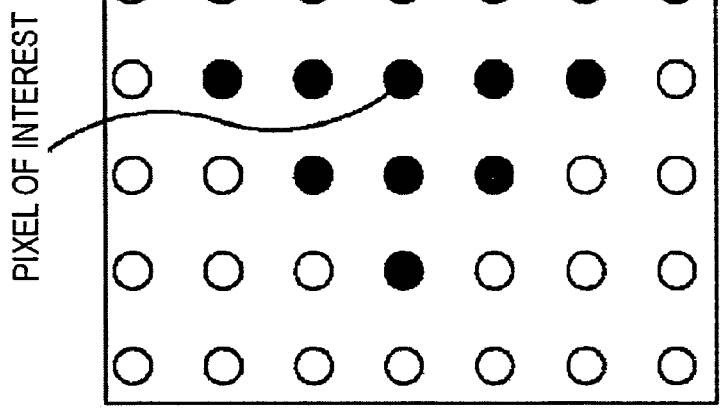
FIG. 5A is a diagram showing an example of a set of class taps and FIG. 5B is a diagram showing an example of a set of prediction taps.
Figure 5A:
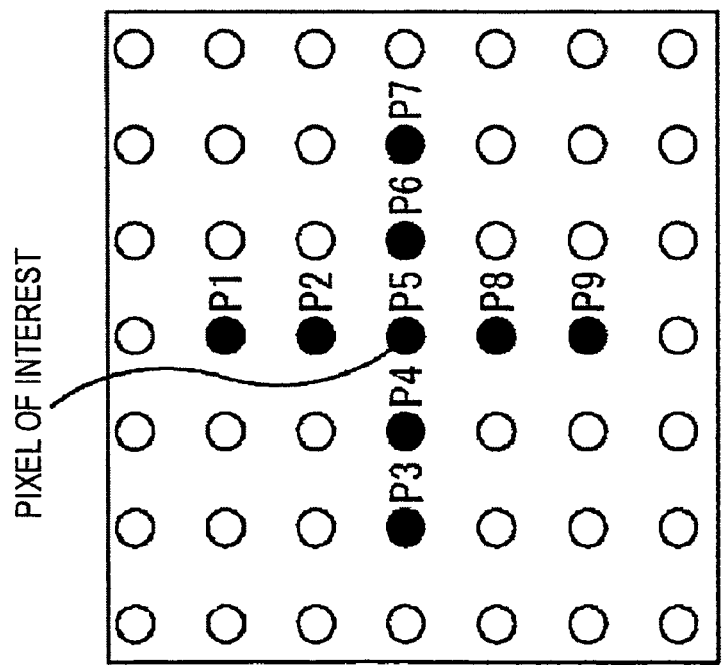

FIGS. 5A and 5B show examples of tap structures of class taps and prediction taps.

FIG. 5A shows an example of the tap structure of class taps. In the specific example shown in FIG. 5A, a class tap includes nine pixels P1 to P9. That is, in the specific example shown in FIG. 5A, a cross-shaped class tap is formed of nine pixels of an image signal output from the video decoder 15, including a pixel P5 corresponding to the pixel of interest, two pixels (P1 and P2) adjacent in an upward direction to the pixel P5, two pixels (P8 and P9) adjacent in a downward direction to the pixel P5, two pixel (P3 and P4) adjacent in a leftward direction to the pixel P5, and two pixels (P6 and P7) adjacent in a rightward direction to the pixel P5.

FIG. 5B shows an example of the tap structure of a prediction tap. In the specific example shown in FIG. 5B, the prediction tap includes thirteen pixels. That is, in the specific example shown in FIG. 5B, a rhomboid-shaped class tap is formed of thirteen pixels of a video signal output from the video decoder 15, including five pixels located in a vertical line whose central pixel corresponds to the pixel of interest, three pixels in a vertical line located immediately to the left of the central vertical line on which the pixel of interest lies, three pixels in a vertical line located immediately to the right of the central vertical line, and one pixel located two pixels to the left of the pixel of interest, and one pixel located two pixels to the right of the pixel of interest.

The prediction process performed by the predictor 56 shown in FIG. 4 and the learning of tap coefficients used in the prediction process are described below.

Herein we assume that a video signal having a high resolution (a high-resolution video signal) is employed as the second video signal, a first video signal having a low resolution (a low-resolution video signal) is produced by reducing the resolution of the high-resolution video signal by means of filtering using a LPF (Low Pass Filter), and pixel values of high-resolution pixels are determined (predicted) by means of a prediction algorithm using both prediction taps extracted from the low-resolution video signal and tap coefficients.

In a case in which the prediction is performed in accordance with a linear prediction algorithm, the pixel value y of a high-resolution pixel may be determined, for example, by the following linear equation:

$$y = \sum_{n=1}^{N} w_n x_n \qquad (1)$$

where $x_n$ denotes the pixel value of an nth pixel of prediction taps associated with the high-resolution pixel y in low-resolution video data (hereinafter, such a pixel will be referred to as a low-resolution pixel), and $w_n$ denotes an nth tap coefficient multiplied by the nth low-resolution pixel (more strictly, the pixel value of the nth low-resolution pixel). In equation (1), it is assumed that the prediction taps include N low-resolution pixels $x_1, x_2 \ldots, x_n$.

Alternatively, the pixel value y of a high-resolution pixel may be determined using a quadratic formula or a higher-order formula instead of the linear formula (1).

Herein, let $y_k$ be the true value of a kth sample of a high-resolution pixel, and $y_k'$ be a predicted value of the true value $y_k$ obtained using equation (1). The prediction error $e_k$ is given by the following equation:

$$e_k = y_k - y_k' \tag{2}$$

In equation (2), the predicted value $y_k'$ is determined in accordance with equation (1), and thus equation (2) can be rewritten as described below by replacing $y_k'$ in accordance with equation (1):

$$e_k = y_k - \left( \sum_{n=1}^{N} w_n x_{n,k} \right) \tag{3}$$

where $x_{n,k}$ denotes an nth low-resolution pixel of prediction taps associated with the kth sample of the high-resolution pixel.

Tap coefficients $w_n$ optimum for use in predicting a high-quality pixel are obtained when the prediction error $e_k$ given by equation (3) (or equation (2)) becomes 0. However, in general, it is difficult to determine such tap coefficients $w_n$ for all high-resolution pixels.

How good the tap coefficients $w_n$ are can be evaluated, for example, by means of the least square method. That is, optimum tap coefficients $w_n$ can be obtained by minimizing the sum of squares of errors, E, given by the following equation:

$$E = \sum_{k=1}^{K} e_k^2 \tag{4}$$

where K denotes the number of samples (used in learning) of sets of a high-resolution pixel $y_k$ and low-resolution pixels $x_{1,k}, x_{2,k}, \ldots, x_{N,k}$ constituting a prediction tap associated with the high-resolution pixel $y_k$.

The smallest (minimum) value of the sum of the squares of errors, E, given by equation (4) is obtained when the partial derivative of the sum E with respect to the tap coefficient $w_n$ becomes equal to 0 as shown in the following equation (5):

$$\frac{\partial E}{\partial w_n} = e_1 \frac{\partial e_1}{\partial w_n} + e_2 \frac{\partial e_2}{\partial w_n} + \ldots + e_k \frac{\partial e_n}{\partial w_n} = 0 \ (n = 1, 2, \cdots, N) \tag{5}$$

Thus, if equation (3) is partially differentiated with respect to the tap coefficient $w_n$, the following equation is obtained:

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, (k = 1, 2, \ldots, K) \tag{6}$$

From equations (5) and (6), the following equation is obtained:

$$\sum_{k=1}^{K} e_k x_{1,k} = 0, \sum_{k=1}^{K} e_k x_{2,k} = 0, \ldots \sum_{k=1}^{K} e_k x_{N,k} = 0 \tag{7}$$

By substituting equation (3) into $e_k$ in equation (7), equation (7) can be rewritten into a normal equation (8) as shown below.

$$\begin{bmatrix} \left(\sum_{k=1}^{K} x_{1,k} x_{1,k}\right) & \left(\sum_{k=1}^{K} x_{1,k} x_{2,k}\right) & \ldots & \left(\sum_{k=1}^{K} x_{1,k} x_{N,k}\right) \\ \left(\sum_{k=1}^{K} x_{2,k} x_{1,k}\right) & \left(\sum_{k=1}^{K} x_{2,k} x_{2,k}\right) & \ldots & \left(\sum_{k=1}^{K} x_{2,k} x_{N,k}\right) \\ \vdots & \vdots & \ddots & \vdots \\ \left(\sum_{k=1}^{K} x_{N,k} x_{1,k}\right) & \left(\sum_{k=1}^{K} x_{N,k} x_{2,k}\right) & \ldots & \left(\sum_{k=1}^{K} x_{N,k} x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k} y_k\right) \\ \left(\sum_{k=1}^{K} x_{2,k} y_k\right) \\ \vdots \\ \left(\sum_{k=1}^{K} x_{N,k} y_k\right) \end{bmatrix} \tag{8}$$

The normal equation (8) can be solved for the tap coefficients $w_n$ by means of, for example, the sweeping out method (Gauss-Jordan elimination method).

Thus, by solving the normal equation (8), the optimum tap coefficients $w_n$ (which result in the smallest value for the sum E of squares of errors) are determined for each class.

FIG. 6 shows an example of the configuration of a learning apparatus for learning to determine the tap coefficients $w_n$ by solving the normal equation (8).

A video signal to be used in learning in terms of tap coefficients $w_n$ is input to the learning apparatus. As for the video signal used for learning, for example, a high-resolution video signal may be employed.

In the learning apparatus, the video signal for learning is supplied to a teacher data generator 101 and a student data generator 103.

The teacher data generator 101 generates teacher data serving as a teacher (answer) of learning from the received video signal for learning and supplies the generated teacher data to a teacher data memory 102. That is, the teacher data generator 101 directory transfers, as the teacher data, the high-resolution video signal given as the video signal for learning to the teacher data memory 102. The teacher data memory 102 stores the high-resolution video signal supplied as the teacher data from the teacher data generator 101.

The student data generator 103 generates student data from the video signal for learning and supplies it to the student data memory 104. More specifically, the student data generator 103 reduces the resolution of the high-resolution video signal given as the video data for learning by means of filtering, thereby generating a low-resolution video signal which is supplied to the student data memory 104. The student data memory 104 stores the low-resolution video signal supplied from the student data generator 103.

The prediction tap extractor 105 sequentially takes pixels of the high-resolution video signal serving as the teacher data stored in the teacher data memory 102 and employs each pixel as a teacher pixel of interest on a one-by-one basis. For each teacher pixel of interest, the prediction tap extractor 105 extracts low-resolution pixels of a low-resolution video signal from those stored as the student data in the student data memory 104 and produces prediction taps having the same tap structure as that produced by the prediction tap extractor 51 shown in FIG. 4.

For each teacher pixel of interest, the class tap extractor 106 extracts low-resolution pixels of low-resolution video data from those stored as the student data in the student data memory 104 and produce class taps having the same tap structure as that produced by the tap extractor 53 shown in FIG. 4. The resultant class taps are supplied to a class code generator 107.

The class code generator 107 performs classification on the basis of the class taps output from the class tap extractor 106, in a similar manner to the class code generator 54 shown in FIG. 4. A class code indicating the determined class is output to the adder 108.

The adder 108 reads a teacher pixel of interest from the teacher data memory 102 and performs addition processing on the teacher pixel of interest and the student data produced as the prediction taps associated with the teacher pixel of interest supplied from the prediction tap extractor 105 for each class code supplied from the class code generator 107.

That is, the adder 108 acquires teacher data $y_k$ from the teacher data memory 102, a prediction tap $x_{n,k}$ from the tap extractor 105, and a class code from the class code generator 107.

The adder 108 determines the product, $x_{n,k}x_{n',k}$, of the student data and then determines the sum of the products, thereby determining components of the matrix on the left side of equation (8), for each class indicated by the class code supplied from the class code generator 107, using the prediction tap (student data) $x_{n,k}$.

Furthermore, for each class indicated by the class code supplied from the class code generator 107, using the prediction tap (student data) $x_{n,k}$ and the teacher data $y_k$, the adder 108 determines the product, $x_{n,k}y_k$, of the student data $x_{n,k}$ and the teacher data $y_k$ and further determines the sum of the products, thereby determining components of the vector on the right side of equation (8).

The adder 108 stores, in its internal memory (not shown), the calculated components ($\Sigma x_{n,k}x_{n',k}$) of the matrix on the left side of equation (8), determined for teacher data employed previously as the teacher pixel of interest, and also stores the calculated components ($\Sigma x_{n,k}y_k$) of the vector on the right side of equation (8). The adder 108 then adds (determines the sum in equation (8)) those components ($\Sigma x_{n,k}x_{n',k}$) of the matrix and the components ($\Sigma x_{n,k}y_k$) of the vector with the corresponding components ($\Sigma x_{n,k+1}x_{n',k+1}$) of the matrix and the components ($\Sigma x_{n,k}y_{k+1}$) of the vector, respectively, calculated, using the teacher data $y_{k+1}$ and the student data $x_{n,k+1}$, for teacher data newly employed as the teacher pixel of interest.

The adder 108 performs the addition processing described above by employing all teacher data stored in the teacher data memory 102 as the teacher pixel of interest, thereby creating the normal equation shown in (8) for each class, and the adder 108 supplies the resultant normal equation to a tap coefficient calculator 109.

The tap coefficient calculator 109 solves the normal equation supplied from the adder 108 for each class, thereby determining the optimum tap coefficients $w_n$ for each class. The resultant optimum tap coefficients $w_n$ are output.

The coefficient generator 55 stores the tap coefficients $w_n$ determined in the above-described manner for each class assigned to each genre.

In the process described above, the image signal for learning is directly used as teacher data corresponding to the second video signal, and the low-quality vide signal obtained by reducing the resolution of the video signal for learning is employed as student data corresponding to the first video signal, and thus tap coefficients are obtained which can be used in the image conversion process in which the first video signal is converted into the second video signal having a greater resolution than that of the first video signal.

Tap coefficients can be obtained for use in various image conversions by properly selecting the student data corresponding to the first vide signal and the teacher data corresponding to the second video signal.

For example, if a high-quality video signal is employed as teacher data, and a video signal obtained by superimposing noise on the high-quality video signal employed as the teacher data is employed as student data, and if learning is performed, then tap coefficients are obtained which can be used in an image conversion process for converting the first video signal including noise to the second video signal which no longer includes noise. That is, noise can be removed by performing the image conversion process using such tap coefficients.

Figure 7:
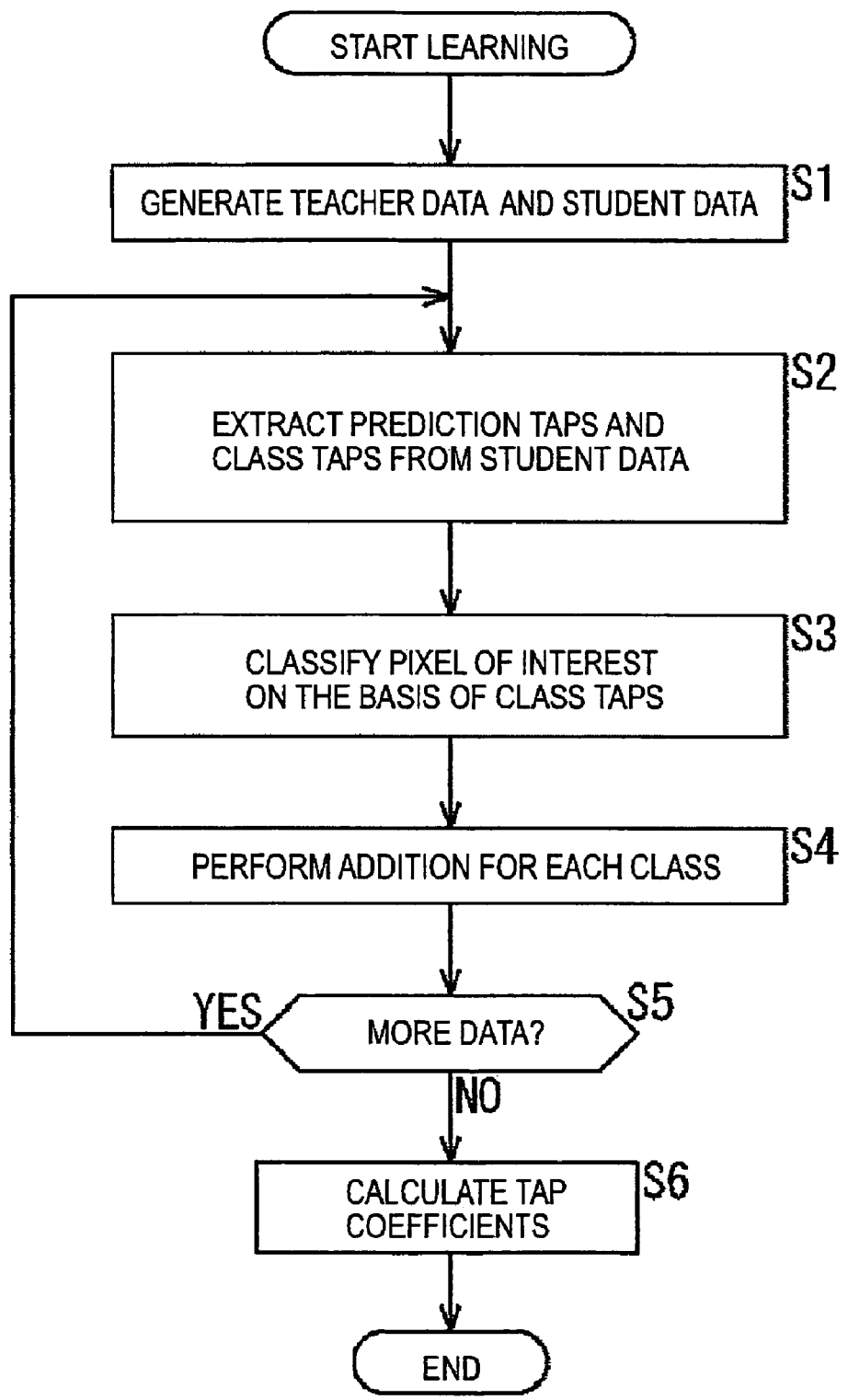
FIG. 7 is a flow chart showing a process of learning tap coefficients.

A process (learning process) performed by the learning apparatus shown in FIG. 6 to learn tap coefficients for each class assigned to each genre is described below with reference to the flow chart shown in FIG. 7.

First, in step S1, the teacher data generator 101 and the student data generator 103 generate teacher data and student data, respectively, from the video signal for learning and output the resultant teacher data and student data. In this case, the teacher data generator 101 directly outputs the video signal for learning as the teacher data without performing any processing on it. The student data generator 103 generates student data by passing the video signal for learning through a lowpass filter with a particular cut-off frequency on a frame-by-frame basis (for on a field-by-field basis).

The teacher data output from the teacher data generator 101 is supplied to the teacher data memory 102 and stored therein, and the student data output from the student data generator 103 is supplied to the student data memory 104 and stored therein.

Thereafter, the process proceeds to step S2. In step S2, the prediction tap extractor 105 reads teacher data, which has not yet been employed as the teacher pixel of interest, from the teacher data memory 102 and employs it as a new teacher pixel of interest. In this step S2, furthermore, the prediction tap extractor 105 produces a prediction tap corresponding to the teacher pixel of interest from the student data stored in the student data memory 104 and supplies the resultant prediction tap to the adder 108, and the class tap extractor 106 produces a class tap corresponding to the teacher pixel of interest from the student data stored in the student data memory 104 and supplies the resultant class tap to the class code generator 107.

In step S3, the class code generator 107 classifies the teacher pixel of interest on the basis of the class tap and supplies a class code indicating a class obtained as a result of the classification to the adder 108. The process then proceeds to step S4.

In step S4, the adder 108 reads a teacher pixel of interest from the teacher data memory 102 and performs addition processing on the teacher pixel of interest and the student data produced as the prediction taps associated with the teacher pixel of interest supplied from the prediction tap extractor 105 for each class code supplied from the class code generator 107 in accordance with equation (8). The process then proceeds to step S5.

In step S5, the prediction tap extractor 105 determines whether all teacher data stored in the teacher data memory 102 has been employed as the teacher pixel of interest. If it is determined in step S5 that the teacher data stored in the teacher data memory 102 include data which has not yet been employed as the teacher pixel of interest, the prediction tap extractor 105 employs teacher data which has not yet been employed as the teacher pixel of interest as a new teacher pixel of interest. The process flow then returns to step S2 to repeat the process described above.

On the other hand, when it is determined in step S5 that there is no more teacher data in the teacher data memory 102 which has not yet been employed as the teacher pixel of interest, the adder 108 supplies the matrix on the left side and the vector on the right side of equation (8), obtained via the process described above for each class, to the tap coefficient calculator 109. The process then proceeds to step S6.

In step S6, the tap coefficient calculator 109 solves the normal equation (8) including the matrix on the left side and the vector on the right side supplied from the adder 108 for each class, thereby determining the tap coefficients $w_n$ for each class. The determined tap coefficients are output, and thus the process is completed.

There is a possibility that a sufficient number of normal equations needed to determine tap coefficients cannot be obtained for some classes because of an insufficient number of video signals for learning or for some other reasons. As for such classes, the tap coefficient calculator 109 outputs default tap coefficients.

The learning process described above is performed for each genre to obtain tap coefficients for the respective classes of each genre.

Figure 8:
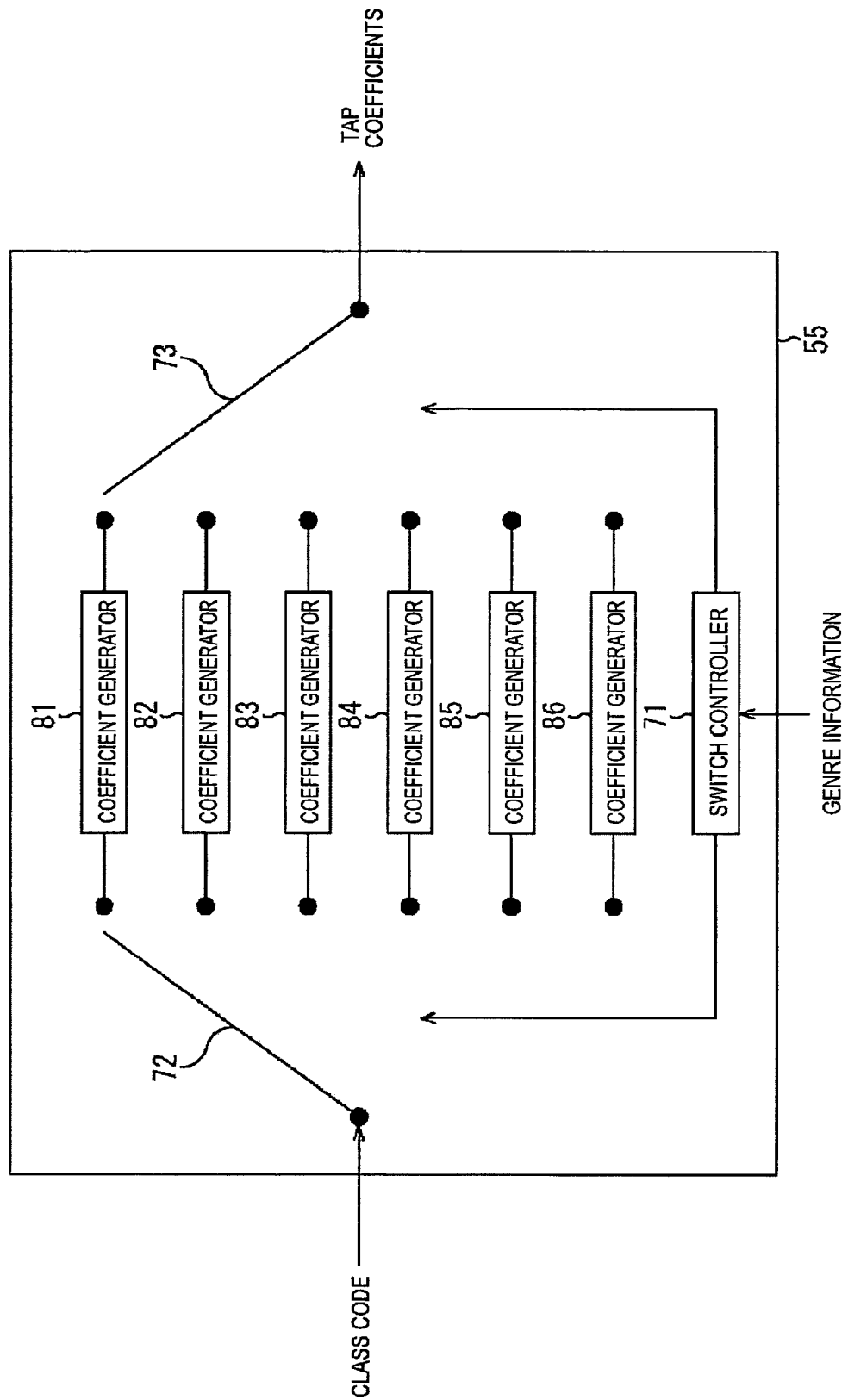
FIG. 8 is a block diagram showing an example of the structure of a coefficient generator.

FIG. 8 is a block diagram showing the details of the coefficient generator 55 shown in FIG. 4.

Genre information indicating a genre of a program supplied from the controller 31 is input to a switch controller 71. The switch controller 71 controls switches 72 and 73 depending on the genre information supplied from the controller 31. More specifically, the switch controller 71 controls the switches 72 and 73 such that, of coefficient generation circuits 81 to 86, a coefficient generation circuit corresponding to the genre indicated by the genre information supplied from the controller 31 is selected by the switches 72 and 73.

The coefficient generation circuits 81 to 86 store tap coefficients, obtained via the learning process described above, corresponding to the respective classes. More specifically, the coefficient generation circuit 81 stores tap coefficients of respective classes for the program genre of general news. The coefficient generation circuit 82 stores tap coefficients of respective classes for the program genre of soccer. Similarly, the coefficient generation circuits 83 to 86 store tap coefficients of classes for program genres of the majors, general sports, animations, and dramas, respectively.

When one of the coefficient generation circuits 81 to 86 is selected by the switches 72 and 73, the selected coefficient generation circuit selects a set of tap coefficients corresponding to a class code supplied from the class code generator 54 and supplies (outputs) the selected set of tap coefficients to the predictor 56.

Thus, in the coefficient generator 55 constructed in the above-described manner, a coefficient generation circuit corresponding to a genre indicated by genre information supplied from the controller 31 is selected from among the coefficient generation circuits 81 to 86, and a class code output from the class code generator 54 is supplied to the selected coefficient generation circuit. In response, a set of tap coefficients corresponding to the class code is selected and supplied to the predictor 56.

Figure 9:
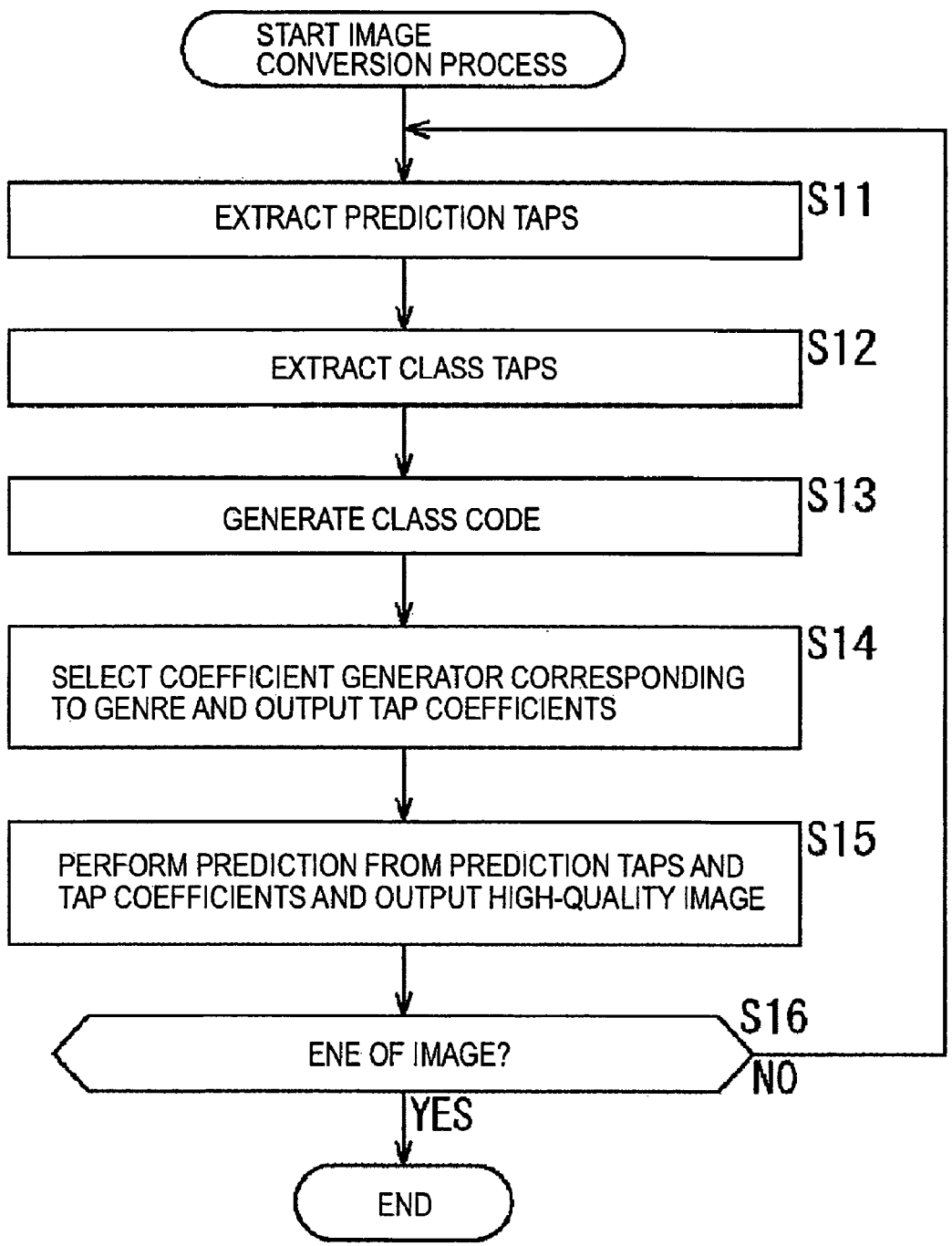
FIG. 9 is a flow chart showing an image conversion process.

An image conversion process performed by the DRC unit 17 shown in FIG. 4 to convert a video signal (first video signal) output from the video decoder 15 into a high-quality video signal (second video signal) is described below with reference to the flow chart shown in FIG. 9.

First, in step S11, the prediction tap extractor 51 selects one of the pixels which has not yet been employed as the teacher pixel of interest from among the pixels of the second video signal, and extracts, as prediction taps, some of the pixels (pixel values) constituting the first video signal to be used to predict the pixel value of the pixel of interest. The extracted prediction taps are supplied to the predictor 56 from the prediction tap extractor 51. The process then proceeds to step 12. The above-described process of selecting the pixel of interest performed by the prediction tap extractor 51 in step S11 may be performed such that pixels of the second video signal are selected in the order of raster scanning.

In step S12, the class tap extractor 53 extracts, as class taps, some pixels of the first video signal for use in classifying the pixel of interest into one of a plurality of classes. The class tap extractor 53 supplies the extracted class taps to the class code generator 54. Then the process proceeds to step S13.

In step S13, the class code generator 54 classifies the pixel of interest into one of the plurality of classes depending on the distribution of pixel levels of the pixels of the class taps supplied from the class tap extractor 53, and the class code generator 54 generates a class code indicating the class obtained as the result of the classification. The class code generator 54 supplies the resultant class code to the coefficient generator 55. The process then proceeds to step S14.

In step S14, the switch controller 71 in the coefficient generator 55 selects a coefficient generation circuit corresponding to the genre indicated by the genre information supplied from the controller 31 from among the coefficient generation circuits 81 to 86 shown in FIG. 8. The selected coefficient generation circuit reads tap coefficients stored at an address corresponding to the class code supplied from the class code generator 54 (tap coefficients corresponding to the class indicated by the class code supplied from the class code generator 54) and supplies (outputs) the tap coefficients to the predictor 56.

Thereafter, the process proceeds to step S15. In step S15, the predictor 56 acquires the prediction taps output from the prediction tap extractor 51 and the tap coefficients output from the coefficient generator 55, and determines a predicted value corresponding to the real value of the pixel of interest using the prediction taps and the tap coefficients according to the prediction algorithm shown in equation (1). Thus, the predictor 56 determines the pixel value (the predicted value) of the pixel of interest, that is, the pixel value of a pixel of the second video signal, and outputs the result. The process then proceeds to step S16.

In step S16, the DRC unit 17 determines whether the end of the input video signal has been reached. If it is determined that the end of the input video signal has not yet been reached, the processing flow returns to step S11 and the process is repeated from step S11. On the other hand, if it is determined in step 16 that the end of the input video signal has been reached, the process is ended.

As described above, the DRC unit 17 generates a high-quality video image of a particular genre of a program detected by the tuner 11 from the input video signal (supplied from the video decoder 15) and supplies the resultant video data to the mixer 18.

Figure 10:
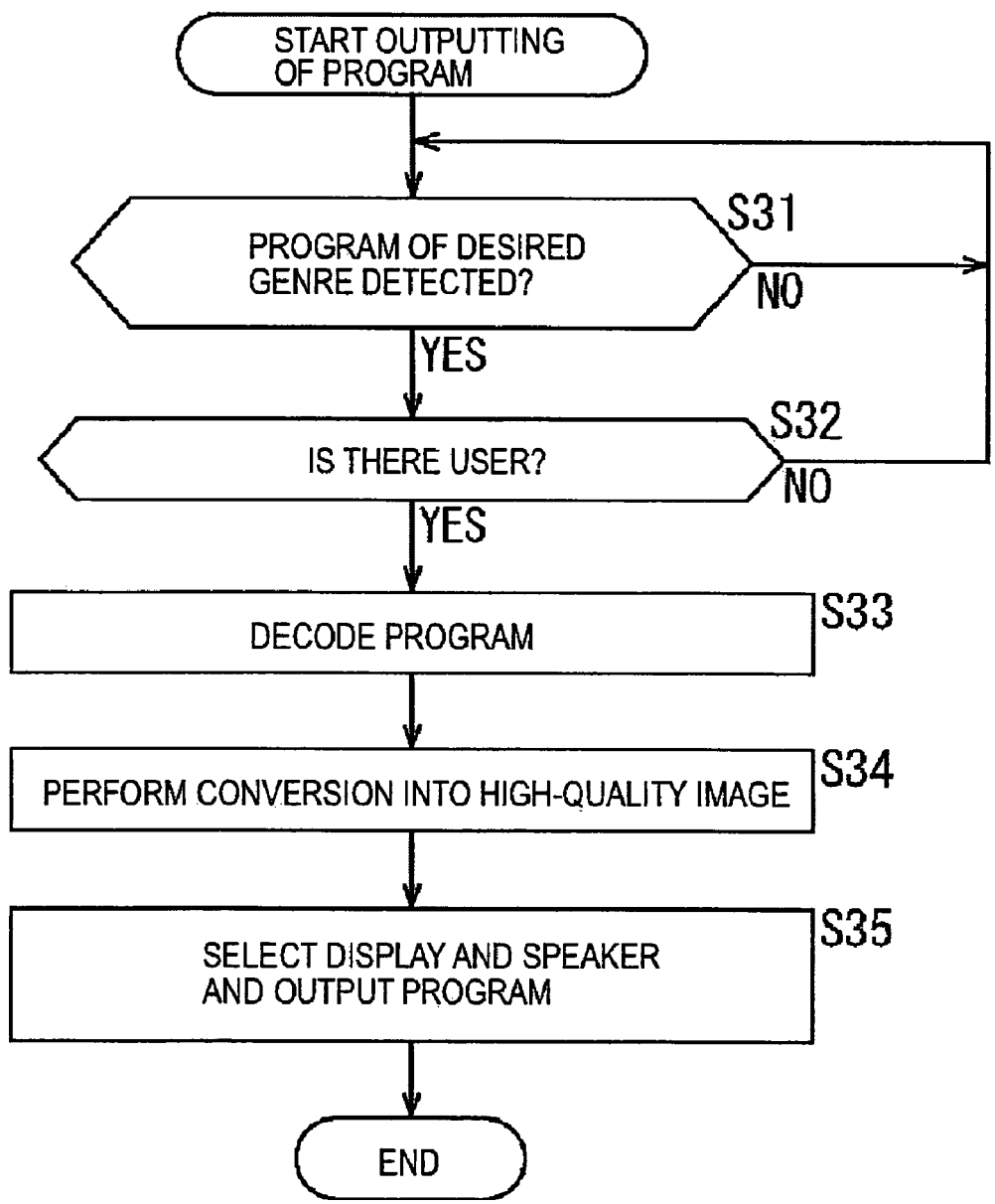
FIG. 10 is a flow chart showing a first program output process.

Referring to the flow chart shown in FIG. 10, a program output process (first program output process) is described which is performed by the receiving apparatus 1 to output a video signal and an audio signal of a program that meets the preference of users to displays and speakers in rooms in which the users are present. Note that this process is continued as long as the power of the receiving apparatus 1 is in the on state.

First, in step S31, the controller 31 determines whether the digital broadcast signal supplied from the antenna to the tuner 11 includes a program of any one of the genres described in the genre preference table which is, as described earlier with reference to FIG. 3A, stored in the memory 36 and which indicates the favorite genres of the users A to E (hereinafter, such genres will be referred to simply as the favorite genres of the users A to E or a similar expression). In a case in which no program is detected, the process in step S31 is performed repeatedly until a program of one of the favorite genres of the users A to E is detected.

If it is determined in step S31 that a program of a genre meeting the preference of the users A to E is detected, the process proceeds to step S32. In step S32, the controller 31 determines whether a user who will like the program of the genre detected in step S31 is present in his/her room. More specifically, the controller 31 first identifies a user who will like the program of the genre detected in step S31 on the basis of the data of the table (FIG. 3A) stored in the memory 36. The controller 31 then identifies the room of the user who will like that program, and also identifies the sensor sensing the user's room, on the basis of the data of the table (FIG. 3B) stored in the memory 36. Furthermore, the controller 31 determines whether a detection signal indicating that the subject user is present in his/her room is received from the sensor 37 disposed in the user's room. Note that when there are two or more users who will like the program of the genre detected in step S31, the determination as to whether a user is present in his/her room is made for each of those users.

When it is determined in step S32 that the user who will like the program of the genre detected in step S31 is not present in his/her room, that is, when the controller 31 does not receive a detection signal indicating the user's presence in his/her room from any sensor 37 installed in the rooms #1 to #5 of the users A to E who will like the program of the genre detected in step S31, the process returns to step S31.

On the other hand, if it is determined that, of the users who will like the program of the genre detected in step S31, at least one user is present in his/her room, that is, if the controller 31 receives a detection signal indicating the user's presence in his/her room from at least one of sensors 37-1 to 37-5 installed in the rooms of the users who will like the program of the genre detected in step S31, the process proceeds to step S33.

In step S33, a transport stream of the program detected by the tuner 11 is supplied to the demultiplexer 14 via the demodulator 12 and the error correction unit 13. The demultiplexer 14 supplies video data of TS packets of the program of the genre favored by the user to the video decoder 15 and supplies audio data of the TS packets to the audio decoder 16.

The video decoder 15 performs MPEG decoding on the video data of the TS packets received from the demultiplexer 14, and supplies the resultant data to the DRC unit 17.

On the other hand, the audio decoder 16 performs MPEG-decoding on the audio data of the TS packets received from the demultiplexer 14, and supplies the resultant data to the selector 21. The process then proceeds to step S34 from step S33.

In step S34, the DRC unit 17 employs the MPEG-decoded video data output from the video decoder 15 as the first video signal, and the DRC unit 17 converts the first image signal into a high-quality video signal (second video signal) and supplies the resultant video signal to the mixer 18. When video data to be superimposed is input to the mixer 18 from the OSD unit 19, the mixer 18 superimposes the video data output from the OSD unit 19 on the high-quality video signal supplied from the DRC unit 17, and supplies the resultant superimposed video signal to the selector 20. In the case in which video data to be superimposed is not input to the mixer 18 from the OSD unit 19, the mixer 18 directly transfers the high-quality video signal supplied from the DRC unit 17 to the selector 20.

The process then proceeds to step S35 from step S34. In step S35, under the control of the controller 31, the selectors 20 and 21 select the displays 22 and speakers 23 installed in the rooms of users who like the genre of program detected in step S31 and who are detected in step S32 as being present in their rooms. The selector 20 supplies the video data supplied from the mixer 18 to the displays 22 selected under the control of the controller 31. Thus, the high-quality image converted from the image of the program detected by the tuner 11 is displayed on the displays 22 selected by the selector 20.

The selector 21 supplies the audio data supplied from the audio decoder 16 to the speakers 23 selected under the control of the controller 31. Thus, the voice/sound of the program detected by the tuner 11 is output from the speakers 23 selected by the selector 21.

As described above, in the first program output process, when a program of a genre that will be liked by one or more of the users is detected, a determination is made as to whether users who will like the program are present in their rooms, and the detected program is output to the displays 22 and the speakers 23 of all rooms in which such users are present.

Thus, digital broadcast programs received by the receiving apparatus 1 are automatically presented to users depending on the contents of the broadcast programs, and the users can enjoy the presented programs of the users' favorite genres without having to perform any operations.

Now, a program output process (second program output process) performed by the receiving apparatus 1 according to a modification of the first embodiment of the present invention is described below with reference to the flow chart shown in FIG. 11.

Figure 11:
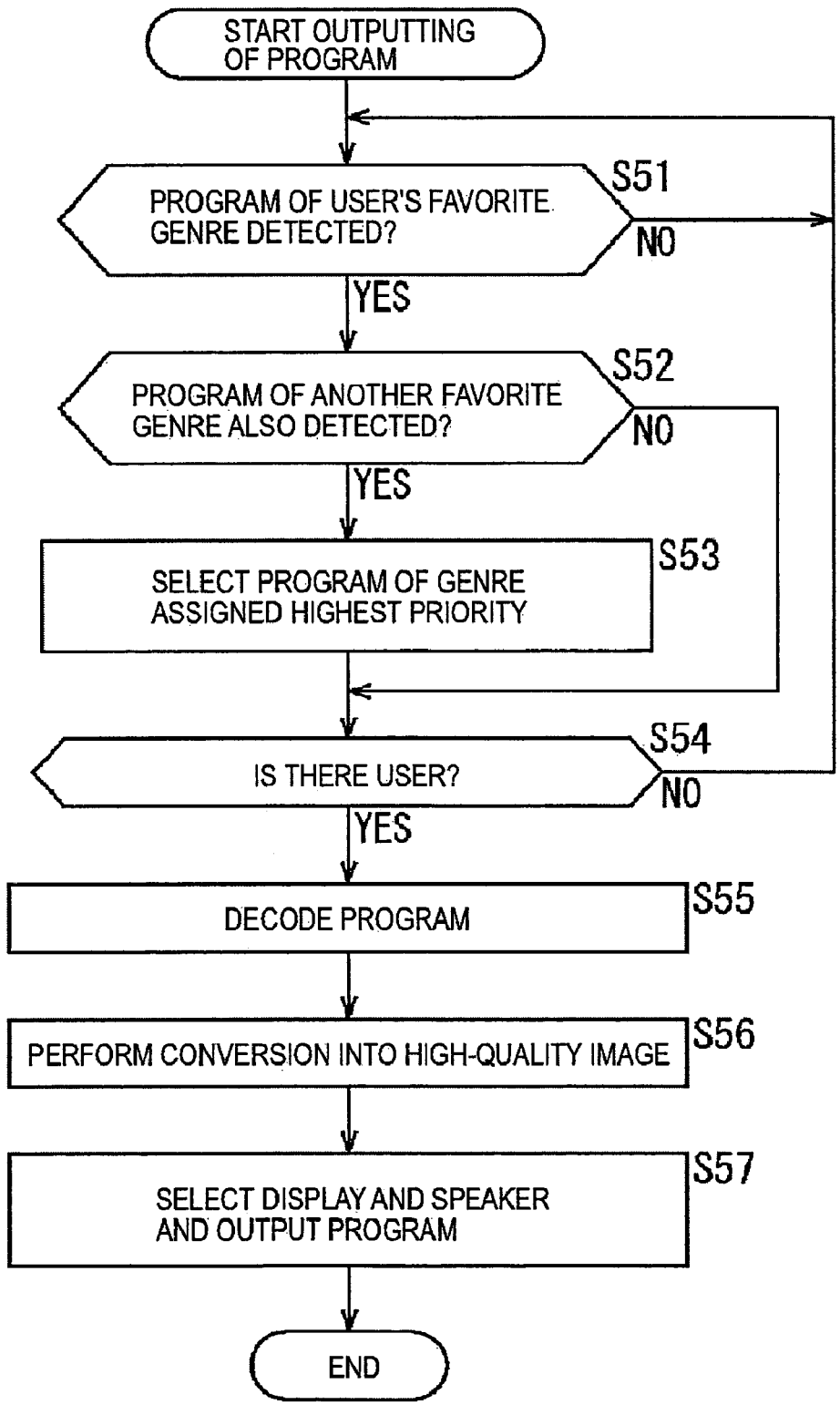
FIG. 11 is a flow chart showing a second program output process.

Step S51 of FIG. 11 is similar to step S31 of FIG. 10, and steps S54 to S57 of FIG. 11 are similar to steps S32 to 35 of FIG. 10. That is, the second program output process shown in FIG. 11 is similar to the first program output process shown in FIG. 10 except that the second program output process has additional steps S52 and S53 between step S51 corresponding to step S31 of the first program output process and step S54 corresponding to step S32 of the first program output process. Therefore, steps similar to those of the first program output process of FIG. 10 are not described in further detail herein.

If it is determined in step S51 that a program of one of the genres favored by the users A to E is detected, the process proceeds to step S52. In step S52, the controller 31 determines whether two or more programs of different genres included in the user's favorite genres are detected at the same time. If it is determined in step S52 that only one program of a certain genre is detected but no other program is detected, step S53 is skipped and the process proceeds to step S54.

On the other hand, if it is determined in step S52 that another program of a different genre is also detected, the process proceeds to step S53. In step S53, the controller 31 refers to the data of the table shown in FIG. 3A stored in the memory 36 and selects the program of the genre assigned the highest priority from among the detected programs of different genres. The process then proceeds to step S54.

When it is determined in step S54 that none of the users who like the genre of the program selected in step S53 are present in their rooms, that is, when a detection signal indicating the user's presence in his/her room is not received from any sensor 37 of those installed in the rooms of the users who like the genre of the program selected in step S53, the process returns to step S51.

On the other hand, if it is determined that, of the users who like the genre of the program detected in step S53, at least one user is present in his/her room, that is, if the controller 53 receives a detection signal indicating the user's presence in his/her room from at least one of sensors 37-1 to 37-5 installed in the rooms of the users who favor the genre of the program detected in step S53, the process proceeds to step S55.

As described above, in the second program output process, when programs of two or more genres included in the genres favored by the users are detected, the program of the genre with the highest priority is selected. Rooms of users who like the selected genre are examined to determine whether the users are present in their rooms, and the selected program is supplied to the displays 22 and speakers 23 of the rooms in which such a user is present. When no user who will like the selected program is present in his/her room, the controller 31 may select the program of the genre assigned the next highest priority.

Thus, digital broadcast programs received by the receiving apparatus 1 are automatically presented to users depending on the contents of the broadcast programs, and the users can enjoy the presented programs of their favorite genres without having to perform any operations.

When two or more programs of different genres favored by users are being broadcast, the controller 31 may first determine whether the users are present in their rooms, and then select the program of the genre with the highest priority of all of the genres favored by the users detected to be present in their rooms.

When two or more programs of the same genre favored by users are being broadcast, the controller 31 may select an arbitrary one of the programs, or may receive two or more programs using a time sharing technique and display the received programs in a multi-screen fashion.

Figure 12:
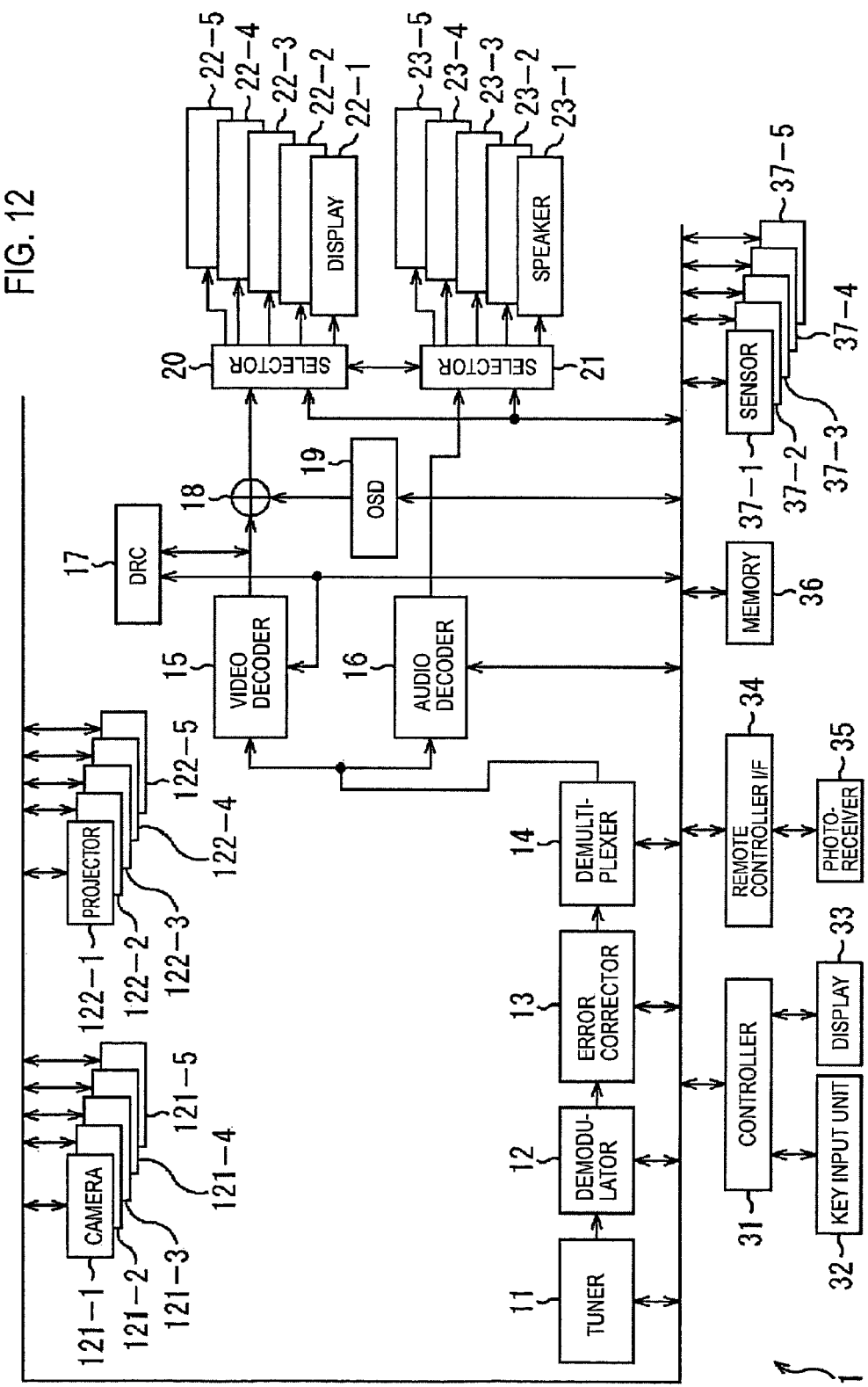
FIG. 12 is a block diagram showing a receiving apparatus according to a second embodiment of the present invention.

FIG. 12 is a block diagram of a receiving apparatus 1 according to a second embodiment, installed in the building of the house system shown in FIG. 1. In FIG. 12, similar parts to those of the first embodiment shown in FIG. 2 are denoted by similar reference numerals, and their further explanation is omitted herein.

In the receiving apparatus 1 shown in FIG. 12, cameras 121-1 to 121-5 and projectors 122-1 to 122-5 are installed in respective rooms #1 to #5. When it is not necessary to distinguish cameras 121-1 to 121-5 from each other, the generic representation "camera 121" is used. Similarly, when it is not necessary to distinguish projectors 122-1 to 122-5 from each other, the representation "projector 122" is used.

The cameras 121-1 to 121-5 are installed in the respective rooms #1 to #5. Under the control of the controller 31, each of the cameras 121-1 to 121-5 takes an image of a scene of the inside of the rooms #1 to #5 and an image of users A to E in the rooms #1 to #5. Under the control of the controller 31, the cameras 121-1 to 121-5 also take images of respective users A to E viewing the program output from the displays 22 and the speakers 23 in their rooms #1 to #5. The video signals taken by the camera 121 (hereinafter referred to as a camera-taken video signal) are supplied to the projector 122 via the memory 36 (after being temporarily stored in the memory 36).

The controller 31 controls the cameras 121-1 to 121-5 to take images of the inside of the respective rooms #1 to #5 and users A to E in the rooms #1 to #5, as required. The controller 31 temporarily stores the video signals output from the cameras 121 in the memory 36. Furthermore, the controller 31 supplies the video signals temporarily stored in the memory 36 to the projectors 122, as required.

The controller 31 may determine whether users are present in their rooms on the basis of the video signals output by the cameras 121. In this case, the sensors 37 can be removed from the receiving apparatus 1 shown in FIG. 12.

Projectors 122-1 to 122-5 are installed in the respective rooms #1 to #5. Under the control of the controller 31, the projectors 122-1 to 122-5 project images in the respective rooms #1 to #5 in accordance with the camera-taken video signals output from the memory 36. That is, under the control of the controller 31, the projectors 122-1 to 122-5 project (display) images of users viewing a program in their rooms onto walls or floors of the rooms #1 to #5 such that an image of a user of a certain room is displayed in a different room. This allows a user viewing a program in his/her room to feel as if he/she were viewing the program in his/her room together with other users who are actually in other rooms. The operation mode in which an image of a user viewing a program is projected onto a wall or the floor of a room of another user viewing the same program is referred to as an enjoy-together mode.

When a user does not want his/her image to be projected in a room of another user or when a user does not want to project in his/her room an image of another user, the user can turn off the enjoy-together mode. For this purpose, the key input unit 32 or the remote controller (not shown) has an operation button to turn the enjoy-together mode on or off. If the operation button is pressed to turn the enjoy-together mode on or off, a corresponding command signal is output from the key input unit 32 or the remote controller interface 34 to the controller 31. In response to receiving the command to turn the enjoy-together mode on or off, the controller 31 turns blocks relating to the enjoy-together mode on or off.

The controller 31 retains the status in terms of the enjoy-together mode specified in the last operation on the control button. The controller 31 controls the respective cameras 121 in accordance with the current status of the enjoy-together mode. More specifically, when the enjoy-together mode is off, the controller 31 controls the cameras 121 installed in the respective rooms of the users who specified the off-mode so as not to take images of the users viewing a program. When the enjoy-together mode is off, the controller 31 also controls the projectors 122 installed in the respective rooms of the users who specified the off-mode so as not to project an image of other users viewing the program. On the other hand, when the enjoy-together mode is on, the controller 31 controls the cameras 121 installed in the respective rooms of the users who specified the on-mode so as to take images of the users viewing a program. Furthermore, the controller 31 controls the projectors 122 such that the images of the users viewing the program are projected onto the walls or floors of the rooms in which other users are viewing the same program.

A projector of a widely used type may be employed as the projector 122 for the above purpose. Instead of the projector 122, a flat display panel such as an LCD or a PDP may be embedded in a wall or a floor of a user's room, and the controller 31 may control the LCD or PDP so as to display the images of users viewing the same program in other rooms.

In the receiving apparatus 1 constructed in such a manner, as in the first embodiment described above with reference to FIG. 2, a program meeting the preference of users in terms of genre is detected, and an image and a sound/voice of the detected program are output via a display and a speaker installed in a room in which a user is present who likes the genre of the detected program.

In the receiving apparatus 1 shown in FIG. 12, when there are two or more users who like the genre of a program detected by the tuner 11, the camera 121 installed in each room of those users takes an image of the user viewing the digital broadcast program output from the display 22 and the speaker 23 installed in the room. The video signals taken by each camera 121 are supplied to a projector 122 installed in the room of each of the other users viewing the same program, and the images of the other users viewing the same program each user is viewing are displayed (projected) on the wall of the room of each user.

For example, when a program of a particular genre (for example, soccer) liked by both users A and B is detected by the tuner 11, if it is determined that both users A and B are present in their rooms (#1 and #2), the camera 121-1 installed in the room #1 takes an image of the user A viewing the program and the camera 121-2 installed in the room #2 takes an image of the user B viewing the same program. The projector 122-1 installed in the room #1 projects the image, taken by the camera 121-2 installed in the room #2, of the user B viewing the program onto a wall of the room #1. Similarly, the projector 122-2 installed in the room #2 projects the image, taken by the camera 121-1 installed in the room #1, of the user A viewing the program onto a wall of the room #2.

The controller 31 controls whether an image, taken by a camera 121, of a user viewing a program in his/her room should be displayed in another room. For example, when the program detected by the tuner 11 is a movie program, most users want to view the movie program alone in their rooms. In such a case, a user can turn off the enjoy-together mode regardless of whether other users are viewing the same movie program. In response, the controller 31 controls the projectors 122 such that an image of any other user viewing the same movie program is not displayed in the room of a user who does not like the enjoy-together mode so that the user can view the movie program alone in his/her room.

Now, a program output process (third program output process) performed by the receiving apparatus 1 shown in FIG. 12 is described below with reference to the flow chart shown in FIG. 13.

Steps S71 to S75 (FIG. 13) are similar to steps S31 to S35 (FIG. 10) in the first program output process. Therefore, steps similar to those of the first program output process of FIG. 10 are not described in further detail herein.

In step S75, under the control of the controller 31, the selectors 20 and 21 select displays 22 and speakers 23 installed in the rooms of users who like the genre of the program detected in step S71 and who are detected in step S72 as being present in their rooms. The selector 20 supplies the video data supplied from the mixer 18 to the display 22 selected under the control of the controller 31. Thus, a high-quality video image obtained by converting the video data of the program detected by the tuner 11 into the high-quality video data is displayed on the display 22 selected by the selector 20.

The selector 21 supplies the audio data supplied from the audio decoder 16 to the speaker 23 selected under the control of the controller 31. Thus, the voice/sound of the program detected by the tuner 11 is output from the speaker 23 selected by the selector 21.

The process then proceeds to step S76 from step S75. In step S76, the controller 31 determines whether, in the detection process performed in step S72, the presence was detected of a plurality of users who like the genre of the program detected in step S71. If it is determined in step S76 that the presence of a plurality of users was not detected, that is, if it is determined that the result of the detection process in step S72 indicates a user's presence only in one room, then steps S77 to S79 are skipped and the process is ended.

On the other hand, if it is determined in step S76 that the result of the detection process in step S72 indicates the presence of users in a plurality of rooms, then the process proceeds to step S77. In step S77, the controller 31 determines whether the enjoy-together mode is off. If it is determined in step S77 that the enjoy-together mode is off, then steps S78 and S79 are skipped, and the process is ended.

On the other hand, if it is determined in step S77 that the enjoy-together mode is not off, the process proceeds to step S78. In step S78, the controller 31 controls the cameras 121 in all rooms in which the presence of a user has been detected in step S72 to take images of the users viewing the program detected in step S71. After the start of taking images of the users viewing the program detected in step S71 by the camera 121 under the control of the controller 31, the process proceeds to step S79. The video signals of the images taken by the cameras 121 are supplied to the memory 36 and temporarily stored therein.

In step S79, under the control of the controller 31, the projector 122 in each room in which the presence of a user has been detected in step S72 starts to project an image, supplied from the memory 36, of a user present in another room and viewing the same program. Thereafter, the process is ended.

Figure 13:
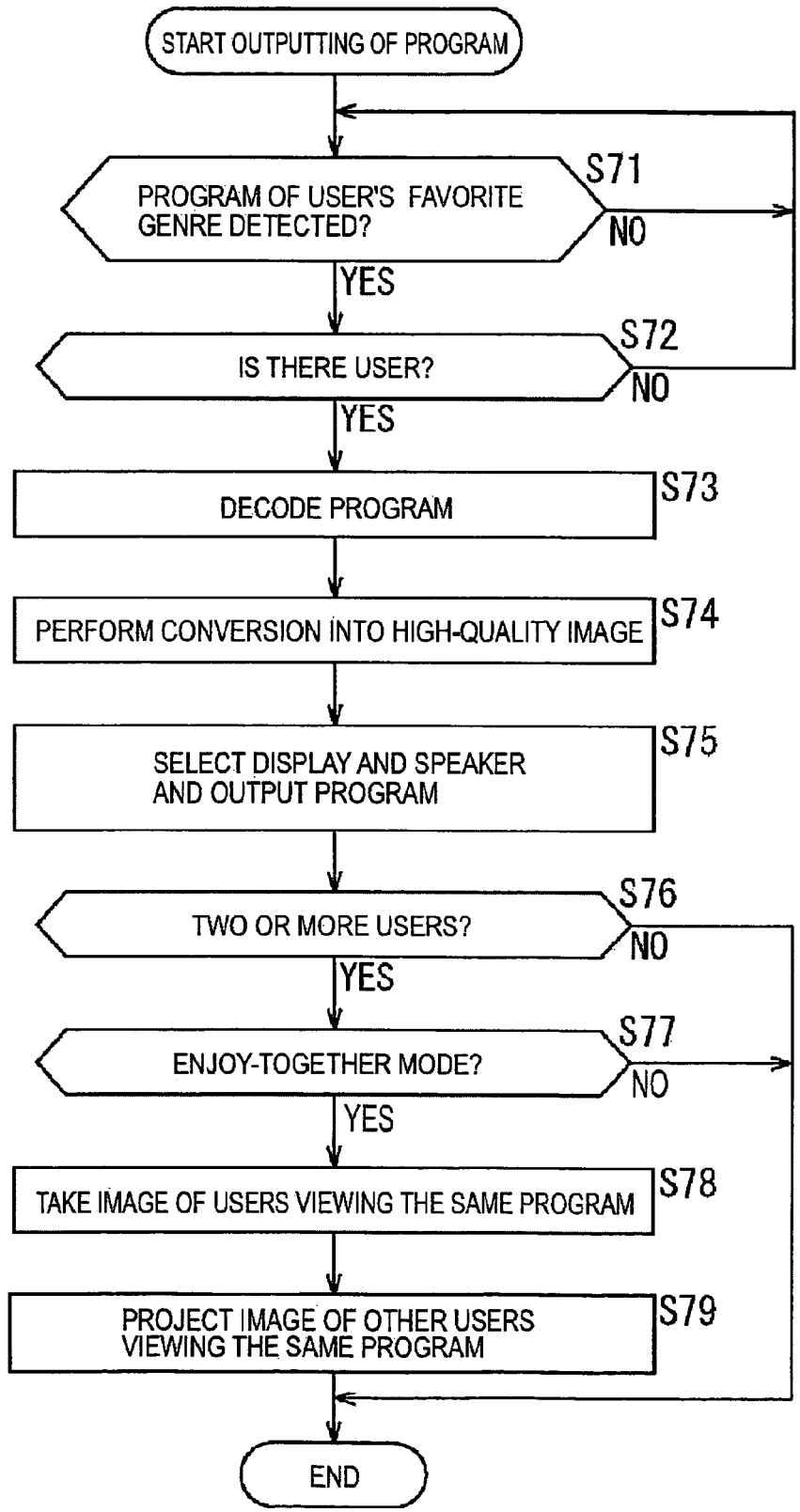
FIG. 13 is a flow chart showing a third program output process.

Thus, in the third program output process shown in FIG. 13, an image and a sound/voice of the program detected by the tuner 11 are output from the display 22 and the speaker 23 installed in each room in which a user is present so that the user present in the room can enjoy the program presented by the display 22 and the speaker 23. Furthermore, when the presence of a plurality of users is detected, if the enjoy-together mode is on, then in the room of a user viewing the program, an image of a user viewing the same program in another room is projected. This allows the user viewing the program in his/her room to feel as if he/she were viewing the program in his/her room together with other users who are actually in other rooms. Thus, users can feel as if they were really enjoying watching a program together with other users.

Thus, digital broadcast programs received by the receiving apparatus 1 shown in FIG. 12 are automatically presented to users depending on the contents of the broadcast programs, and users can enjoy the presented programs.

Figure 14:
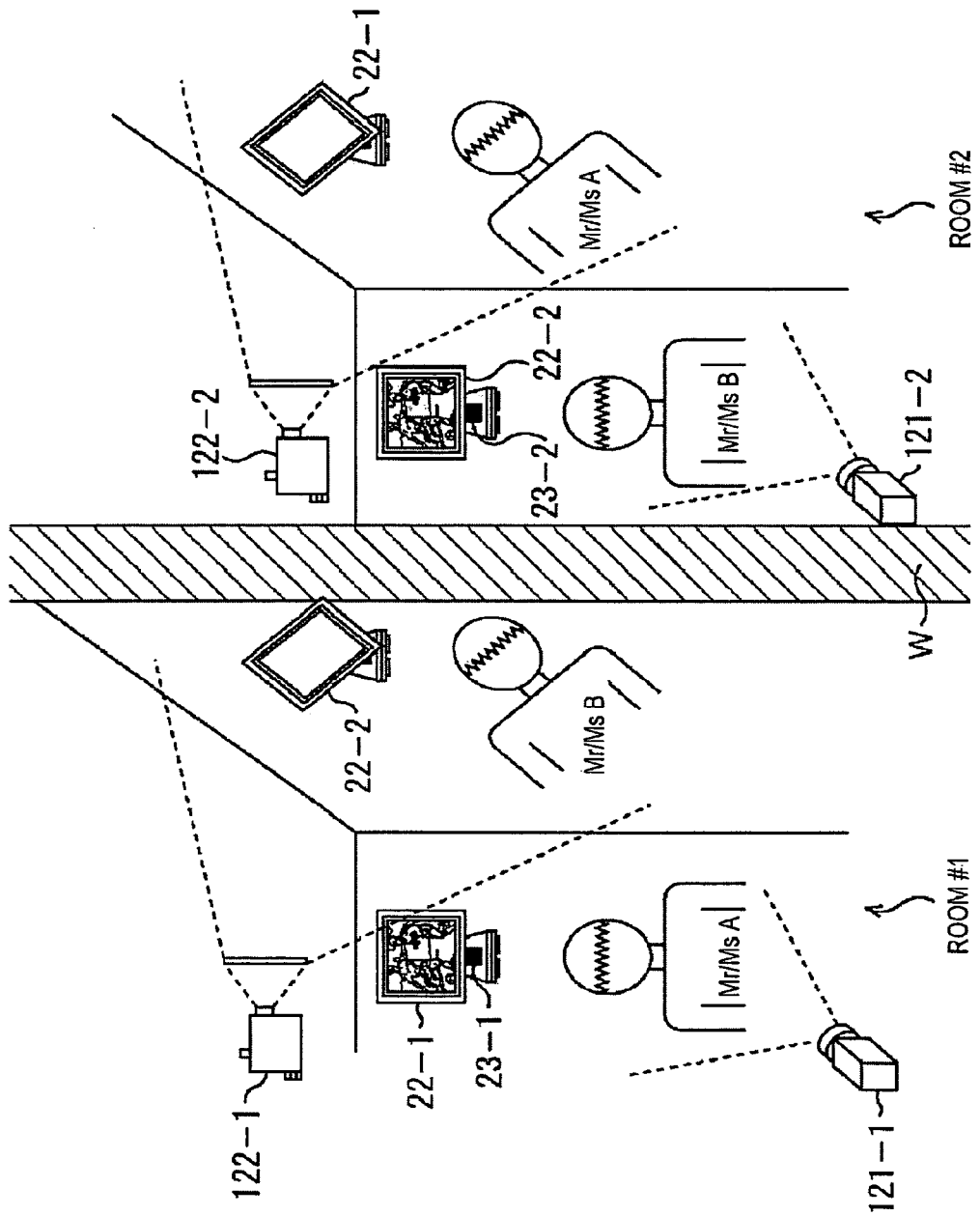
FIG. 14 is a diagram showing the insides of rooms of users in a situation in which the third program output process is performed.

FIG. 14 shows an example of a manner in which, when a user is watching a program in his/her room in the enjoy-together mode, an image of a user watching the same program in another room is projected in the room of the former user.

In the specific example shown in FIG. 14, the room #1 of the user A and the room #2 of the user B are located adjacent to each other. In the room #1, the display 22-1, the speaker 23-1 (integrated with the display 22-1 in the specific example shown in FIG. 14), the camera 121-1, and the projector 122-1 are installed at particular locations, such as on a wall or a ceiling. Similarly, in the room #2, the display 22-2, the speaker 23-2 (integrated with the display 22-2 in the specific example shown in FIG. 14), the camera 121-2, and the projector 122-2 are installed at particular locations, such as on a wall or a ceiling.

Both users A and B are watching a live broadcast program of a soccer game (in this specific case, the genre of the program is soccer) in their rooms #1 and #2, respectively. The broadcast image of the soccer game is displayed on the displays 22-1 and 22-2 installed in the room #1 and room #2, respectively. Furthermore, in FIG. 14, a voice/sound of the live broadcast program of the soccer game is output by the speakers 23-1 and 23-2 disposed integrally with the respective displays 22-1 and 22-2.

The camera 121-1 in the room #1 is taking the image of the user A watching the live broadcast program of the soccer game in the room #1. Similarly, the camera 121-2 in the room #2 is taking the image of the user B watching the same live broadcast program of the soccer game in the room #2.

On a wall W of the room #1, the projector 122-1 projects the image, taken by the camera 121-2 installed in the room #2, of the user B watching the live program of the soccer game. On the other hand, on a wall (on the right-hand side in FIG. 14) of the room #2, the projector 122-2 projects the image, taken by the camera 121-1 installed in the room #1, of the user A watching the live program of the soccer game.

Thus, the user A in the room #1 can feel as if he/she is watching the live program of the soccer game in the same room together with the user B who is actually watching the same program not in the room #1, but in the room #2. Similarly, the user B in the room #2 can feel as if he/she is watching the live program of the soccer game in the same room together with the user A who is actually watching the same program not in the room #2, but in the room #1.

In the above-described receiving apparatus 1 according to the second embodiment, when the enjoy-together mode is turned on or off, the enjoy-together mode is turned on or off for all users (rooms) who watch the same program detected by the tuner 11. Alternatively, the enjoy-together mode may be turned on or off independently for each user (room) so that images of users watching the same program are projected only in the rooms of those users who are watching the program in the enjoy-together mode.

For example, when users A and B are watching a program in their rooms #1 and #2, if both users A and B set the enjoy-together mode in the on-state, then an image of the user B watching the program is projected onto a wall or a floor of the room of the user A, and an image of the user A watching the same program is projected onto a wall or a floor of the room of the user B. However, if both users A and B set the enjoy-together mode in the off-state, an image of a user watching the program is not projected in either room.

In a case in which one of users A and B, for example, user A, sets the enjoy-together mode in the on-state and the other user (user B) sets the enjoy-together mode in the off-state, the image of the user B watching the program is projected on the wall or the floor of the room #1 of the user A. However, the image of the user A watching the program is not projected in the room #2 of the user B who selects the off-state of the enjoy-together mode. When the user B does not want his/her image watching the program to be viewed by any user in other rooms, the user B may set the receiving apparatus 1 such that a user in any other room cannot view the image of the user B watching the program (that is, such that the image of the user B is not projected in any other room).

When three or more users are watching the same program, each projector 122 may project an image of only one of the users watching the same program in other rooms or may project an image of all users watching the same program in other rooms.

For example, when four users A, B, C, and D are watching the same program, the projector 122-1 in the room #1 of the user A may project an image of only one of users B, C, and D watching the same program, or may project an image of all three other users B, C, and D watching the same program.

Figure 15:
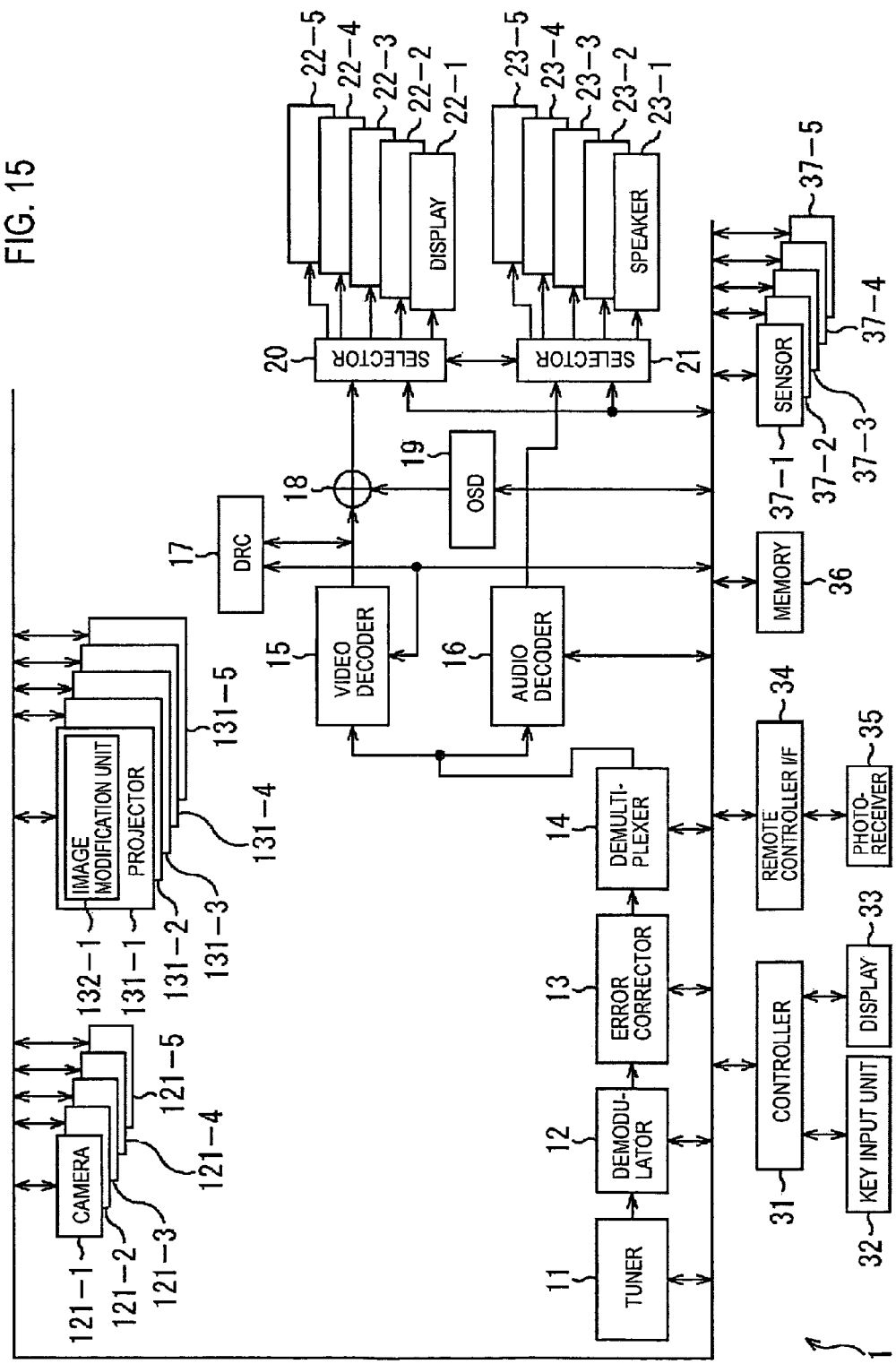
FIG. 15 is a block diagram showing a receiving apparatus according to a third embodiment of the present invention.

FIG. 15 is a diagram showing functional blocks of a receiving apparatus 1 according to a third embodiment, installed in a building of the house system shown in FIG. 1. In FIG. 15, similar parts to those of the second embodiment shown in FIG. 12 are denoted by similar reference numerals, and their further explanation is omitted herein.

The receiving apparatus 1 shown in FIG. 15 is similar to the receiving apparatus 1 according to the second embodiment shown in FIG. 12 except that the projectors 122-1 to 122-5 are replaced with projectors 131-1 to 131-5. In FIG. 12, similar parts to those of the receiving apparatus 1 shown in FIG. 12 are denoted by similar reference numerals, and their further explanation is omitted herein.

Projectors 131-1 to 131-5 are installed in the respective rooms #1 to #5. As with the projectors 122-1 to 122-5 according to the second embodiment, under the control of the controller 31, the projectors 131-1 to 131-5 project images in respective rooms #1 to #5 in accordance with the camera-taken video signals output from the memory 36. That is, under the control of the controller 31, the projectors 131-1 to 131-5 project (display) images of users viewing a program in their rooms onto walls or floors of the rooms #1 to #5 such that an image of a user of a certain room is displayed in a different room.

The projectors 131-1 to 131-5 include image modification units 132-1 to 132-5, respectively. Note that the image modification units 132-2 to 132-5 are not shown in FIG. 15. When it is not necessary to distinguish image modification units 132-1 to 132-5 from each other, the generic representation "image modification unit 132" is used.

Each image modification unit 132 modifies an image of the camera-taken video signals output from the memory 36. The images modified by the image modification units 132-1 to 132-5 are projected in the rooms #1 to #5 by the projectors 131-1 to 131-5. That is, under the control of the controller 31, the images of users viewing the program in other rooms, taken by the cameras 121, are modified and projected (displayed) in the rooms #1 to #5 by the projectors 131-1 to 131-5.

For example, when users A and B wearing pajamas are viewing a live broadcast program of a soccer game in rooms #1 and #2, the projector 131-1 projects an image, taken by the camera 121-2 and output via the memory 36, of the user B viewing the live broadcast program of the soccer game. The projector 131-2 projects an image, taken by the camera 121-1 and output via the memory 36, of the user A viewing the live broadcast program of the soccer game.

The image modification unit 132-1 of the projector 131-1 modifies the image, supplied from the memory 36, of the user B wearing pajamas and viewing the live broadcast program of the soccer game, for example, into an image of the user B wearing a soccer uniform on the basis of an image of a soccer uniform stored in advance in an internal memory (not shown), and the resultant modified image is projected onto a wall of the room #1. Alternatively, the image modification unit 132-1 captures an image of a soccer uniform worn by a supporter in a soccer stadium and watching a soccer game being broadcast, and modifies the image of the user B wearing pajamas and viewing the live broadcast program of the soccer game such that the pajamas of the user B are replaced by the soccer uniform. The resultant modified image is projected onto a wall of the room #1.

Similarly, the image modification unit 132-2 of the projector 131-2 modifies the image of the user A wearing pajamas and viewing the live broadcast program of the soccer game into an image of the user A wearing a soccer uniform, and the resultant modified image is projected onto a wall of the room #2.

Each image modification unit 132 does not necessarily need to be disposed in the corresponding projector 131, but may be disposed separately from the corresponding projector 131.

Now, a program output process (fourth program output process) performed by the receiving apparatus 1 shown in FIG. 15 is described below with reference to the flow chart shown in FIG. 16.

Steps S91 to S100 other than step S99 (FIG. 16) are similar to steps S71 to S79 of the third program output process (FIG. 13). That is, the sixth program output process shown in FIG. 16 has an additional step S99 between step S98 corresponding to step S78 of FIG. 13 and step S100 corresponding to step S79 of FIG. 13. Therefore, steps similar to those of the third program output process shown in FIG. 13 are not described in further detail herein.

In step S99, under the control of the controller 31, the image modification unit 132 starts to modify an image, obtained from a camera-taken image signal output from the memory 36, of a user viewing a program of the user's favorite genre in another room. The process then proceeds to step S100. In the above step S99, for example, the camera-taken image of a user wearing pajamas is modified such that the user is shown wearing a soccer uniform.

In step S100, under the control of the controller 31, the projector 131 starts to project (display) the image modified in step S99. Thereafter, the process is ended. Thus, when a plurality of users are watching a live broadcast program of a soccer game, in each room of a user watching the broadcast program of the soccer game, an image is displayed of another user wearing a soccer uniform and watching the same soccer game in another room.

Thus, each user watching a live broadcast program of the soccer game in his/her room can feel as if he/she is watching the soccer game together with other users. This also allows each user watching a live broadcast program of the soccer game in his/her room to feel as if he/she is watching the soccer game in the soccer stadium.

Thus, in the third embodiment, as described above, digital broadcast programs received by the receiving apparatus 1 shown in FIG. 15 are automatically presented to users depending on the contents of the broadcast programs, and users can enjoy the presented programs of the users' favorite genres without having to perform any operations.

Figure 17:
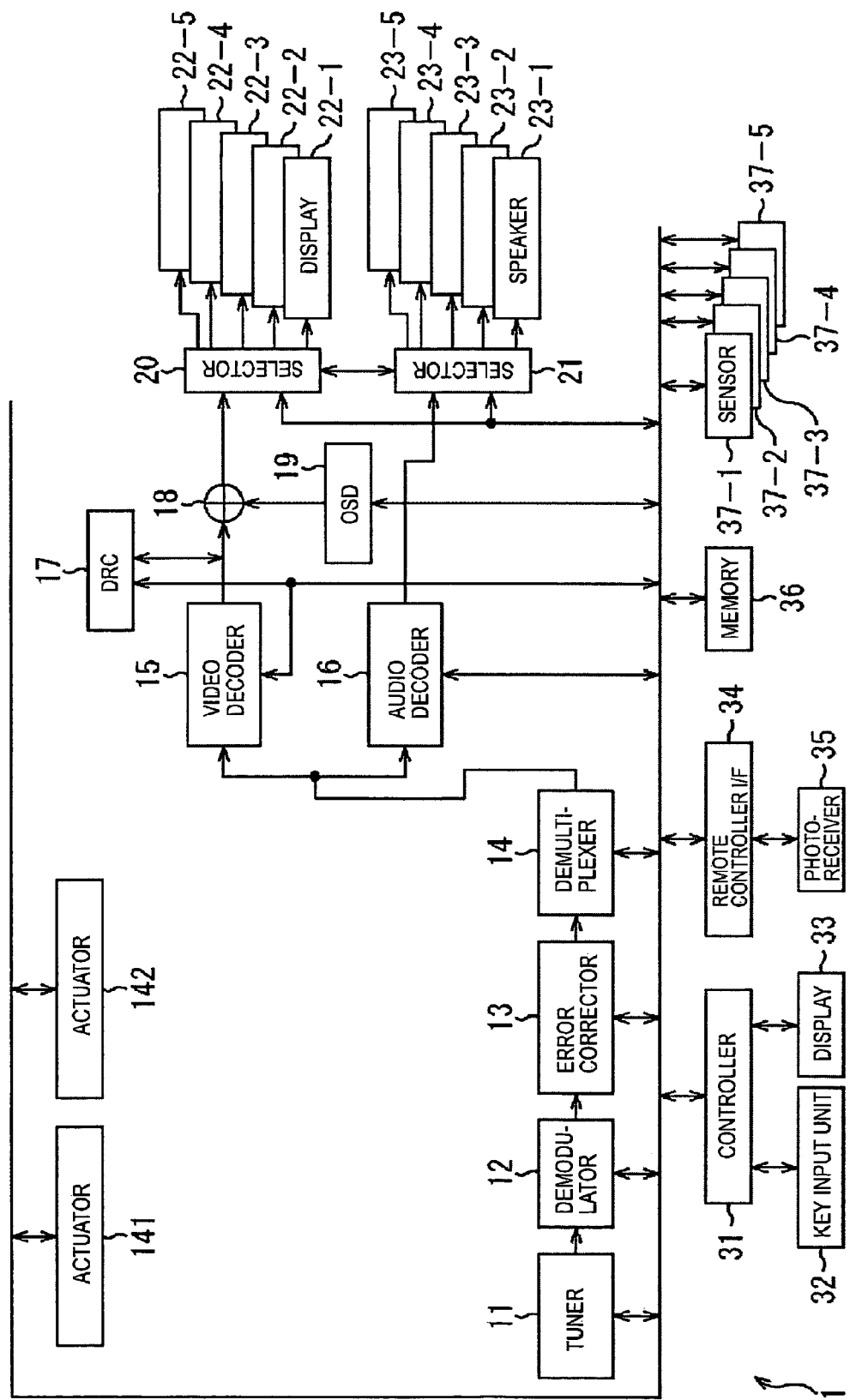
FIG. 17 is a block diagram showing a receiving apparatus according to a fourth embodiment of the present invention.

FIG. 17 is a diagram showing functional blocks of a receiving apparatus 1 according to a fourth embodiment, installed in a building of the house system shown in FIG. 1. In FIG. 17, similar parts to those of the first embodiment shown in FIG. 2 are denoted by similar reference numerals, and their further explanation is omitted herein.

The receiving apparatus 1 shown in FIG. 17 is similar to that shown in FIG. 2, except that the receiving apparatus 1 additionally includes actuators 141 and 142.

Under the control of the controller 31, the actuators 141 and 142 drive walls partitioning adjacent rooms such that the walls are removed. More specifically, under the control of the controller 31, the actuator 141 moves a wall W (FIG. 14) between the room #1 of the user A and the room #2 of the user B into a state in which no wall is present between the rooms #1 and #2. Similarly, under the control of the controller 31, the actuator 142 moves a wall (not shown) between the room #4 of the user D and the room #5 of the user E into a state in which no wall is present between the rooms #4 and #5. Herein, it is assumed that the rooms #1 and #2 are adjacent to each other (in a left-to-right direction in the figure), and rooms #4 and #5 are adjacent to each other, but other rooms are not adjacent to each other.

Under the control of the controller 31, the actuators 141 and 142 can move the walls into the original position in which the walls partition adjacent rooms. More specifically, under the control of the controller 31, the actuator 141 moves the wall W removed from the position between the room #1 of the user A and the room #2 of the user B into the original position. Similarly, under the control of the controller 31, the actuator 142 moves the wall removed from the position between the room #4 of the user D and the room #5 of the user E into the original position.

Figure 18:
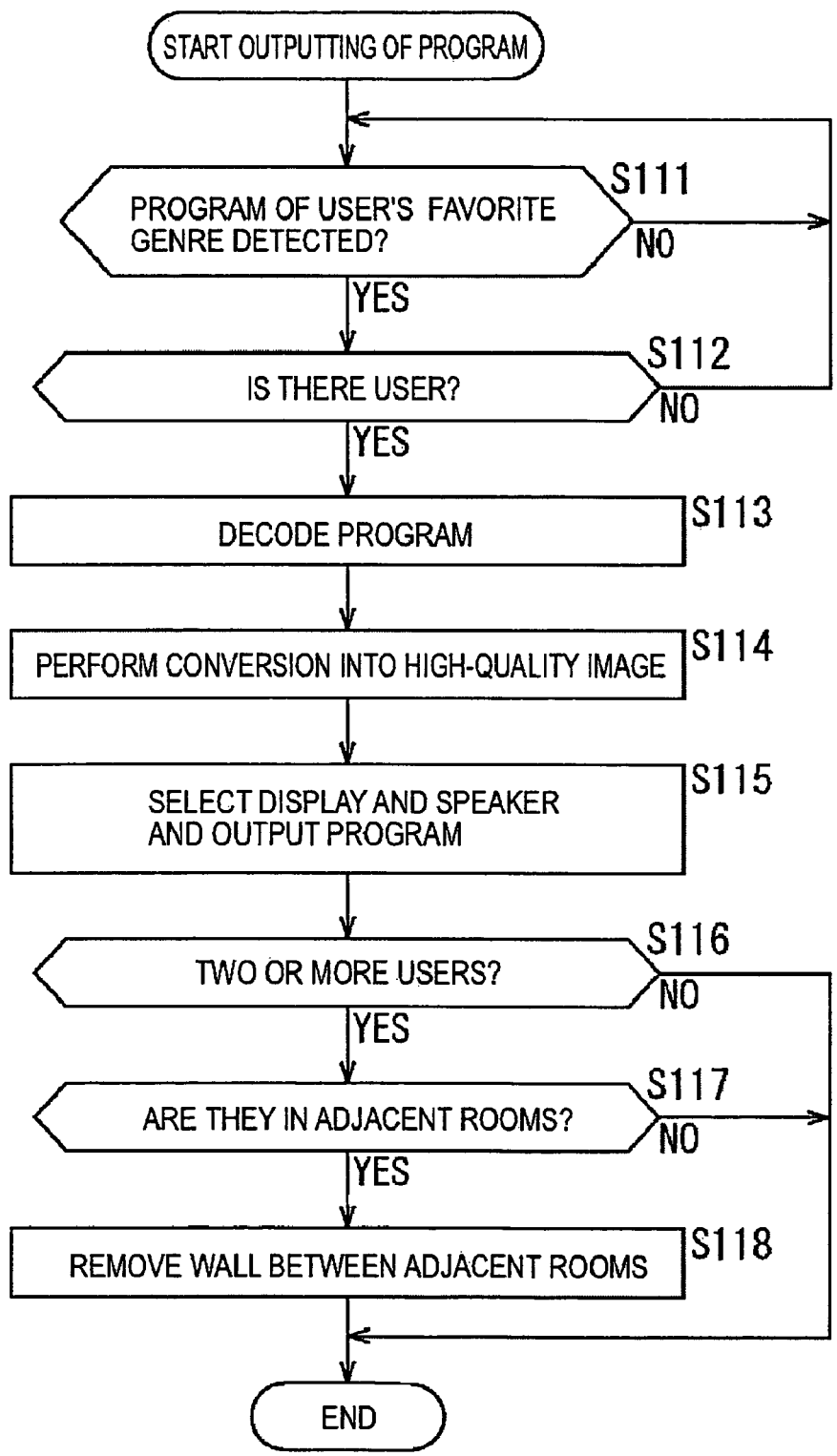
FIG. 18 is a flow chart showing a fifth program output process.

Now, a program output process (fifth program output process) performed by the receiving apparatus 1 according to the fourth embodiment of the present invention is described below with reference to the flow chart shown in FIG. 18.

Steps S111 to 115 (FIG. 18) are similar to steps S31 to 35 of the first program output process (FIG. 10). Therefore, steps similar to those of the first program output process of FIG. 10 are not described in further detail herein.

In step S115, under the control of the controller 31, the selectors 20 and 21 select the displays 22 and speakers 23 installed in the rooms of users who like the genre of the program detected in step S111 and who are detected in step S112 as being present in their rooms. The selector 20 supplies the video data supplied from the mixer 18 to the display 22 selected under the control of the controller 31. Thus, the high-quality image converted from the image of the program detected by the tuner 11 is displayed on the display 22 selected by the selector 20.

The selector 21 supplies the audio data supplied from the audio decoder 16 to the speaker 23 selected under the control of the controller 31. Thus, the voice/sound of the program detected by the tuner 11 is output from the speaker 23 selected by the selector 21.

The process then proceeds to step S116 from step S115. In step S116, the controller 31 determines whether, in the detection process performed in step S112, the presence was detected of a plurality of users who like the genre of the program detected in step S111. If it is determined in step S116 that the presence of a plurality of users was not detected, that is, if it is determined that the result of the detection process in step S112 indicates a user's presence only in one room, then steps S117 and S118 are skipped and the process is ended.

On the other hand, if it is determined in step S116 that the result of the detection process in step S112 indicates the presence of users in a plurality of rooms, then the process proceeds to step S117. In step S117, the controller 31 determines whether the rooms in which the users' presence was detected are adjacent to each other. More specifically, as described above in the first embodiment, if detection signals indicating the presence of users in their rooms are received from sensors 37 installed in the users' rooms, the controller 31 examines the table data stored in the memory 36 shown in FIG. 3B to determine in which room each user is present.

In a case in which it is determined in step S117 that any two rooms in which users are present are not adjacent to each other, the process is ended without proceeding to step S118.

On the other hand, if it is determined in step S117 that two of the rooms in which users are present are detected to be adjacent to each other, the process proceeds to step S118. In step S118, under the control of the controller 31, the actuator 141 or 142 moves a wall partitioning the adjacent rooms into a state in which no wall is present between the two rooms. Thereafter, the process is ended.

For example, if it is determined that users A and B are watching the same program detected by the tuner 11 in the rooms #1 and #2, then, under the control of the controller 31, the actuator 141 moves a wall W between the room #1 of the user A and the room #2 of the user B into a state in which no wall is present between the rooms #1 and #2. On the other hand, if it is determined that users D and E are present in their rooms and watching the same program detected by the tuner 11, then, under the control of the controller 31, the actuator 142 moves a wall between the room #4 of the user D and the room #5 of the user E into a state in which no wall is present between the rooms #4 and #5.

In the fourth embodiment, as described above, when a plurality of users are present in their rooms and watching the same program of their favorite genre, if their rooms are adjacent to each other, a wall between the rooms is removed. Thus, when a plurality users are present in their rooms and watching the same program of their favorite genre, if their rooms are adjacent to each other, the users can enjoy watching the program together in a single room into which the two adjacent rooms are combined. This allows a user to enjoy watching a program of his/her favorite genre together with other users. Enjoying watching the same program together with other users can provide greater satisfaction to the users.

Thus, digital broadcast programs received by the receiving apparatus 1 shown in FIG. 17 are automatically presented to users depending on the contents of the broadcast programs, and the users can enjoy the presented programs of their favorite genres without having to perform any operation.

When a wall is removed and two adjacent rooms are combined into a single room, it becomes possible to project (display) an image of a program onto a wider area of a wall or a floor.

When the program of the users' favorite genre is ended, or when a user issues a wall-return command, the wall may be moved into the original position.

The movement of the wall between adjacent rooms may be controlled depending on whether the enjoy-together mode described above in the second embodiment is on or off. That is, when a user wants to enjoy a program alone, the wall may be kept in the original position without being moved. In this case, the controller 31 activates or deactivates the actuators 141 and 142 depending on the status of the enjoy-together mode stored in the memory 36.

Figure 19:
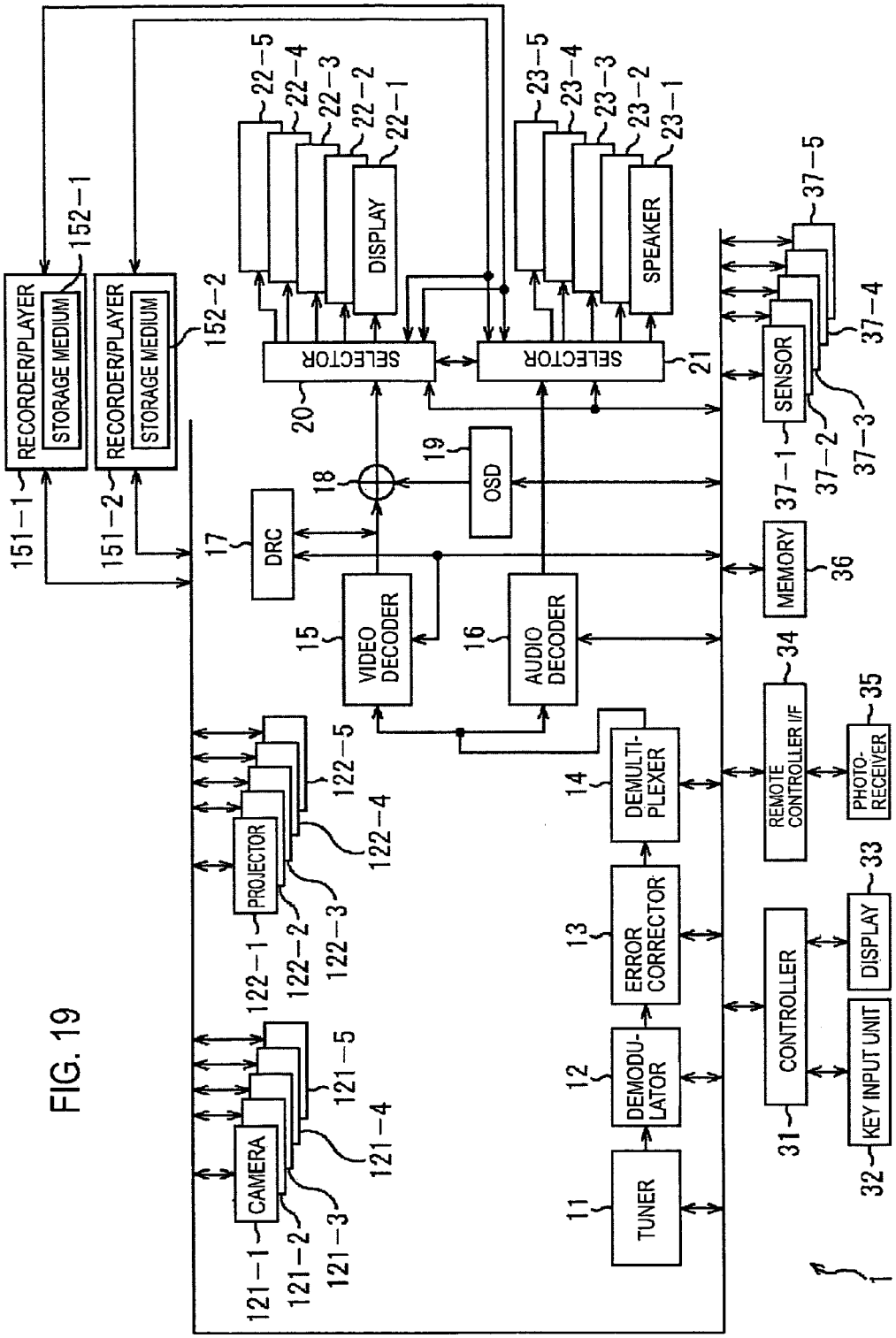
FIG. 19 is a block diagram showing a receiving apparatus according to a fifth embodiment of the present invention.

FIG. 19 is a diagram showing functional blocks of a receiving apparatus 1 according to a fifth embodiment, installed in a building of the house system shown in FIG. 1. In FIG. 19, similar parts to those of the second embodiment shown in FIG. 12 are denoted by similar reference numerals, and their further explanation is omitted herein.

The receiving apparatus 1 shown in FIG. 19 is similar to the receiving apparatus according to the second embodiment described above with reference to FIG. 12, except that the receiving apparatus 1 shown in FIG. 19 additionally includes recorder/players 151-1 and 151-2. Hereinafter, when it is not necessary to distinguish the recorder/player 151-1 and the recorder/player 151-2 from each other (when either one of those can be used), the generic representation "recorder/player 151" will be used.

The recorder/player 151-1 and the recorder/player 151-2 record a video signal and audio data output by the selectors 20 and 21, respectively, on a storage medium 152-1 disposed in the recorder/player 151-1 or a storage medium 152-2 disposed in the recorder/player 151-2. When it is not necessary to distinguish storage media 152-1 to 152-2 from each other, the generic representation "storage medium 152" is used.

Specific examples of storage media 152 are a hard disk, a semiconductor memory, and an optical (magnetooptical) disk, such as a CD-R (Compact Disk-Recordable) and a DVD (Digital Versatile Disk).

When a program of a user's favorite genre is detected, if one or more users who like the genre of the detected program are absent from their rooms, the controller 31 determines whether the remaining storage capacity of the storage medium 152-1 is large enough to store data of the detected program. If the remaining storage capacity is large enough, the controller 31 controls the selectors 20 and 21 such that video data and audio data are supplied to the recorder/player 151-1.

On receiving from the selector 20 the video data of the program of the user's favorite genre detected by the tuner 11, the recorder/player 151-1 records the received video data on the storage medium 152-1. The recorder/player 151-1 also records on the storage medium 152-1 the audio data, supplied from the selector 21, of the program of the user's favorite genre detected by the tuner 11.

The controller 31 supplies data indicating the genre of the program recorded on the storage medium 152-1 to the recorder/player 151-1. The recorder/player 151-1 records the received data on the storage medium 152-1 together with the video data and the audio data of the program.

When a program of a user's favorite genre is detected, if one or more users who like the genre of the detected program are present in their rooms, the controller 31 controls the selectors 20 and 21 to select displays 22 and speakers 23 disposed in the rooms in which the users who like the genre of the detected program are present.

The displays 22 display the image of the program of the genre liked by the users in accordance with the video data supplied from the selector 20. The speakers 23 output a sound/voice of the program of the genre liked by the users in accordance with the audio data supplied from the selector 21.

When a program of a user's favorite genre is detected, if there are two or more users who like the genre of the detected program, the controller 31 determines whether all of those users are present in their rooms. If it is determined that some of those users are not present in their rooms, the controller 31 controls a camera 121, disposed in a room in which a user is present, to take an image of the user viewing the program. Under the control of the controller 31, the video signal of the image of the user viewing the program taken by the camera 121 is output to the recorder/player 151-2.

On receiving the video signal of the image of the user viewing the program from the camera 121, the recorder/player 151-2 records the received video signal on the storage medium 152-2.

If the presence of a user is detected who was not present in his/her room when the program of the user's favorite genre was actually being detected by the tuner 11, that is, if the user who was not present in his/her room when the program of the user's favorite genre was actually being detected by the tuner 11 comes back to his/her room, then the controller 31 controls the selectors 20 and 21 such that the image and the sound/voice of the program of the user's favorite genre detected by the tuner 11 and recorded on the storage medium 152-1 during the absence of the user from his/her room are reproduced and output to the corresponding display 22 and speaker 23.

More specifically, under the control of the controller 31, the recorder/player 151-1 reproduces the video data of the program of the user's favorite genre recorded on the storage medium 152-1 and outputs the reproduced video data to the selector 20. Under the control of the controller 31, the recorder/player 151-1 also reproduces the audio data of the program of the user's favorite genre recorded on the storage medium 152-1 and outputs the reproduced audio data to the selector 21. Under the control of the controller 31, selectors 20 and 21 select a display 22 and a speaker 23 disposed in the room of the user who has come back.

On receiving the video data from the selector 20, the display 22 converts the received video data into, for example, NTSC video data and displays an image according to the resultant video data. Similarly, on receiving the audio data from the selector 21, the speaker 23 converts the received audio data into analog form and outputs a voice/sound.

Furthermore, when the presence of a user is detected who was not present in his/her room during the period in which the program of the user's favorite genre was actually being detected by the tuner 11, that is, when the user who was not present in his/her room when the program of the user's favorite genre was actually being detected by the tuner 11 comes back to his/her room, the controller 31 controls the operation such that the image of users viewing the above-described program in their rooms is reproduced from the storage medium 152-2 and displayed by the display 22.

More specifically, under the control of the controller 31, recorder/player 151-2 reproduces the video signal of the image of the users viewing the above-described program from the storage medium 152-2 and supplies the reproduced video signal to the projector 122. Under the control of the controller 31, the projector 122 disposed in the room of the user who has come back projects the image according to the video signal output from the storage medium 152-2.

Figure 16:
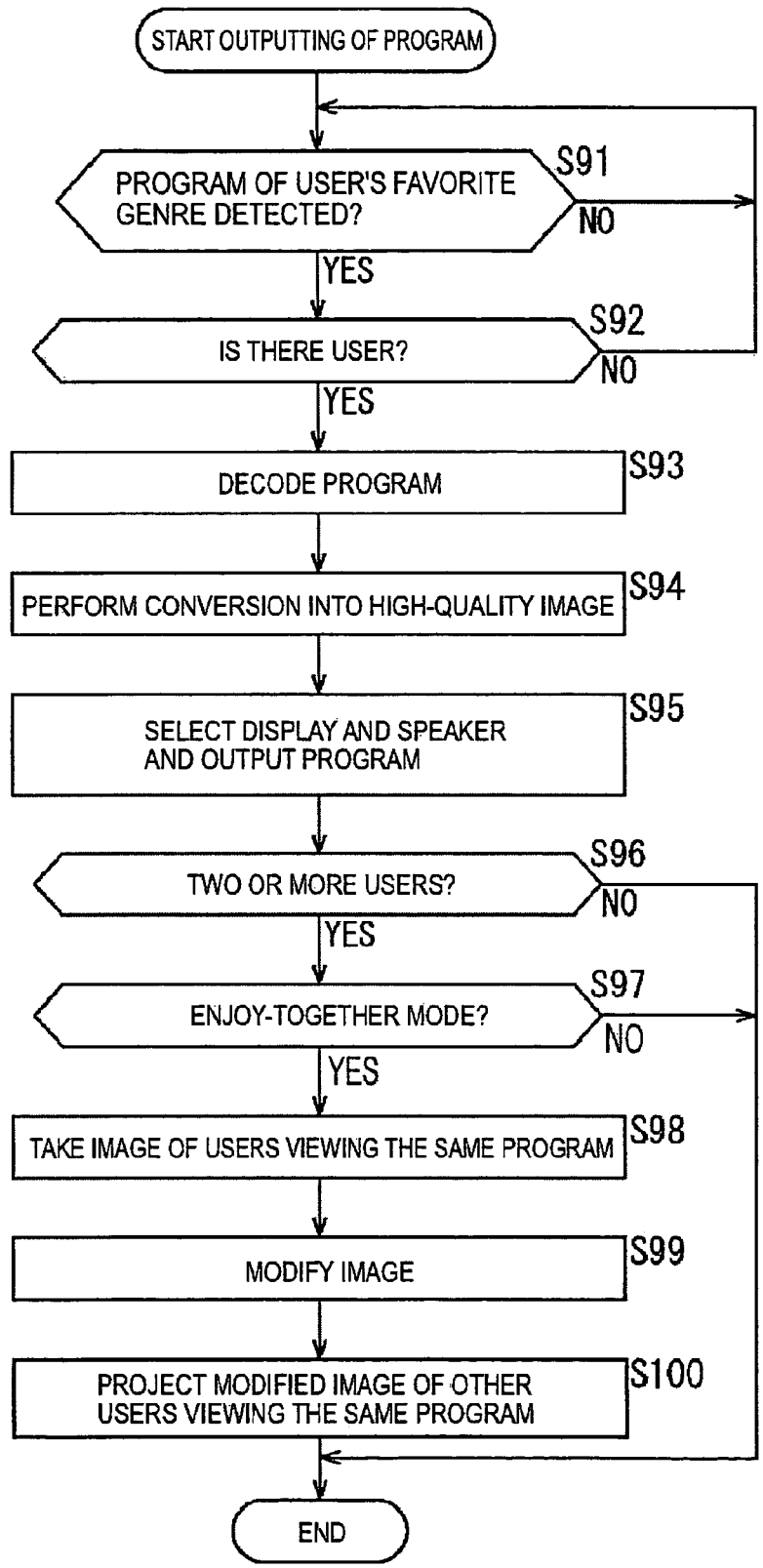
FIG. 16 is a flow chart showing a fourth program output process.

Now, a program output process (sixth program output process) performed by the receiving apparatus 1 shown in FIG. 16 is described below with reference to the flow chart shown in FIG. 20.

First, in step S171, as in step S31 in the first program output process described above, the controller 31 determines whether a program of one of the favorite genres of the users A to E is detected. In a case in which no such program is detected, the process in step S171 is performed repeatedly until a program of one of the favorite genres of the users A to E is detected.

If it is determined in step S171 that a program of any one of the favorite genres of the users A to E is detected, the process proceeds to step S172. In step S172, as in step S32 in the first program output process described above, the controller 31 determines whether users are present in their rooms who like the genre of the program detected in step S171. In a case in which it is determined in step S172 that no users who like the program of the genre detected in step S171 are present in their rooms, the process proceeds to step S173.

In step S173, the controller 31 determines whether the storage medium 152-1 has a storage capacity sufficient to store data. If it is determined in step S173 that the storage medium 152-1 does not have a sufficient storage capacity to store data, the operation flow returns to step S171, and the process is repeated from step S171.

On the other hand, if it is determined in step S173 that the storage medium 152-1 has a sufficient storage capacity to store data, the process proceeds to step S174.

In step S174, a transport stream of the program detected by the tuner 11 is supplied to the demultiplexer 14 via the demodulator 12 and the error correction unit 13. The demultiplexer 14 supplies video data of TS packets of the program of the genre favored by the user to the video decoder 15 and supplies audio data of the TS packets to the audio decoder 16. In a case in which a plurality of programs of different genres match the preference of users in terms of program genres, the program of the genre having a higher priority is selected based on the data indicating the priorities of genres stored in the memory 36 in a similar manner as in the second program output process described above.

The video decoder 15 performs MPEG decoding on the video data of the TS packets received from the demultiplexer 14, and supplies the resultant data to the DRC unit 17.

The audio decoder 16 performs MPEG decoding on the audio data of the TS packets received from the demultiplexer 14, and supplies the resultant data to the selector 21. The process then proceeds to step S175 from step S174.

In step S175, the DRC unit 17 employs the MPEG-decoded video data output from the video decoder 15 as the first video signal, and the DRC unit 17 converts the first image signal into a high-quality video signal (second video signal) and supplies the resultant video signal to the mixer 18. In this step S175, when video data to be superimposed is input to the mixer 18 from the OSD unit 19, the mixer 18 superimposes the video data output from the OSD unit 19 on the high-quality video signal supplied from the DRC unit 17, and supplies the resultant superimposed video signal to the selector 20. However, if video data to be superimposed is not input to the mixer 18 from the OSD unit 19, the mixer 18 directly transfers the high-quality video signal supplied from the DRC unit 17 to the selector 20.

The process then proceeds to step S176 from step S175. In step S176, the controller 31 controls the selectors 20 and 21 to select the recorder/player 151-1. In response, the selector 20 supplies the video data received from the mixer 18 to the recorder/player 151-1, and the selector 21 supplies the audio data received from the audio decoder 16 to the recorder/player 151-1. Also in step S176, the recorder/player 151-1 starts to record on the storage medium 152-1 the video data of the program of the user's favorite genre detected by the tuner 11 and supplied via the selector 20. The recorder/player 151-1 also starts to record on the storage medium 152-1 the audio data of the program of the user's favorite genre detected by the tuner 11 and supplied from the selector 21.

Furthermore, in this step S176, data indicating the genre of the recorded program is supplied from the controller 31 to the recorder/player 151-1 and recorded on the storage medium 152-1. When the end of the video data and the audio data of the program is reached, the recording is stopped. The process then returns to step S171.

On the other hand, in a case in which it is determined in step S172 that a user who likes the genre of the program detected in step S171 is present in his/her room, the process proceeds to step S177.

Steps S177 and S178 are similar to steps S174 and S175 described above. That is, the video data and the audio data of the program detected by the tuner 11 are MPEG-decoded, and the video data output from the video decoder 15 is converted into high-quality video data.

The process then proceeds to step S179 from step S178. In step S179, under the control of the controller 31, the selectors 20 and 21 select the displays 22 and speakers 23 installed in the rooms of the users who like the genre of program detected in step S171 and who are detected in step S172 as being present in their rooms. The selector 20 supplies the video data from the mixer 18 to the display 22 selected under the control of the controller 31. Thus, the high-quality image converted from the image of the program detected by the tuner 11 is displayed on the display 22 selected by the selector 20.

The selector 21 supplies the audio data from the audio decoder 16 to the speaker 23 selected under the control of the controller 31. Thus, the voice/sound of the program detected by the tuner 11 is output from the speaker 23 selected by the selector 21.

The process then proceeds to step S180 from step S179. In step S180, the controller 31 controls the cameras 121 in all rooms in which the user's presence has been detected in step S172 to take images of the users viewing the program. That is, in response to the detection of the user's presence in a room, the camera 121 installed in that room starts to take an image of the user viewing the program detected in step S171. The process then proceeds to step S181. The video signal of the image taken by the camera 121 is supplied to the memory 36 and temporarily stored therein.

In step S181, the controller 31 determines whether some of the users who like the genre of the program detected in step S171 are absent from their rooms. If it is determined that none of the users who like the genre of the program detected in step S171 are absent from their rooms, that is, if it is determined that all users who like the genre of the program detected in step S171 are present in their rooms, the process is ended without performing steps S182 to S184.

On the other hand, if it is determined in step S181 that some of the users who like the genre of the program detected in step S171 are absent from their rooms, the process proceeds to step S182. In step S182, the controller 31 determines whether the storage medium 152-1 has a storage capacity sufficient to store data. If it is determined in step S182 that the storage medium 152-1 does not have a sufficient storage capacity to store data, the operation flow returns to step S171, and the process is repeated from step S171.

On the other hand, if it is determined in step S182 that the storage medium 152-1 has a sufficient storage capacity to store data, the process proceeds to step S183.

In step S183, the recorder/player 151-1 starts to record, on the storage medium 152-1, the video data and audio data that have been subjected to the MPEG-decoding in step S177. Furthermore, in this step S183, data indicating the genre of the program detected by the tuner 11 is also recorded on the storage medium 152-1 by the recorder/player 151-1.

The process then proceeds to step S184 from step S183. In step S184, under the control of the controller 31, the recorder/player 151-2 starts to record, on the storage medium 152-2, the video signal of the image of the users viewing the program taken in step S180. At the end of the broadcast program whose video data and audio data are being recorded in step S183, the recording started in step S183 and the recording started in step S184 are ended, and the program output process is ended.

In the sixth program output process described above, a video signal of the image of a user viewing a program is taken in step S180 by the camera 121 and supplied in step S184 to the recorder/player 151-2, which records the supplied video signal on the storage medium 152-2. Alternatively, the video signal of the image of the user viewing the program, taken by the camera 121, may be converted into a high-quality video signal, and the resultant high-quality video signal may be stored on the storage medium 152-2. In this case, the controller 31 supplies the video signal output from the camera 121 to the DRC unit 17. On receiving the video signal from the camera 121, the DRC unit 17 employs the received video signal as the first vide signal and converts the first video signal into a high-quality video signal (second video signal). The resultant high-quality video signal associated with the image of the user viewing the program is supplied to the recorder/player 151-2 and recorded on the storage medium 152-2.

In the receiving apparatus 1 shown in FIG. 19, the recorder/player 151-1 records the data of the program detected by the tuner 11 on the storage medium 152-1, and the recorder/player 151-2 records the video signal associated with the image of the user viewing the program on the storage medium 152-2. Alternatively, the recorder/player 151-1 may record the video signal associated with the image of the user viewing the program on the storage medium 152-1, and the recorder/player 151-2 may record the data of the program detected by the tuner 11 on the storage medium 152-2.

When the recorder/player 151 records a video signal of an image of a user viewing a program on the storage medium 152, a voice/sound in a room in which the user is present may be captured using a microphone disposed in the room and may be recorded together with the video signal on the storage medium 152.

Although the receiving apparatus 1 shown in FIG. 19 includes two recorder/players 151, the number of recorder/players 151 is not limited to two. The receiving apparatus 1 may include three or more recorder/players 151.

Under the control of the controller 31, data indicating the status (on or off) of the enjoy-together mode may also be recorded on the storage medium 152-2.

In the sixth program output process, as described above, when a program that matches the preference of users in terms of program genres is detected, if all users who like the genre of the detected program are present in their rooms, a video image and an audio signal of the program detected by the tuner 11 are output via the displays 22 and the speakers 23 in all rooms in which the users are present.

On the other hand, when a program that matches the preference of users in terms of program genres is detected, if all users who like the genre of the detected program are absent from their rooms, the program detected by the tuner 11 is recorded on the storage medium 152 of the recorder/player 151.

When a program that matches the preference of users in terms of program genres is detected and some of the users who like the genre of the detected program are present in their rooms, but the other users are absent from their rooms, the video image and the audio signal of the program detected by the tuner 11 are output via the displays 22 and the speakers 23 only in those rooms in which the users are present. The program detected by the tuner 11 is recorded on a storage medium 152 by the recorder/player 151 for use by a user who is not present in his/her room. The video data of the image of users viewing the program detected by the tuner 11 in their rooms is also recorded on the storage medium 152 of the recorder/player 151.

Thus, digital broadcast programs received by the receiving apparatus 1 shown in FIG. 19 are automatically presented to the users depending on the contents of the broadcast programs, and the users can enjoy the presented programs of their favorite genres without having to perform any operations.

As described above, when a program that matches the preference of the users A to E in terms of program genres is detected, if some of the users who like the genre of the detected program are absent from their rooms, the program detected by the tuner 11 is recorded on the storage medium 152 of the recorder/player 151. If some of the users who like the genre of the program are present in their rooms when the program is detected, an image of each user in a state of viewing the program in his/her room is taken and the resultant video data is also recorded on the storage medium 152 of the recorder/player 151.

When a user who likes the genre of the program recorded on the storage medium 152 comes back to his/her room, the user is likely to want to watch the program that was broadcast during his absence.

Figure 21:
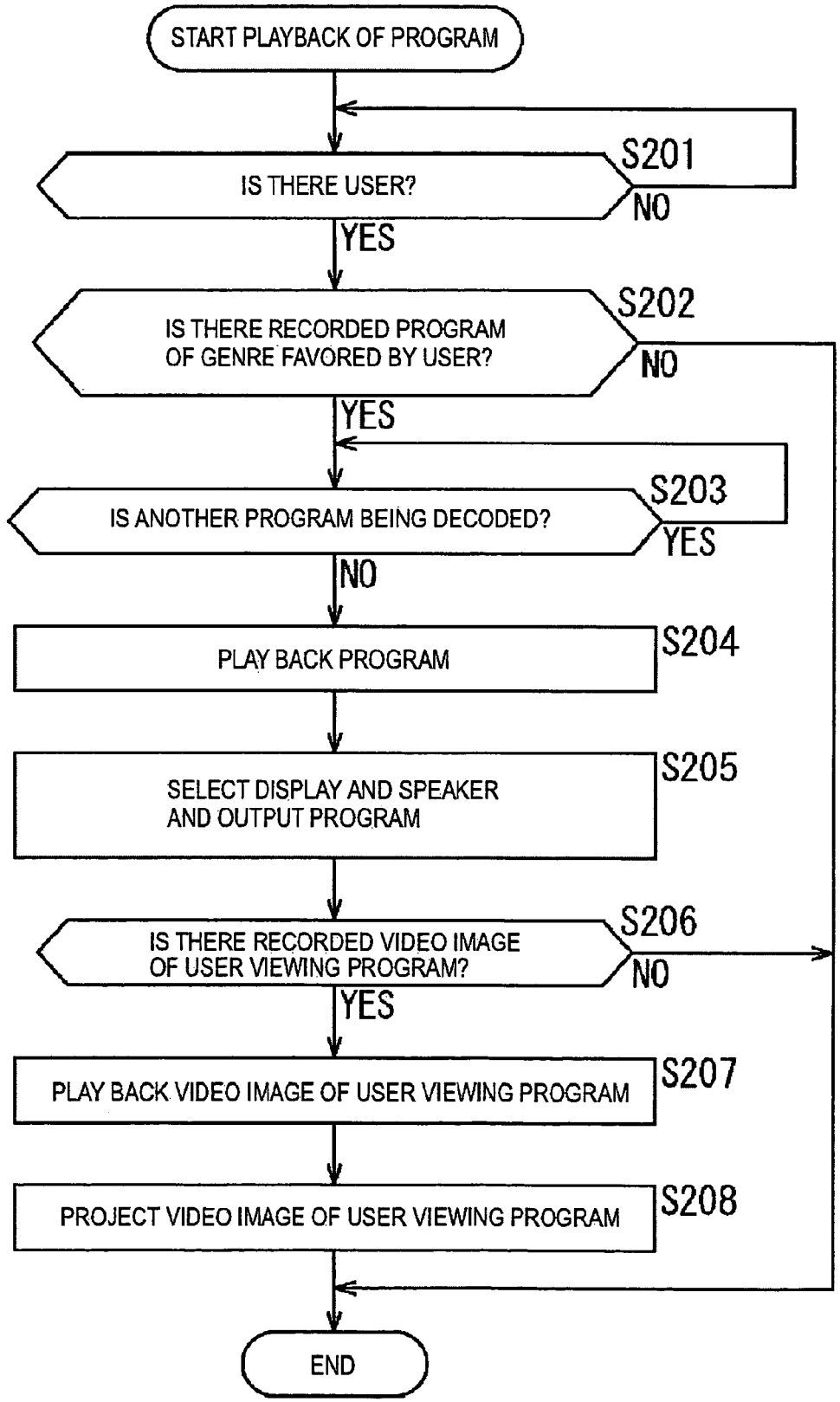
FIG. 21 is a flow chart showing a first program reproducing process.

Thus, when the user who likes the genre of the program recorded on the storage medium 152 comes back to his/her room, the receiving apparatus 1 performs a program playback process (first program playback process) to play back the program recorded on the storage medium 152, as will be described below with reference to the flow chart shown in FIG. 21. This program playback process is performed only when at least some program data is recorded on the storage medium 152.

First, in step S201, the controller 31 determines whether a user is present in some of rooms #1 to #5. If it is determined that no users are present in any room, step S201 is performed repeatedly until a user is detected.

If it is determined in step S201 that a user is present in some of the rooms #1 to #5, the process proceeds to step S202. In step S202, the controller 31 detects programs recorded on the storage medium 152 of the recorder/player 151. The controller 31 then determines whether a program that meets the preference of the user whose presence is detected in step S201 in terms of program genres is recorded on the storage medium 152. If it is determined in step S202 that the storage medium 151 has no program which satisfies the preference of the user whose return was detected in terms of program genres, the process is ended without performing steps S203 to S208.

On the other hand, if it is determined in step S202 that programs recorded on the storage medium 152 include a program which meets the returning user's preference in terms of program genres, the process proceeds to step S203. In step S203, the controller 31 determines whether a program currently being broadcast is being decoded. That is, the controller determines whether a program which meets a user's preference in terms of program genres has been detected by the tuner 11, and a transport stream of the program is being decoded by the video decoder 15 and the audio decoder 16 via the demodulator 12, the error correction unit 13, and the demultiplexer 14.

If it is determined in step S203 that a program being broadcast is being decoded, the process remains in step S203 to continue the decoding. The decoding in step S203 is continued until the broadcast program is ended.

That is, in the decision step S203, if it is determined that at least one of users A to E is present in his/her room (#1 to #5) and a program that meets the preference of that user in terms of program genres is currently being broadcast, the program is output in the room of that user (some or all of users A to E). However, if no program that meets the preference of the user present in his/her room is currently being broadcast, the process proceeds to step S204.

That is, if it is determined in step S203 that no program currently being broadcast is being decoded, the process proceeds to step S204. In step S204, under the control of the controller 31, the recorder/player 151 reproduces, from the storage medium 152, the program which meets the preference of the user in terms of program genre and whose existence on the storage medium 152 was detected in step S202. Under the control of the controller 31, the recorder/player 151 starts to reproduce the video data and the audio data of the program recorded on the storage medium 152 and outputs them to the selectors 20 and 21, respectively. The process then proceeds to step S205.

In step S205, the controller 31 controls the selectors 20 and 21 to select the display 22 and the speaker 23 disposed in the room of the user who likes the program played back in step S204 and whose presence was detected in step S201. The selector 20 supplies the video data supplied from the recorder/player 151 to the display 22 selected under the control of the controller 31. Thus, the video data supplied from the recorder/player 151 is displayed on the display 22 selected by the selector 20.

The selector 21 supplies the audio data supplied from the recorder/player 151 to the speaker 23 selected according to the command from the controller 31. Thus, the audio data (voice/sound) supplied from the recorder/player 151 is output from the speaker 23 selected by the selector 21.

The process then proceeds to step S206 from step S205. In step S206, the controller 31 determines whether a video signal of an image of a user viewing the program being played back in step S204 is recorded on the storage medium 152 of the recorder/player 151. If it is determined in step S206 that a video signal of an image of a user viewing the program being played back in step S204 is not recorded on the storage medium 152 of the recorder/player 151, the process is ended without performing steps S207 and S208.

On the other hand, if it is determined in step S206 that a video signal of an image of a user viewing the program being played back in step S204 is recorded on the storage medium 152 of the recorder/player 151, the process proceeds to step S207. In step S207, under the control of the controller 31, the video signal of the image of the user viewing the program being played back in step S204 is reproduced from the storage medium 152 of the recorder/player 151. That is, under the control of the controller 31, the recorder/player 151 starts to reproduce, from the storage medium 152, the video signal of the image of the user in the state of watching the program which was broadcast when the user was present in his/her room and which is now being played back in step S204. The reproduced video signal is output (supplied) to the projector 122 installed in the room of the user who likes the program being played back in step S204 and whose presence was detected in step S201.

The process then proceeds to step S208 from step S207. In step S208, the projector 122 starts to project, onto a wall of the room, the image of the user viewing the program in accordance with the video signal supplied from the recorder/player 151. When the end of the video data and the audio data of the program being played back is reached, the process is ended.

In the first program playback process, as described above, when a user returns to his/her room, the user can watch a program which meets his/her preference in terms of program genre and which was broadcast when the user was absent from his/her room.

When a program is detected by the tuner 11 and recorded on the storage medium 152, if some user is watching this program, the image of the user watching the program is also recorded on the storage medium 152, and the image of the user watching the program is projected onto a wall of a room of another user when the latter user returns to his/her room and watches the program played back from the storage medium. Thus, when a user watches a program played back from the storage medium 152, the user can also feel as if he/she is enjoying watching the program together with other users.

Note that the program recorded on the storage medium 152 does not necessarily need to be played back immediately after a user returns to his/her room. Instead, playback of the program recorded on the storage medium 152 may be started after the elapse of a particular period of time since the arrival of the user at his/her room. This allows the user to have an extra time before he/she starts to watch the program.

An image conversion process using the DRC unit 17 may be inserted between steps S204 and S205 or between steps S207 and S08 so that, for example, an image of a program and/or an image of a user viewing a program are converted into high-quality form and the resultant high-quality images are displayed.

Steps 206 to S208 may be skipped such that only the image and the sound/voice of the program recorded on the storage medium 152 are played back without playing back the image of the user viewing the program.

Figure 22:
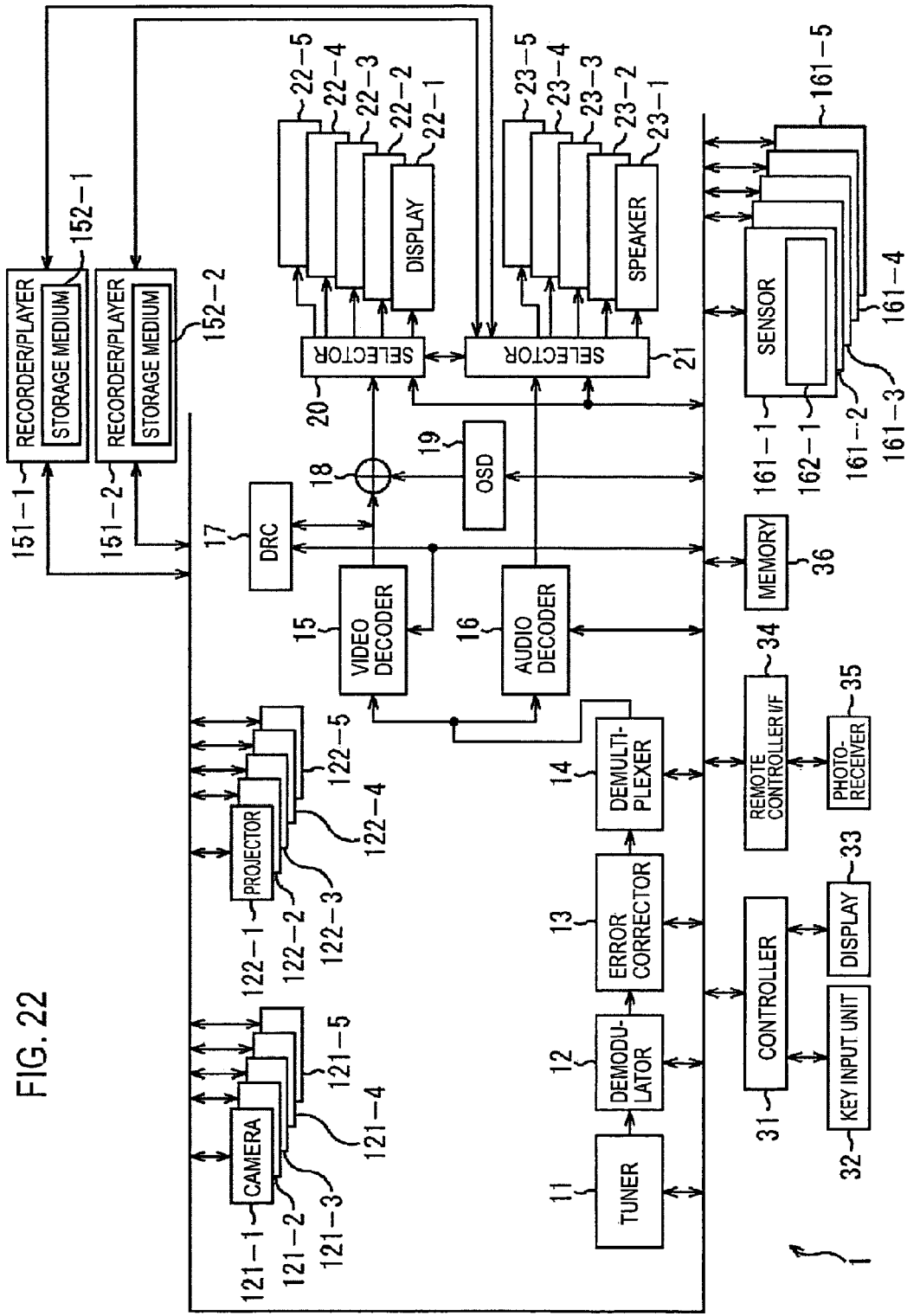
FIG. 22 is a block diagram showing a receiving apparatus according to a sixth embodiment of the present invention.

FIG. 22 is a diagram showing functional blocks of a receiving apparatus 1 according to a sixth embodiment, installed in a building of the house system shown in FIG. 1. In FIG. 22, similar parts to those of the fifth embodiment shown in FIG. 19 are denoted by similar reference numerals, and their further explanation is omitted herein.

In the previous embodiments, the sensors 37-1 to 37-5 are used to detect whether users are present in their rooms. If a user is detected to be present in his/her room, the controller 31 determines in which room the user is present by determining the location of the sensor that detected the presence of the user on the basis of the correspondence table (FIG. 3B) stored in the memory 36. That is, in the previous embodiments, there is a one-to-one correspondence between the sensors 37 and the users. For example, as described above with reference to FIGS. 3A and 3B, when a user is present in the room #1 (if the sensor 37-1 detects the presence of a user), it can be determined that the user must be user A. In response, the controller 31 detects a program that meets the preference of the user A in terms of the program genre.

However, there is a possibility that another user (for example, user B) is present in the room #1. In this case, it is necessary to detect a program that meets the preference of not user A, but user B, and to output the detected program to the display 22 and the speaker installed in the room #1.

In view of the above, in a sixth embodiment described below, when the presence of a user in some of the rooms #1 to #5 is detected, the controller 31 determines who is present in that room. In other words, the controller 31 determines which user is present in which room.

FIG. 22 shows a receiving apparatus 1 according to the sixth embodiment of the present invention. This receiving apparatus 1 is similar to the receiving apparatus 1 shown in FIG. 19 except that the sensors 37-1 to 37-5 are replaced with sensors 161-1 to 161-5.

As with the sensors 37-1 to 37-5 according to the previous embodiments, the sensors 161-1 to 161-5 are disposed in the respective rooms #1 to #5 such that the presence of users in the respective rooms #1 to #5 can be detected by those sensors. For example, a digital camera or the like capable of taking an image of the inside of each room may be used as each of the sensors 161-1 to 161-5.

The sensors 161-1 to 161-5 include recognition units 162-1 to 162-5, respectively, although recognition units 162-2 to 162-5 are not shown in FIG. 22.

Each of the recognition units 162-1 to 162-5 extracts an object from a foreground part of an image taken by each of the sensors 161-1 to 161-5 (hereinafter, such an image will also be referred to as a camera-taken image). Each of the recognition units 162-1 to 162-5 identifies a user present in each room on the basis of pattern information A to E stored in advance in the memory 36. The pattern information A to E will be described later with reference to FIG. 23. More specifically, each of the recognition units 162-1 to 162-5 compares the object extracted from the camera-taken image with the pattern information A to E stored in the memory 36 and determines which user is present in which room based on a match between the object image and the pattern information A to E.

Each of the sensors 161-1 to 161-5 sends, to the controller 31, a detection signal indicating which user is present in the room in which each sensor 161-1 to 161-5 is disposed.

When it is not necessary to distinguish sensors 161-1 to 161-5 from each other, the generic representation "sensor 161" is used. When it is not necessary to distinguish recognition units 162-1 to 162-5 from each other, the generic representation "recognition unit 162" is used.

Because a digital camera or the like is used as each sensor 161 as described above, each sensor 161 can also be used as the camera 161.

FIG. 23 shows the recognition information used to identify the respective users A to E. Note that the recognition information is stored in the memory 36 shown in FIG. 22.

That is, as shown in FIG. 23, pattern information A to E corresponding to the users A to E are stored in the memory 36. For example, each of the pattern information A to E may be an image file of a face of a corresponding one of the users A to E or may be data indicating the feature value of the face image.

The recognition units 162-1 to 162-5 identify users present in the respective rooms #1 to #5 by comparing (matching) the images (feature values of images) taken in the respective rooms with the pattern information A to E.

Now, a program output process (seventh program output process) performed by the receiving apparatus 1 according to the sixth embodiment of the present invention is described below with reference to the flow chart shown in FIG. 24.

First, in step S221, the controller 31 determines whether the digital broadcast signal supplied from the antenna to the tuner 11 includes a program of any one of the genres described in the genre preference table which is, as described earlier with reference to FIG. 3A, stored in the memory 36 and which indicates the favorite genres of the users A to E. In a case in which no program is detected, the process in step S221 is performed repeatedly until a program of one of the favorite genres of the users A to E is detected.

If it is determined in step S221 that a program of any one of the favorite genres of the users A to E has been detected, the process proceeds to step S222. In step S222, under the controls of the controller 31, the sensors 161-1 to 161-5 perform image recognition. In this image recognition process, the camera-taken images of the rooms #1 to #5 are compared with pattern information A to E (that is, matching is evaluated). The process then proceeds to step S223 from step S222. The image recognition process in step S222 will be described in further detail below with reference to FIG. 25.

In step S223, the controller 31 determines in which one of rooms #1 to #5 a user is present who likes the genre of the program detected in step S221. More specifically, in step S223, the controller 31 determines in which one of rooms #1 to #5 a user is present who likes the genre of the program detected in step S221 depending on which sensor 161 generates a detection signal indicating the presence of the user (A to E) in his/her room. In a case in which it is determined in step S223 that no users who like the genre of the program detected in step S221 are present in their rooms, the process returns to step S221.

On the other hand, if it is determined in step S223 that a user who likes the genre of the program detected in step S221 is present in one of rooms #1 to #5, the process proceeds to step S224. In step S224, a transport stream of the program detected in step S221 is supplied to the demultiplexer 14 via the demodulator 12 and the error correction unit 13. The demultiplexer 14 supplies video data of TS packets of the program of the genre favored by the user to the video decoder 15 and supplies audio data of the TS packets to the audio decoder 16.

The video decoder 15 performs MPEG decoding on the video data of the TS packets received from the demultiplexer 14, and supplies the resultant data to the DRC unit 17.

The audio decoder 16 performs MPEG decoding on the audio data of the TS packets received from the demultiplexer 14, and supplies the resultant data to the selector 21. The process then proceeds to step S225 from step S224.

In step S225, the DRC unit 17 employs the MPEG-decoded video data output from the video decoder 15 as the first video signal, and the DRC unit 17 converts the first image signal into a high-quality video signal (second video signal) and supplies the resultant video signal to the mixer 18. When video data to be superimposed is input to the mixer 18 from the OSD unit 19, the mixer 18 superimposes the video data output from the OSD unit 19 on the high-quality video signal supplied from the DRC unit 17, and supplies the resultant superimposed video signal to the selector 20. In a case in which no video data to be superimposed is input to the mixer 18 from the OSD unit 19, the mixer 18 directly transfers the high-quality video signal supplied from the DRC unit 17 to the selector 20.

The process then proceeds to step S226 from step S225. In step S226, under the control of the controller 31, the selectors 20 and 21 select the displays 22 and speakers 23 installed in the rooms in which the users who like the genre of the program detected in step S221 have been detected in step S223. The selector 20 supplies the video data supplied from the mixer 18 to the display 22 selected under the control of the controller 31. Thus, the high-quality image converted from the image of the program detected by the tuner 11 is displayed on the display 22 selected by the selector 20.

The selector 21 supplies the audio data supplied from the audio decoder 16 to the speaker 23 selected under the control of the controller 31. Thus, the voice/sound of the program detected by the tuner 11 is output from the speaker 23 selected by the selector 21.

In the seventh program output process described above, when a program meeting the preference of users in terms of genre is detected, a determination is made as to whether a user who likes the genre of the detected program is present in a room. If the user is present, the room in which the user is currently present is identified. The detected program is output to the display 22 and the speaker 23 installed in the room in which the user is present.

Thus, a user can watch a detected program of his/her favorite genre regardless of which room the user is currently present in.

Figure 24:
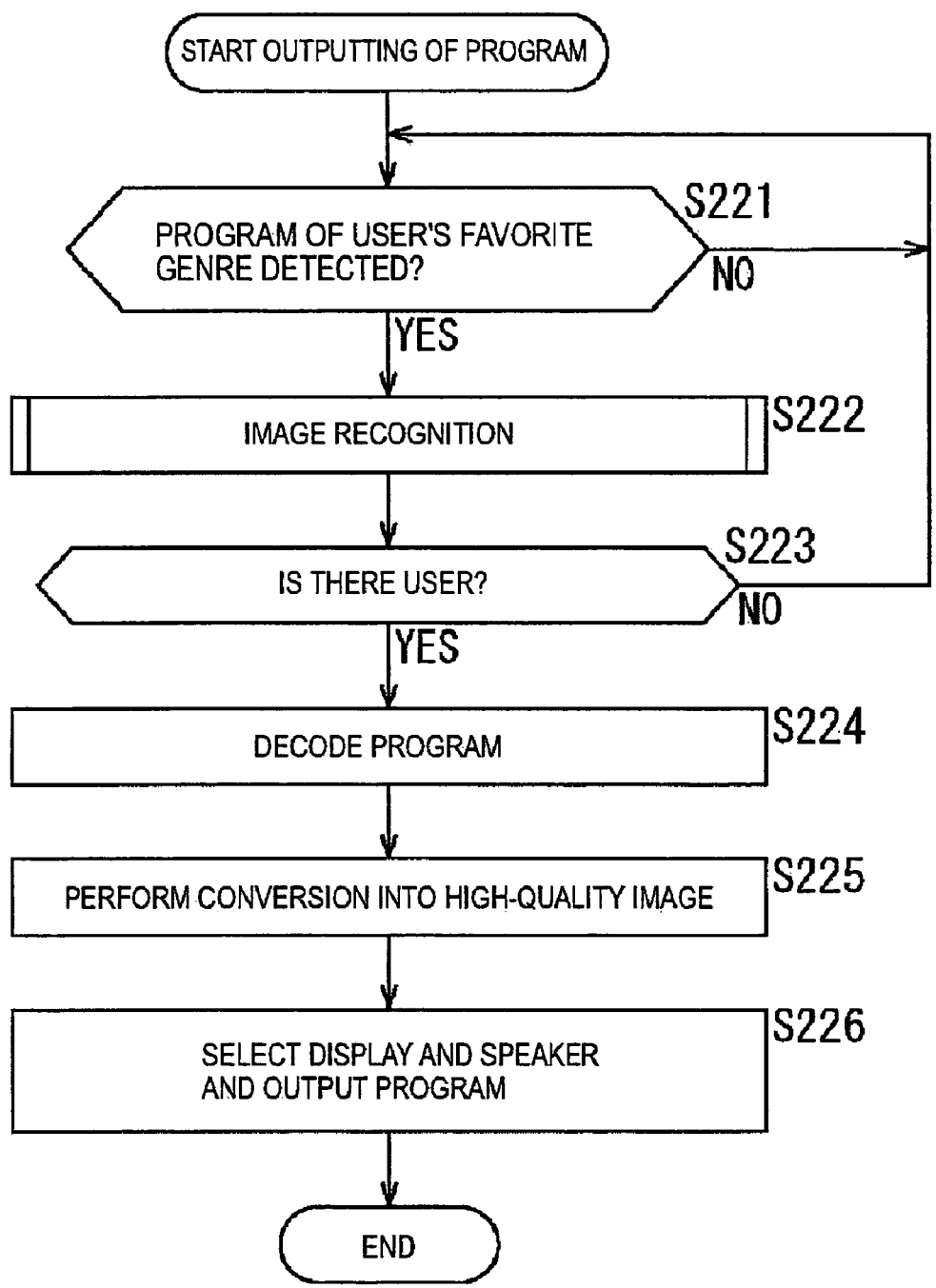
FIG. 24 is a flow chart showing a seventh program output process.
Figure 25:
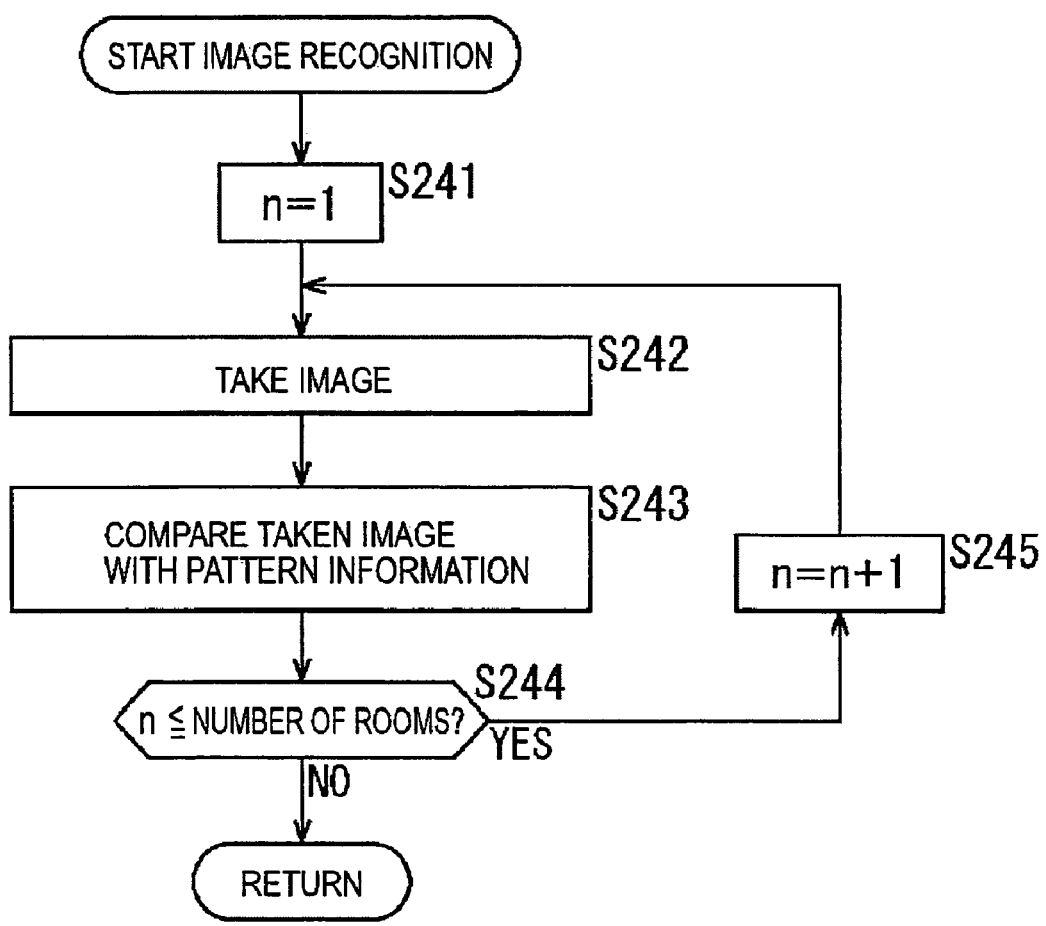
FIG. 25 is a flow chart showing an image recognition process.

Now, the image recognition process in step S222 of FIG. 24 is described below with reference to the flow chart shown in FIG. 25.

In step S241, the sensor 161 sets 1 into an internal variable n. The process then proceeds to step S242.

In step S242, the sensor 161 takes an image of a room #n, and the process proceeds to step S243. Note that the image data taken in step S242 is temporarily stored, for example, in an internal memory (not shown).

In step S243, the recognition unit 162 of the sensor 161 extracts an object from the image taken in step S242, and compares the extracted object with pattern information A to E stored in the memory 36 (matching thereof with respect to pattern information A to E is evaluated). On the basis of the comparison result, the recognition unit 162 determines whether one or more of the users A to E are present in the room #n. If it is determined that one or more of the users A to E are present in the room #n (if the users present in the room #n are identified), the sensor 161 supplies to the controller 31 a detection signal indicating which user is present in which room.

The process then proceeds to step S244 from step S243. In step S244, the sensor 161 determines whether the variable n is equal to or smaller than the number of rooms (the number of rooms is 5 in this specific embedment). If it is determined that the variable n is equal to or smaller than the number of rooms, the process proceeds to step S245. In step S245, the sensor 161 increments the internal variable n by 1. Thereafter, the process returns to step S242.

On the other hand, if it is determined in step S244 that the variable n is greater than the number of rooms, the process returns to the program output process shown in FIG. 24.

In the image recognition process described above, the image of a room is taken sequentially in order from room #1 to #5, and the image is compared with pattern information A to E stored in the memory 36 (matching between them is evaluated). Alternatively, the recognition units 162-1 to 162-5 of the respective sensors 161-1 to 161-5 may simultaneously (in parallel) compare images of respective rooms #1 to #5 with pattern information A to E stored in the memory 36 (to evaluate matching among them).

Now, a program output process (eighth program output process) performed by the receiving apparatus 1 according to a modification of the sixth embodiment of the present invention is described below with reference to the flow chart shown in FIG. 26.

First, in step S261, as in step S171 in the sixth program output process described above, the controller 31 determines whether a program of one of the favorite genres of the users. A to E is detected. In a case in which no program is detected, the process in step S261 is performed repeatedly until a program of one of the favorite genres of the users A to E is detected.

If it is determined in step S261 that a program of a genre meeting the preference of users A to E is detected, the process proceeds to step S262. In step S262, under the control of the controller 31, the sensors 161-1 to 161-5 perform image recognition described above with reference to FIG. 25. In this image recognition process, the camera-taken images of the rooms #1 to #5 are compared with pattern information A to E (that is, matching is evaluated).

The process then proceeds to step S263 from step S262. In step S263, the controller 31 determines in which one of rooms #1 to #5 a user is present who likes the genre of the program detected in step S261. More specifically, in step S263, the controller 31 determines in which one of rooms #1 to #5 a user is present who likes the genre of the program detected in step S261 depending on which sensor 161 generates a detection signal indicating the presence of the user (A to E) in his/her room. In a case in which it is determined in step S263 that no users who like the genre of the program detected in step S261 are present in their rooms, the process proceeds to step S264.

In step S264, the controller 31 determines whether the storage medium 152-1 has a sufficient storage capacity to store data. If it is determined in step S264 that the storage medium 152-1 does not have a sufficient storage capacity to store data, the processing flow returns to step S261 and the process is repeated from step S261.

On the other hand, if it is determined in step S264 that the storage medium 152-1 has a sufficient storage capacity to store data, the process proceeds to step S265.

Figure 20:
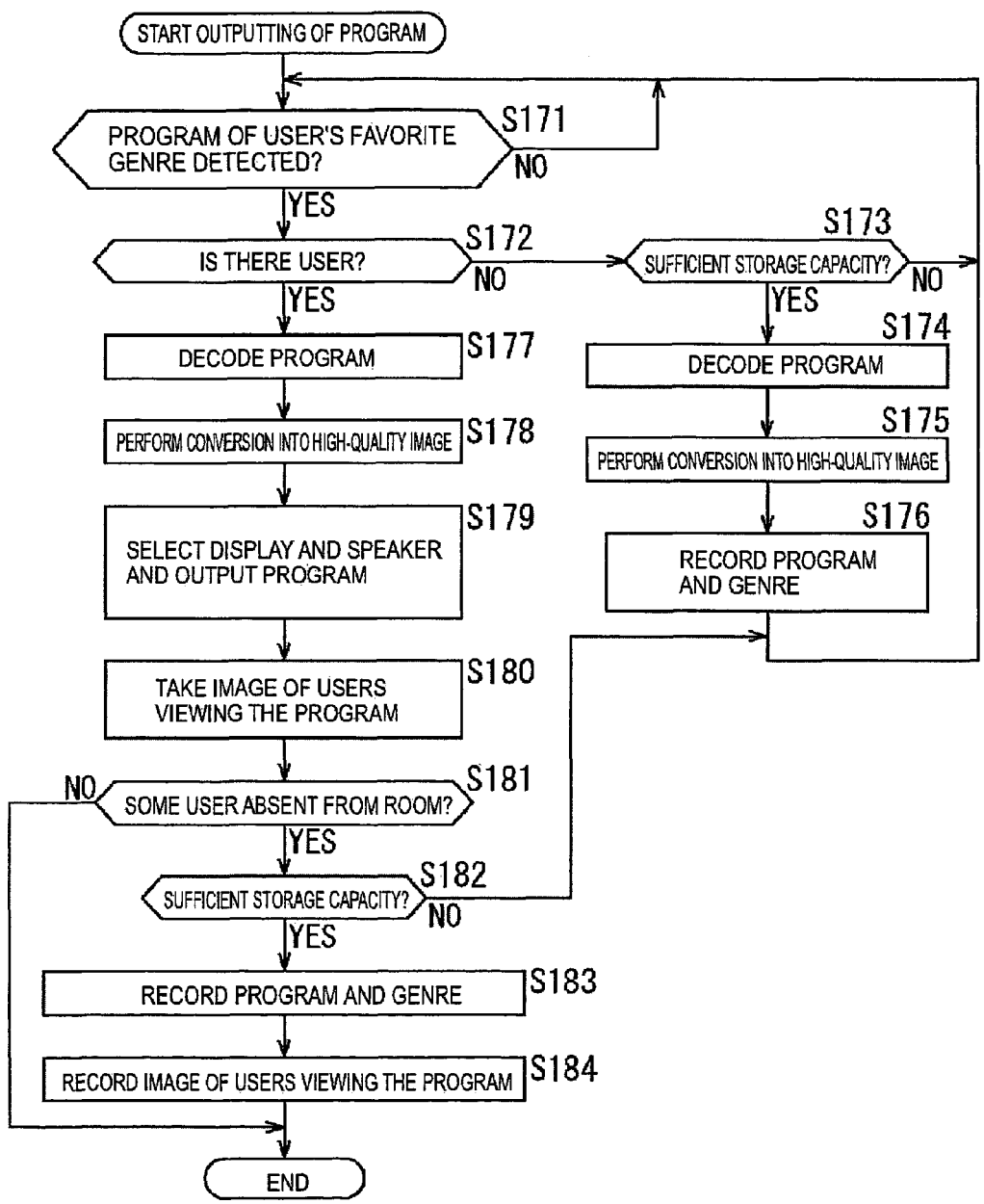
FIG. 20 is a flow chart showing a sixth program output process.

Steps S265 to S267 are similar to steps S174 to S176 of the sixth program output process (FIG. 20). That is, in steps S265 to S267, the video data of the program detected in the tuner 11 is converted into high-quality video data (video signal) and recorded on the storage medium 152-1 of the recorder/player 151-1. The audio data of the program detected by the tuner 11 is also recorded on the storage medium 152-1 of the recorder/player 151-1.

Furthermore, data indicating the genre of the recorded program is supplied from the controller 31 to the recorder/player 151-1 and recorded on the storage medium 152-1. When the end of the video data and the audio data of the program is reached, the recording is stopped. The process then returns from step S267 to step S261.

On the other hand, in a case in which it is determined in step S263 that one or more of the users who like the genre of the program detected in step S261 are present in some of rooms #1 to #5, the process proceeds to step S268.

Steps S268 and S269 are similar to steps S265 and S266, respectively, described above, and thus a duplicated description thereof is not given herein.

The process then proceeds to step S270 from step S269. In step S270, under the control of the controller 31, the selectors 20 and 21 select the displays 22 and speakers 23 installed in the rooms of the users who like the genre of program detected in step S261 and who were detected in step S263 as being present in their rooms. The selector 20 supplies the video data supplied from the mixer 18 to the display 22 selected under the control of the controller 31. Thus, the high-quality image converted from the image of the program detected by the tuner 11 is displayed on the display 22 selected by the selector 20.

The selector 21 supplies the audio data supplied from the audio decoder 16 to the speaker 23 selected under the control of the controller 31. Thus, the voice/sound of the program detected by the tuner 11 is output from the speaker 23 selected by the selector 21.

The process then proceeds to step S271 from step S270. In step S271, under the control of the controller 31, the cameras 121 installed in the rooms in which the users who like the genre of the program detected in step S261 have been detected in step S263 take images of the users viewing the program. That is, in response to the detection of a user's presence in a room, the camera 121 installed in that room starts to take an image of the user viewing the program detected in step S261 under the control of the controller 31. The process then proceeds to step S272. The video signal of the image taken by the camera 121 is supplied to the memory 36 and temporarily stored therein.

In step S272, the controller 31 determines whether some of the users who like the genre of the program detected in step S261 are absent from their rooms. If it is determined that all of the users favoring the genre of the program detected in step S261 are present in their rooms, that is, if it is determined that all of the users who like the genre of the program detected in step S261 are present in their rooms, the process is ended without performing steps S273 to S275.

On the other hand, in the case in which it is determined in step S272 that some of the users who like the genre of the program detected in step S261 are absent from their rooms, the process proceeds to step S273. In step S273, the controller 31 determines whether the storage medium 152-1 has a storage capacity sufficient to store data. If it is determined in step S272 that the storage medium 152-1 does not have a sufficient storage capacity to store data, the operation flow returns to step S261, and the process is repeated from step S261.

On the other hand, if it is determined in step S273 that the storage medium 152-1 has a sufficient storage capacity to store data, the process proceeds to step S274.

In step S274, as in step S267 described above, the recorder/player 151-1 starts to record, on the storage medium 152-1, the video data and audio data that have been subjected to the MPEG-decoding in step S268. Furthermore, in this step S274, data indicating the genre of the program detected by the tuner 11 is also recorded on the storage medium 152-1 by the recorder/player 151-1.

The process then proceeds to step S275 from step S274. In step S275, under the control of the controller 31, the recorder/player 151-2 starts to record, on the storage medium 152-2, the video signal of the image of the users viewing the program taken in step S271. At the end of the broadcast program whose video data and audio data are being recorded in step S274, the recording started in step S274 and the recording started in step S275 are ended, and the program output process is ended.

In this program output process, as described above, when a program of a user's favorite genre is detected, a determination is made as to in which room a user who likes the genre of the detected program is present. If the user is detected to be present in a particular room of the rooms #1 to #5, an image and a sound/voice of the program detected by the tuner 11 are output via the display 22 and the speaker 23 in the identified room.

When a program of a user's favorite genre is detected, if no users who like the genre of the detected program are present in their rooms, the program detected by the tuner 11 is recorded on the storage medium 152 of the recorder/player 151.

On the other hand, when a program of a user's favorite genre is detected, if some of the users who like the genre of the detected program are present in some of rooms #1 to #5, but others of the users who like the genre of the detected program are not present in any of the rooms #1 to #5, an image and a sound/voice of the program detected by the tuner 11 are output via the display 22 and the speaker 23 in the rooms in which the users are present. Furthermore, the program detected by the tuner 11 is recorded on the storage medium 152 by the recorder/player 151 for use by those users who were not present in their rooms. The video data of the image of the users viewing the program detected by the tuner 11 is also recorded on the storage medium 152 of the recorder/player 151.

Figure 26:
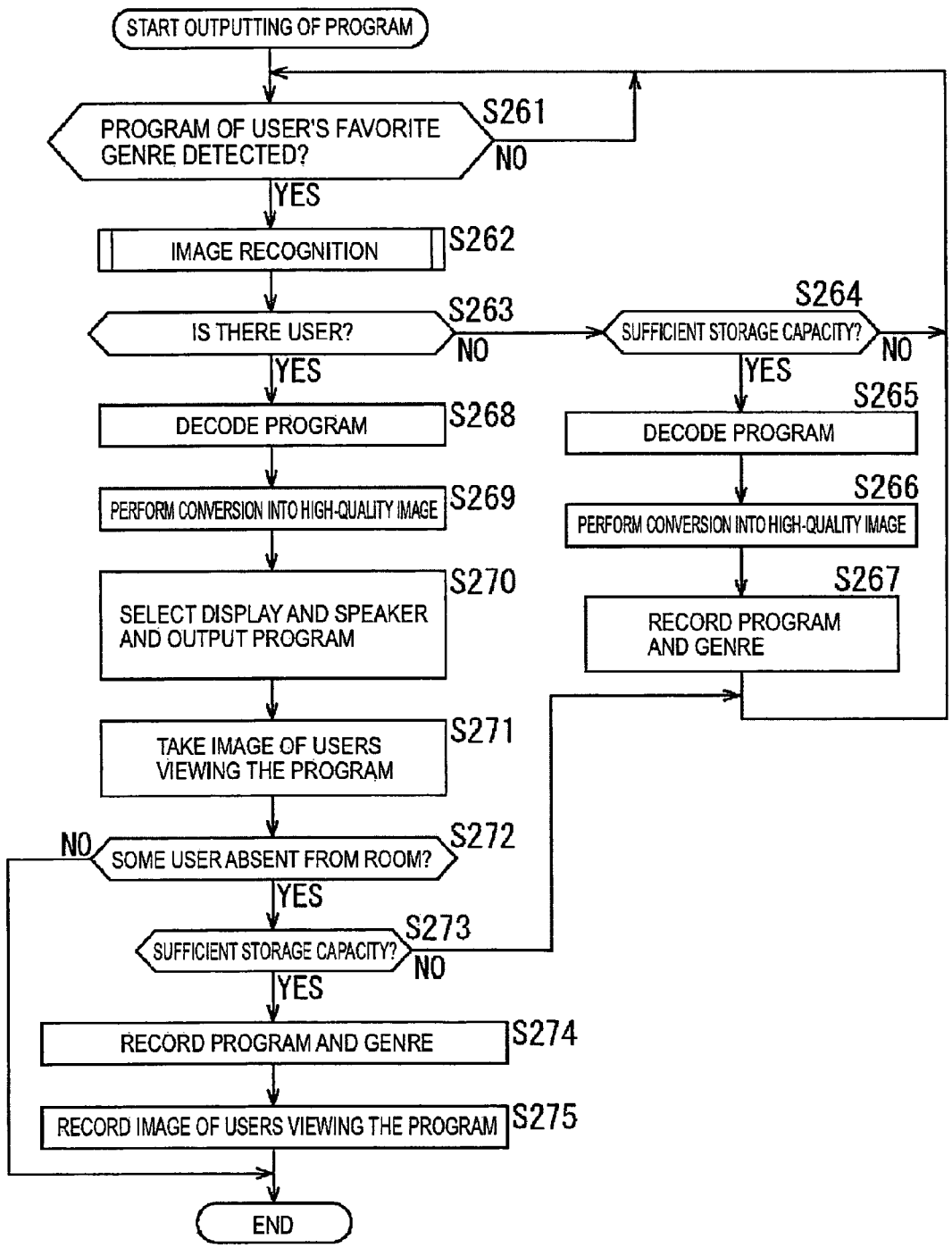
FIG. 26 is a flow chart showing an eighth program output process.
Figure 27:
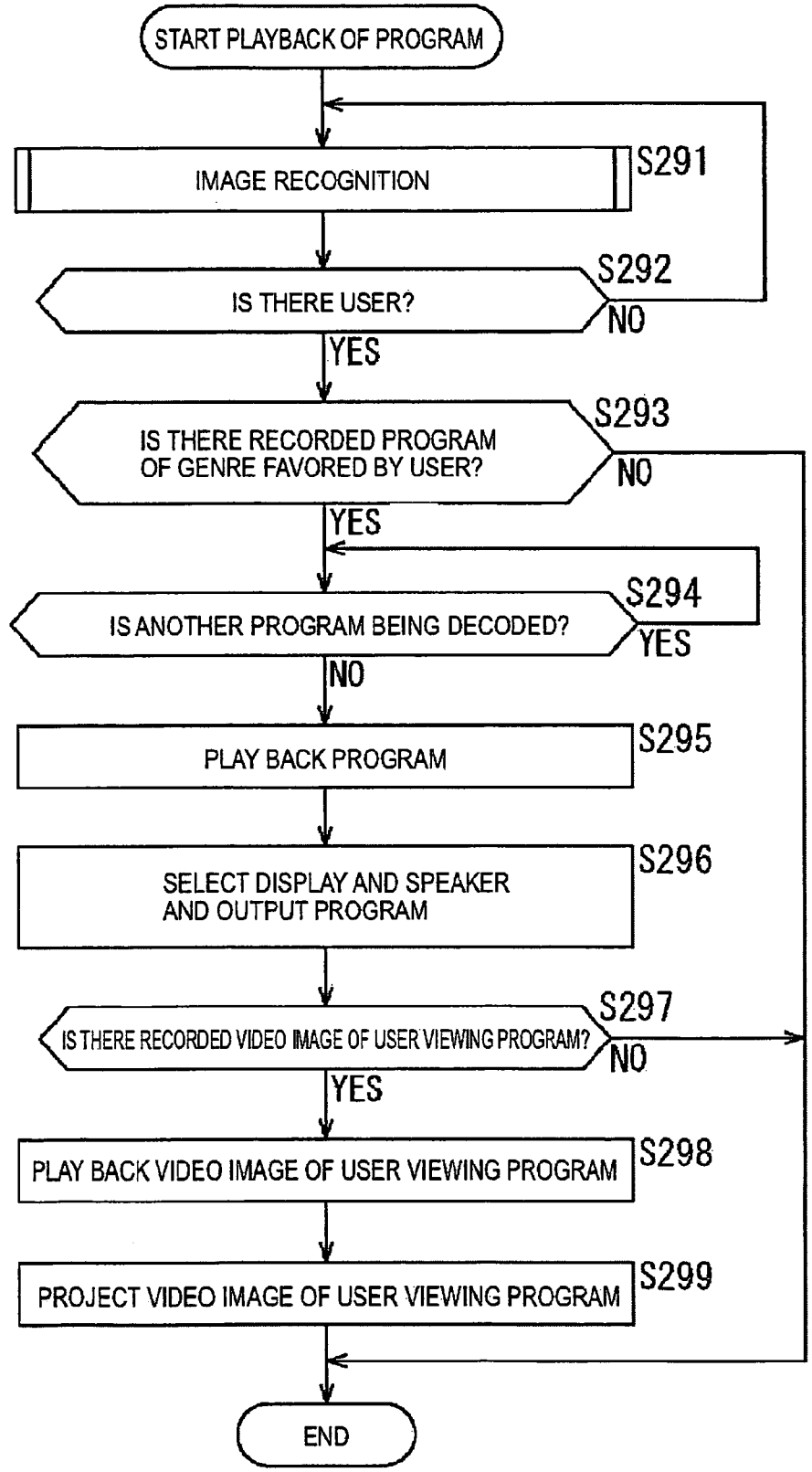
FIG. 27 is a flow chart showing a second program reproducing process.

When at least one of the users who like the genre of the program detected by the tuner 11 and who were not present in their rooms returns to his/her room, which is one of the rooms #1 to #5 of the users A to E, the video data of the program detected by the tuner 11 and recorded on the storage medium 152 of the recorder/player 151 in the program output process shown in FIG. 26, and the video data of the image of the users viewing the program in their rooms are played back in a program playback process (second program playback process) as will be described below with reference to FIG. 27.

First, in step S291, under the control of the controller 31, the sensors 161-1 to 161-5 perform image recognition described above with reference to FIG. 25. In this image recognition process, the images of the users in the rooms #1 to #5 are compared with pattern information A to E to determine which user is present in which room. The sensor 161 sends to the controller 31 a detection signal indicating which user is present in which room.

The process then proceeds to step S292 from step S291. In step S292, the controller 31 determines where users are present in some of rooms #1 to #5 on the basis of whether a detection signal is received from the sensor 161 installed in each room. If it is determined that no user is present in any room, the process returns to step S291.

If it is determined in step S292 that a user is present in at least one of the rooms #1 to #5, the process proceeds to step S293. In step S293, the controller 31 detects programs recorded on the storage medium 152 of the recorder/player 151. The controller 31 then determines whether a program of a favorite genre of the user detected in step S292 as being present in at least one of the rooms #1 to #5 is recorded on the storage medium 152. If it is determined in step S293 that no program of a genre liked by the user detected to be present in his/her room is recorded on the storage medium 152, the process is ended without performing steps S294 to S299.

On the other hand, if it is determined in step S293 that a program of a genre liked by the user detected to be present in his/her room is recorded on the storage medium 152, the process proceeds to step S294. In step S294, the controller 31 determines whether a program currently being broadcast is being decoded. That is, the controller determines whether a program that meets the user's preference in terms of program genres has been detected by the tuner 11, and whether a transport stream of the program is being decoded by the video decoder 15 and the audio decoder 16 via the demodulator 12, the error correction unit 13, and the demultiplexer 14.

If it is determined in step S294 that a program being broadcast is being decoded, the process remains in step S294 to continue the decoding. The decoding in step S294 is continued until the broadcast program is ended.

On the other hand, if it is determined in step S294 that no program currently being broadcast is being decoded, the process proceeds to step S295. In step S295, under the control of the controller 31, the recorder/player 151 reproduces, from the storage medium 152, the program which meets the preference of the user in terms of program genre and whose existence on the storage medium 152 was detected in step S293. Under the control of the controller 31, the recorder/player 151 starts to reproduce the video data and the audio data of the program recorded on the storage medium 152 and outputs them to the selectors 20 and 21. The process then proceeds to step S296.

In step S296, under the control of the controller 31, the selectors 20 and 21 select a display 22 and a speaker 23 installed in a room in which a user's presence was detected in step S292 and whose preference in terms of program genre is matched by the genre of the program being reproduced in step S295. The selector 20 supplies the video data supplied from the recorder/player 151 to the display 22 selected according to the command from the controller 31. Thus, the video data supplied from the recorder/player 151 is displayed on the display 22 selected by the selector 20.

The selector 21 supplies the audio data supplied from the recorder/player 151 to the speaker 23 selected according to the command from the controller 31. Thus, the audio data (voice/sound) supplied from the recorder/player 151 is output from the speaker 23 selected by the selector 21.

The process then proceeds to step S297 from step S296. In step S297, the controller 31 determines whether a video signal of the image of users viewing the program being played back in step S295 is recorded on the storage medium 152 of the recorder/player 151. If it is determined in step S297 that a video signal of the image of users viewing the program being played back in step S295 is not recorded on the storage medium 152 of the recorder/player 151, the process is ended without performing steps S298 and S299.

On the other hand, if it is determined in step S297 that a video signal of the image of users viewing the program being played back in step S295 is recorded on the storage medium 152 of the recorder/player 151, the process proceeds to step S298. In step S298, under the control of the controller 31, the video signal of the image of users viewing the program being played back in step S295 is reproduced from the storage medium 152 of the recorder/player 151. That is, under the control of the controller 31, the recorder/player 151 starts to reproduce from the storage medium 152 the video signal of the image of the users viewing the program who were present in their rooms when the program being played back in step S295 was actually broadcast and who watched that program. The reproduced video signal is output (supplied) to the projector 122 installed in the room in which the user's presence was detected in step S292 and who likes the genre of the program being reproduced in step S295.

The process then proceeds to step S299 from step S298. In step S299, the projector 122 starts to project, onto a wall of the room, the image of the users viewing the program in accordance with the video signal supplied from the recorder/player 151. When the end of the video data and the audio data of the program being played back is reached, the process is ended.

Thus, in the program playback process described above with reference to FIG. 27, when a user returns to his/her room, a determination is made as to which one of the users A to E has returned, and a program whose genre matches the preference of the user and which was broadcast when the user was absent from his/her room is presented to the user.

When a program is detected by the tuner 11 and recorded on the storage medium 152, if some user is watching the program, the image of the user watching the program is also recorded on the storage medium 152, and the image of the user watching the program is projected onto a wall of a room of another user when the latter user returns to his/her room and watches the program of his/her favorite genre played back from the storage medium 152. Thus, when a user watches a program played back from the storage medium 152, the user can also feel as if he/she is enjoying watching the program together with other users.

Thus, digital broadcast programs received by the receiving apparatus 1 shown in FIG. 22 are automatically presented to users depending on the contents of the broadcast programs, and the users can enjoy the presented programs of the users' favorite genres without having to perform any operations.

Figure 28:
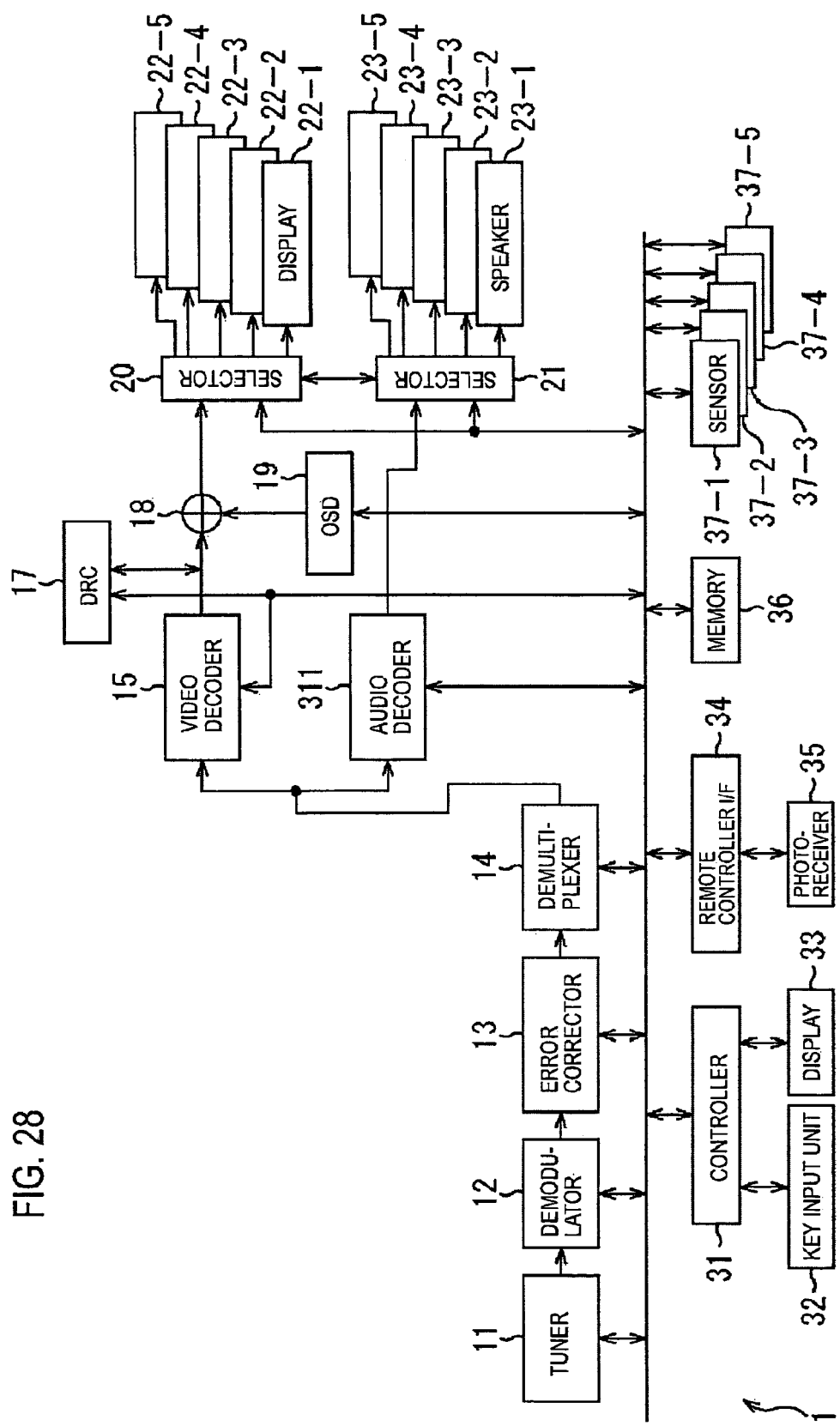
FIG. 28 is a block diagram showing a receiving apparatus according to a seventh embodiment of the present invention.

FIG. 28 is a diagram showing functional blocks of a receiving apparatus 1 according to a seventh embodiment, installed in a building of the house system shown in FIG. 1. In FIG. 28, similar parts to those of the first embodiment shown in FIG. 2 are denoted by similar reference numerals, and their further explanation is omitted herein.

The receiving apparatus 1 shown in FIG. 28 is similar to that according to the first embodiment described earlier with reference to FIG. 2, except that the audio decoder 16 shown in FIG. 2 is replaced with an audio decoder 311.

The audio decoder 311 performs MPEG-2 decoding on audio data of a program detected by the tuner 11 and supplied via the demultiplexer 14, and outputs the resultant MPEG-2 decoded data to the selector 21. The audio decoder 311 determines whether any particular word such as "earthquake", "fire", "thief", "typhoon", etc. (hereinafter, such a particular word will be referred to as a keyword) is included in the audio data of the program detected by the tuner 11 and supplied via the demultiplexer 14. The detection of keywords may be accomplished, for example, by means of a keyword spotting technique using a speech recognition process. When a keyword (audio data of a keyword) is detected, the audio decoder 311 outputs a keyword detection signal to the controller 31 to inform that the keyword has been detected.

In response to receiving the keyword detection signal from the audio decoder 311, the controller 31 determines, using the sensors 37, whether a user is present in each room.

On the basis of detection signals which are returned from the sensors 37 when the sensors detect the presence of a user in a room, the controller 31 controls the selectors 20 and 21 to select the displays 22 and speakers 23 disposed in rooms in which a user is present.

In the receiving apparatus 1, as described above, audio data of each program detected by the tuner 11 is examined to determine whether any keyword (audio data of any keyword) is included in the audio data of the program. If a keyword is detected, rooms in which a user is present are detected, and the program detected by the tuner 11 is output to all detected rooms.

Figure 29:
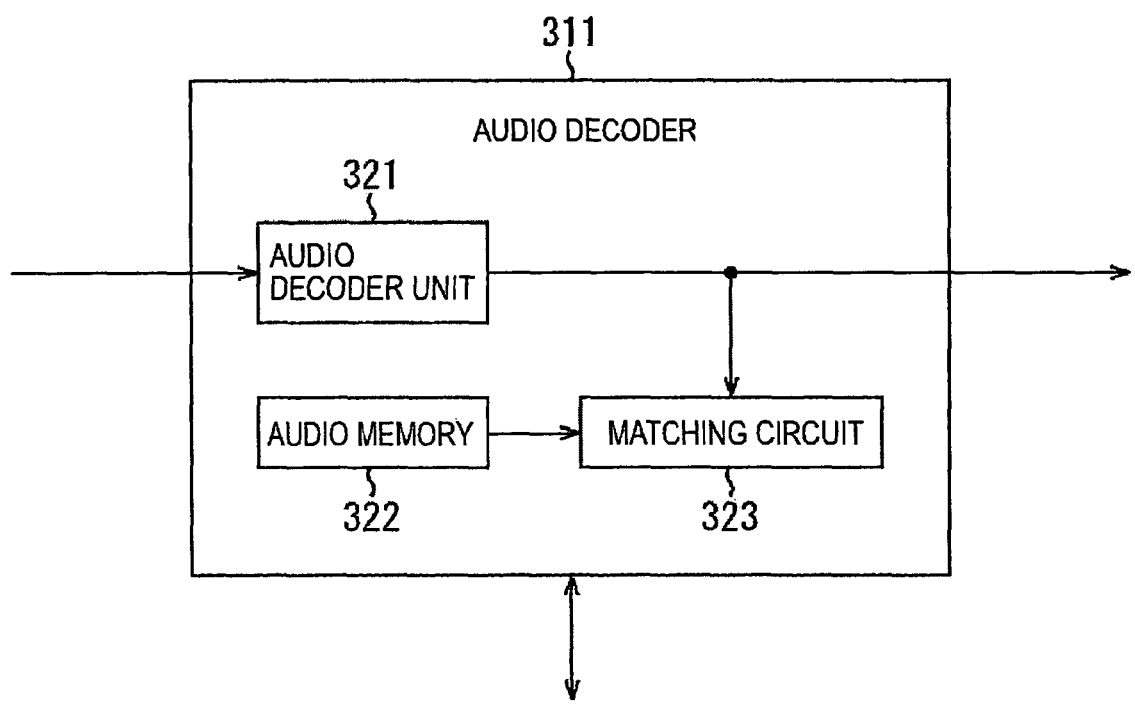
FIG. 29 is a block diagram showing an example of the structure of an audio decoder shown in FIG. 28.

FIG. 29 is a block diagram showing an example of the structure of the audio decoder 311 shown in FIG. 28. The audio decoder 311 includes an audio decoding unit 321, an audio memory 322, and a matching circuit 323.

The audio decoding unit 321 performs MPEG-2 decoding on the audio data of a program detected by the tuner 11 and supplied via the demultiplexer 14, and outputs the resultant MPEG-2 decoded data to the selector 21 and the matching circuit 323.

The matching circuit 323 reads audio data of keywords (reference patterns of audio data of keywords) stored in the audio memory 322, and determines whether the MPEG-2 decoded audio data output from the audio decoding unit 321 includes a part that matches the audio data of the keywords. The matching process may be accomplished, for example, by means of a speech recognition technique based on the continuous HMM (Hidden Markov Model).

If it is determined that the MPEG-2 decoded audio data output from the audio decoding unit 321 includes a part that matches the audio data of keywords stored in the audio memory 322, that is, if a voice of the program includes any keyword, the matching circuit 323 outputs a keyword detection signal to the controller 31 to inform that a keyword (audio data of the keyword) has been detected.

The audio memory 322 stores audio data of keywords, such as "earthquake", "fire", "thief", "typhoon", etc., indicating the occurrence of an emergency that should be immediately informed to users. The audio memory 322 supplies the audio data of the keywords stored therein to the matching circuit 323 as required. Note that a keyword specified by a user may be registered in the audio memory 322, if necessary.

Now, a process of handling an emergency broadcast (first emergency broadcast handling process) performed by the receiving apparatus 1 shown in FIG. 28 is described below with reference to the flow chart shown in FIG. 30. Note that this process is continued as long as the power of the receiving apparatus 1 is in the on-state.

In step S311, a transport stream of a program detected by the tuner 11 is supplied to the demultiplexer 14 via the demodulator 12 and the error correction unit 13. The demultiplexer 14 demultiplexes the TS packets in the form of the transport stream into video data and audio data and supplies the resultant video data and audio data to the video decoder 15 and the audio decoder 311, respectively. In a case in which a plurality of programs of different genres are detected that match the preference of users in terms of program genres, a program of the genre having a higher priority is selected based on the data indicating the priorities of genres stored in the memory 36 in a manner similar to the program output process described above.

The video decoder 15 performs MPEG decoding on the video data of the TS packets received from the demultiplexer 14, and supplies the resultant data to the DRC unit 17.

The audio decoding unit 321 of the audio decoder 311 (FIG. 29) performs MPEG decoding on the audio data of the TS packets received from the demultiplexer 14, and supplies the resultant MPEG-decoded data to the selector 21 and the matching circuit 323. The process then proceeds to step S312.

In step S312, the matching circuit 323 (FIG. 29) performs the matching process to detect a keyword. More specifically, the matching circuit 323 reads the audio data of the keywords from the audio memory 322, and determines whether the MPEG-2 decoded audio data output from the audio decoding unit 321 includes a part that matches the audio data of the keywords.

If it is determined in step S312 that no keywords are detected, that is, the audio data supplied from the audio decoding unit 321 includes no keywords, the process returns to step S311, and steps S311 and S312 are repeated.

On the other hand, if it is determined in step S312 that a keyword has been detected, that is, if the audio data supplied from the audio decoding unit 321 includes a keyword, the matching circuit 323 outputs a keyword detection signal to the controller 31 to inform that the keyword has been detected. The process then proceeds to step S313.

In step S313, the controller 31 determines, using the sensors 37, whether a user is present in each room. Under the control of the controller 31, the sensors 37 detect the rooms in which a user is present. If the sensor 37 detects a room in which a user is present, the sensor 37 sends to the controller 31 a detection signal indicating that the user is detected in the room. The process then proceeds to step S314.

In step S314, under the control of the controller 31, the selectors 20 and 21 select the displays 22 and speakers 23 in the rooms in which users are detected to be present. The selector 20 supplies the video data supplied from the mixer 18 to the displays 22 selected under the control of the controller 31. The program detected as including the keyword is converted into a high-quality image and displayed on each display 22 selected by the selector 20.

The selector 21 supplies the audio data supplied from the audio decoder 311 (audio decoding unit 321 of the audio decoder 311) to the speakers 23 selected under the control of the controller 31. Thus, the voice/sound of the program detected as including the keyword is output from each speaker 23 selected by the selector 21.

Figure 30:
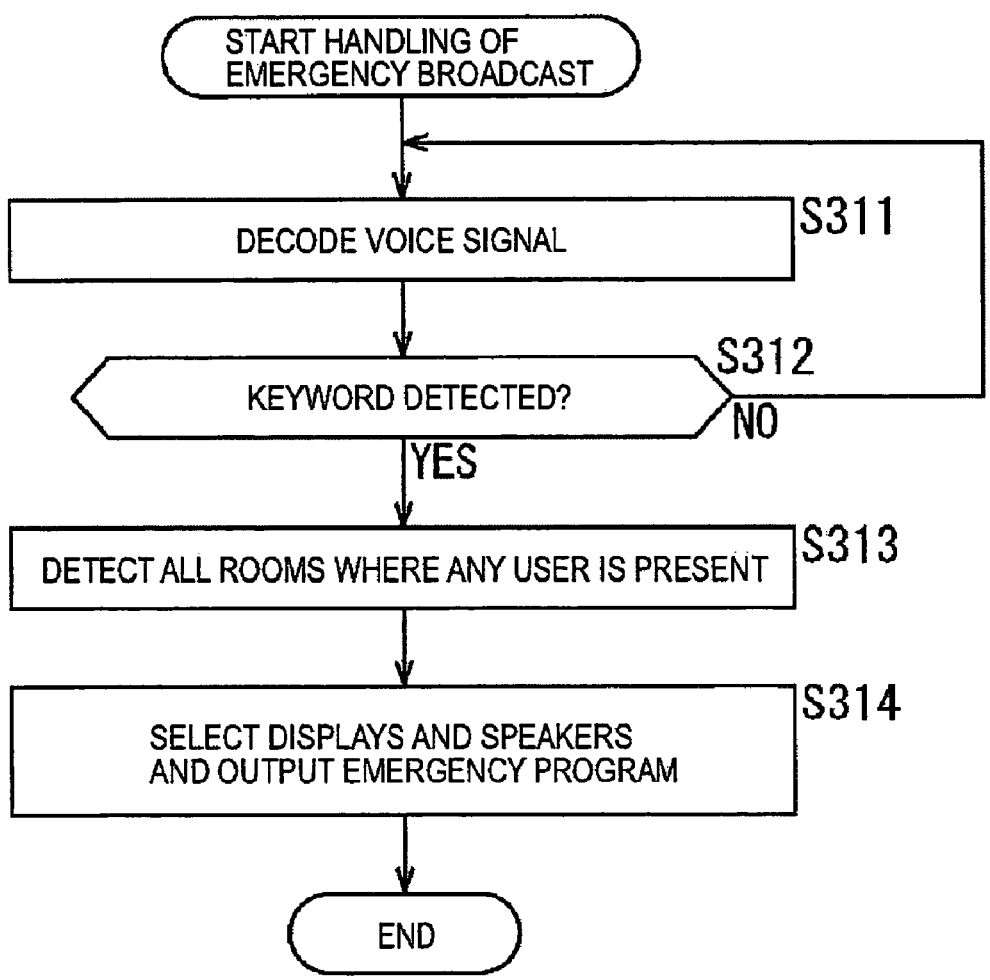
FIG. 30 is a flow chart showing a first process of handling an emergency broadcast.

In the emergency broadcast handling process shown in FIG. 30, as described above, the program detected by the tuner 11 is examined as to whether the program includes any keyword that should be immediately notified to users. If the program includes such a keyword, the program is output (broadcast) in all rooms where a user is present. This allows users to immediately know the occurrence of an emergency such as "earthquake", "fire", "thief", "typhoon", etc. when such an emergency occurs.

Thus, digital broadcast programs received by the receiving apparatus 1 are automatically presented to users depending on the contents of the broadcast programs, and thus users can view a program including important information about an emergency without having to perform any operations.

Figure 31:
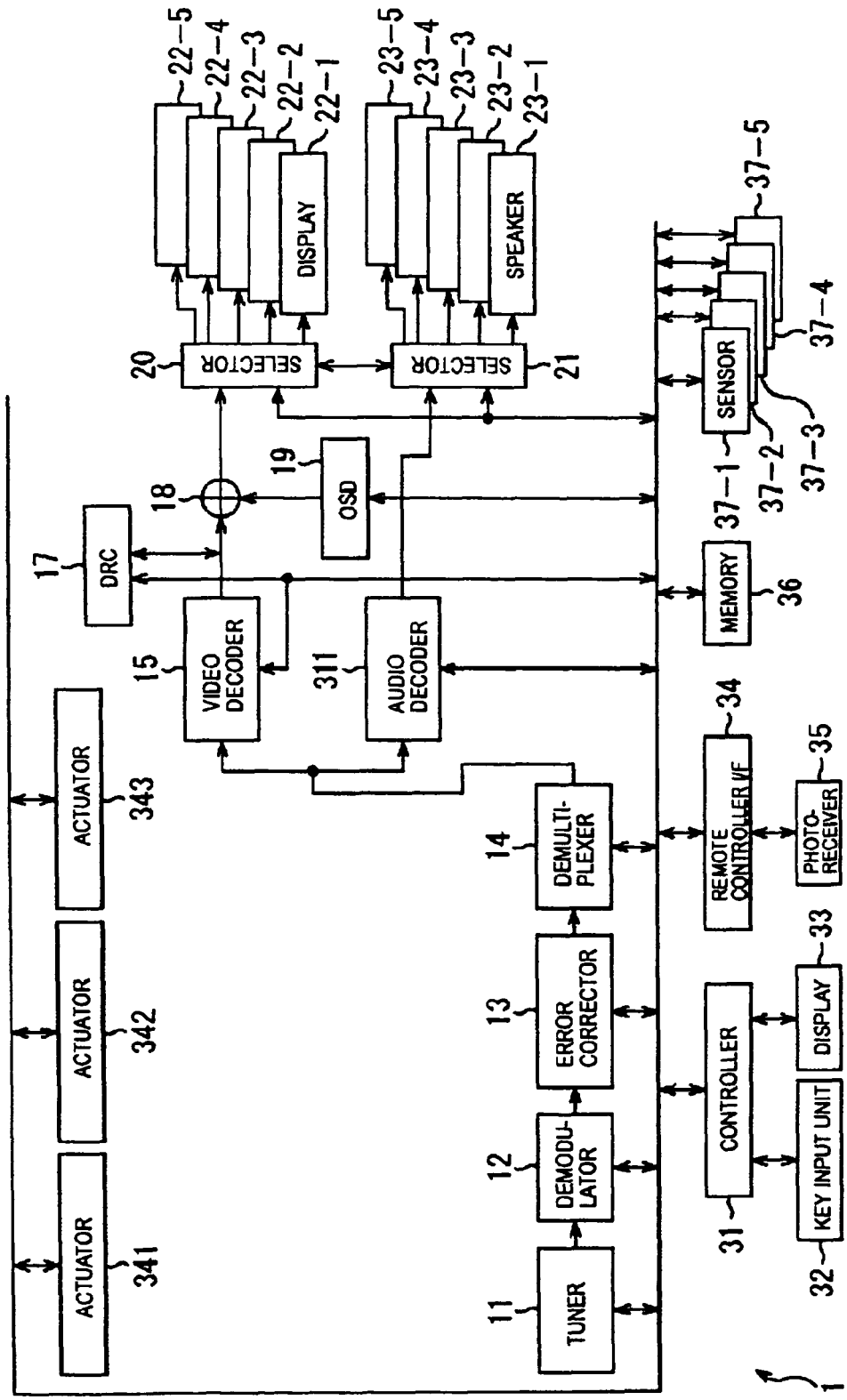
FIG. 31 is a block diagram showing a receiving apparatus according to an eighth embodiment of the present invention.

FIG. 31 is a diagram showing functional blocks of a receiving apparatus 1 according to an eighth embodiment, installed in a building of the house system shown in FIG. 1. In FIG. 31, similar parts to those of the seventh embodiment shown in FIG. 28 are denoted by similar reference numerals, and their further explanation is omitted herein.

The receiving apparatus 1 shown in FIG. 31 is similar to the receiving apparatus according to the seventh embodiment described above with reference to FIG. 28, except that the receiving apparatus 1 shown in FIG. 31 additionally includes actuators 341 to 343.

The actuator 341 controls the main valve of gas lines in a building in the house system shown in FIG. 1. The actuator 342 controls the lock of a window of the building in the house system shown in FIG. 1. The actuator 343 controls a shutter of the building in the house system shown in FIG. 1. The controller 31 controls the actuators 341 to 343 in accordance with the keyword detection signal supplied from the audio decoder 311.

For example, when the controller 31 receives from the audio decoder 311 a keyword detection signal indicating the detection of the keyword "earthquake", the controller 31 controls the actuator 341 to close the main valve of the gas lines in the building in the house system shown in FIG. 1.

In a case in which the controller 31 receives from the audio decoder 311 a keyword detection signal indicating the detection of the keyword "thief", the controller 31 controls the actuator 342 to close the lock of the window of the building in the house system shown in FIG. 1. On the other hand, when the controller 31 receives from the audio decoder 311 a keyword detection signal indicating the detection of the keyword "typhoon", the controller 31 controls the actuator 343 to close the shutter of the building in the house system shown in FIG. 1.

In this receiving apparatus 1 as described above, when audio data including a keyword is detected by the audio decoder 311, the facilities of the building in the house system shown in FIG. 1 are controlled depending on the detected keyword.

In the receiving apparatus 1 shown in FIG. 31, as in the receiving apparatus according to the seventh embodiment described above with reference to FIG. 28, the audio data of a program detected by the tuner 11 is examined to determine whether any keyword is included. If a keyword is detected, then rooms in which a user is present are detected and the program detected by the tuner 11 is output to all detected rooms in which a user is present.

Now, a process of handling an emergency broadcast (second emergency broadcast handling process) performed by the receiving apparatus 1 shown in FIG. 31 is described below with reference to the flow chart shown in FIG. 32.

Figure 32:
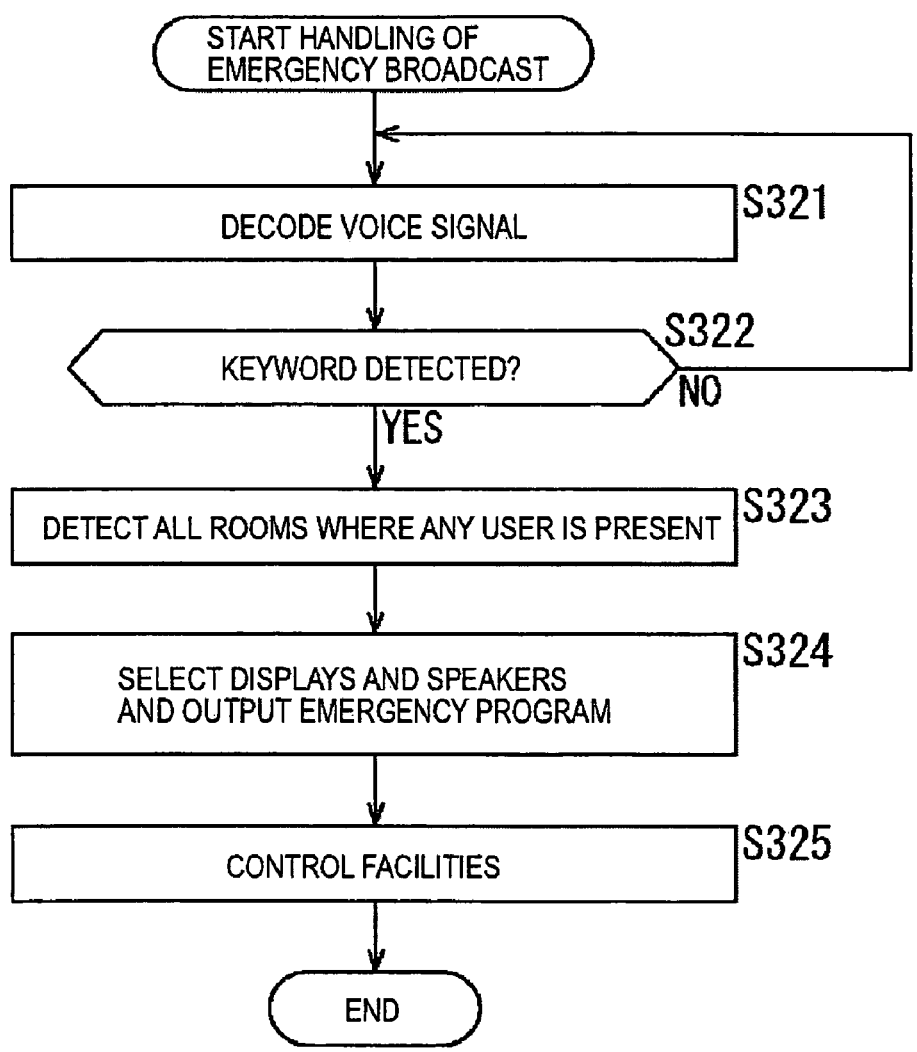
FIG. 32 is a flow chart showing a second process of handling an emergency broadcast.

Steps S321 to S324 in FIG. 32 are similar to the respective steps S311 and S314 in FIG. 30 described above, and thus a duplicated description thereof is not given herein.

In step S325 after step S324, the controller 31 controls the facilities in the building in accordance with the keyword detection signal supplied from the audio decoder 311. In a case in which the controller 31 receives from the audio decoder 311 a keyword detection signal indicating the detection of the keyword "thief", the controller 31 controls the actuator 342 to close the lock of the window (door) of the building in the house system shown in FIG. 1.

In the emergency broadcast handling process shown in FIG. 32, as described above, the program detected by the tuner 11 is examined as to whether the program includes any keyword that should be immediately notified to users. If the program includes such a keyword, the program is output (broadcast) in all rooms where a user is present. This allows users to immediately know the occurrence of an emergency such as "earthquake", "fire", "thief", "typhoon", etc. when such an emergency occurs.

In the emergency broadcast handling process shown in FIG. 32, as described above, the facilities of the building in the house system shown in FIG. 1 are controlled depending on which keyword is detected.

Thus, digital broadcast programs received by the receiving apparatus 1 are automatically presented to users depending on the contents of the broadcast programs, and thus the users can view a program including important information about an emergency without having to perform any operations.

Furthermore, the facilities in the building of the house system are controlled depending on the contents of the digital broadcast program received by the receiving apparatus 1.

Although in the receiving apparatus 1 shown in FIG. 31, the facilities controlled by the controller 31 in accordance with the keyword detection signal are the main valve of the gas line, the lock of the window (door), and the shutter of the building in the house system shown in FIG. 1, the facilities controlled by the controller 31 in accordance with the keyword detection signal are not limited to those, and the number of facilities to be controlled is not limited to three. Many other facilities can also be controlled.

In the first to eighth embodiments described above, broadcast signals detected by the tuner are digital broadcast signals. However, the broadcast signals are not limited to digital broadcast signals, but the present invention may also be applied to analog broadcast signals. The broadcast media are not limited to ground-based broadcasts, satellite broadcasts, CATV (Cable Television), and similar broadcast media.

In the first to eighth embodiments described above, the displays 22-1 to 22-5 and the speakers 23-1 and 23-5 are integrated in the receiving apparatus 1. Alternatively or additionally, the receiving apparatus 1 may be connected with other displays and speakers.

Although only one tuner is used in the first to eighth embodiments described above, a plurality of tuners may be used to receive a plurality of programs of different genres.

The receiving apparatus 1 may be used as the receiving apparatus of a television set.

According to the present invention, as described above with reference to specific embodiments, a user can view broadcast programs in convenient manners depending on the features of the building and depending on the contents of the broadcast programs received by the receiving apparatus installed in the building.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A receiving apparatus for receiving a broadcast program signal, the receiving apparatus comprising:
    a storage unit operable to store user preference information indicating preferences of each one of a plurality of users in terms of one or more genres of broadcast programs;
    a channel selection unit operable to select a particular channel from among a plurality of channels based on the user preference information stored in the storage unit;
    a detection unit operable to detect in which room, of a plurality of rooms, a user is present who likes the genre of a program of the selected channel;

a display selection unit operable select, from among a plurality of program display units disposed respectively in a plurality of rooms, a program display unit disposed in the room of the detected user, and to display the program of the selected channel on the selected program display unit; and an other-user-image display unit operable to project, onto at least one of a wall, a floor, or a ceiling in the room of the detected user, an image of at least one other user who likes the genre of the program of the selected channel and who is viewing the program of the selected channel on another one of the plurality of program display units in a room other than the room of the detected user in a manner that enables the detected user to experience viewing the program as if the detected user and the at least one other user are viewing the program of the selected channel in one room.

2. A receiving apparatus according to claim 1, further comprising an other-user-image taking unit operable to take the image of the at least one other user viewing the program.

3. A receiving apparatus according to claim 1, wherein the other-user-image display unit includes an image modification unit operable to modify the image of the at least one other user viewing the program.

4. A receiving apparatus according to claim 1, further comprising an other-user-image display control unit operable to control whether to display, in the room other than the room of the at least one other user, the image of the at least one other user viewing the program.

5. A receiving apparatus according to claim 1, further comprising a video signal conversion unit operable to convert a video signal of the program of the selected channel into a high-quality video signal.

6. A receiving apparatus according to claim 5, wherein the video signal conversion unit includes:
a classification unit operable to classify the video signal of the program of the selected channel according to one of a plurality of classes and to output a class code corresponding to that class,
a coefficient storage unit operable to store prediction coefficients learned for each class code associated with each genre, and
a calculation unit operable to generate the high-quality video signal based on prediction coefficients corresponding to a genre associated with the class code outputted by the classification unit and based on the video signal of the program of the selected channel.

7. A receiving apparatus according to claim 1, wherein the storage unit stores, as the user preference information, favorite genres of the plurality of users and priorities assigned to respective ones of the favorite genres, and when a plurality of programs whose genre matches the user preference are detected at the same time, the channel selection unit selects a channel of a program of a genre assigned a highest priority from among the genres of the detected plurality of programs.

8. A receiving apparatus according to claim 1, further comprising a driving unit operable to drive a wall such that when the detection unit detects that a plurality of users who like the program of the selected channel are present in their rooms, if the room of one of the plurality of users is located adjacent to the room of another one of the plurality of users, the driving unit drives a wall which is between the adjacent rooms.

9. A receiving apparatus according to claim 8, further comprising a driving control unit operable to turn the driving unit on and off.

10. A receiving apparatus according to claim 1, further comprising a recording unit operable to record a video signal and/or an audio signal on a storage medium, wherein when the detection unit detects that no users who like the program of the selected channel are present in their rooms, the recording unit records the video signal and/or the audio signal of the program of the selected channel on the storage medium.

11. A receiving apparatus according to claim 10, further comprising a reproducing unit operable to reproduce the video signal and/or the audio signal recorded on the storage medium, wherein when the detection unit detects that the user is present in the room of the detected user, the display selection unit selects the program display unit disposed in the room of the detected user and displays the video signal and/or the audio signal of the program of the selected channel that is reproduced by the reproducing unit.

12. A receiving apparatus according to claim 10, further comprising a video signal conversion unit operable to convert the video signal of the program of the selected channel into a high-quality video signal, wherein the recording unit records the high-quality video signal output by the video signal conversion unit on the storage medium.

13. A receiving apparatus according to claim 12, wherein the video signal conversion unit includes:
a classification unit operable to classify the video signal of the program of the selected channel according to one of a plurality of classes and to output a class code corresponding to that class,
a coefficient storage unit operable to store prediction coefficients learned for each class code associated with each genre, and
a calculation unit operable to generate the high-quality video signal based on prediction coefficients corresponding to a genre associated with the class code outputted by the classification unit and based on the video signal of the program of the selected channel.

14. A receiving apparatus according to claim 1, further comprising a first recording unit and a second recording unit operable to record a video signal and/or an audio signal on a storage medium, wherein when the program of the selected channel is of a genre that matches the preference of a plurality of users, if the detection unit detects that at least one of the plurality of users is not present in a room of the at least one user, then the first recording unit records a video signal and/or an audio signal of the program of the selected channel on a first storage medium and the second recording unit records an image of the detected user who is viewing the program on a second storage medium.

15. A receiving apparatus according to claim 14, further comprising a video signal conversion unit operable to convert a video signal into a high-quality video signal, wherein when the detection unit detects that the user is present in the room of the detected user, the video signal conversion unit converts a video signal of the image of the detected user who is viewing the program into the high-quality video signal and the second recording unit records the high-quality video signal output by the video signal conversion unit on the second storage medium.

16. A receiving apparatus according to claim 14, further comprising a first reproducing unit and a second reproducing unit operable to reproduce a video signal and/or an audio signal recorded on a storage medium, wherein if the detection unit detects that the at least one user has returned to the room of the at least one user, then the first reproducing unit reproduces the video signal and/or the audio signal of the program of the selected channel from the first storage medium, the second reproducing unit reproduces a video signal of the image of the detected user who is viewing the program from the second storage medium, the display selection unit makes a selection such that the program of the selected channel reproduced by the first reproducing unit is displayed on a program display unit disposed in the room of the at least one user, and the other-user-image display unit displays the image of the detected user who is viewing the program, reproduced by the second reproducing unit, such that the image is displayed in a room other than the room of the detected user.

17. A receiving apparatus according to claim 16, further comprising a video signal conversion unit operable to convert a video signal into a high-quality video signal, wherein the video signal conversion unit converts the video signal of the program of the selected channel reproduced by the first reproducing unit into a high-quality video signal.

18. A receiving apparatus according to claim 16, further comprising a video signal conversion unit operable to convert a video signal into a high-quality video signal, wherein the video signal conversion unit converts the video signal of the image of the detected user who is viewing the program, reproduced by the second reproducing unit, into a high quality video signal.

19. A receiving apparatus according to claim 16, wherein if the detection unit detects that the at least one user has returned to the room of the at least one user, then after an elapse of a predetermined period of time since the detection of the return of the at least one user, the first reproducing unit reproduces the video signal and/or the audio signal of the program of the selected channel from the first storage medium, the second reproducing unit reproduces a video signal of the image of the detected user who is viewing the program from the second storage medium, the display selection unit makes a selection such that the program of the selected channel reproduced by the first reproducing unit is displayed on a program display unit disposed in the room of the at least one user, and the other-user-image display unit displays the image of the detected user who is viewing the program, reproduced by the second reproducing unit, such that the image is displayed in a room other than the room of the detected user.

20. A receiving apparatus according to claim 1, wherein the storage unit further stores identification information identifying each user, and the detection unit identifies the plurality of users on the basis of the identification information.

21. A method of receiving a broadcast program signal, the method comprising:
  selecting a particular channel from among a plurality of channels based on stored user preference information indicating a preference of a plurality of users in terms of one or more program genres;
  detecting in which room, of a plurality of rooms, a user is present who likes the genre of a program of the selected channel;
  selecting, from among a plurality of program display units disposed respectively in a plurality of spaces, a program display unit disposed in the space of the detected user, and displaying the program of the selected channel on the selected program display unit; and
  projecting, onto at least one of a wall, a floor, or a ceiling in the room of the detected user, an image of at least one other user who likes the genre of the program of the selected channel and who is viewing the program of the selected channel on another one of the plurality of program display units in a room other than the room of the detected user in a manner that enables the detected user to experience viewing the program as if the detected user and the at least one other user are viewing the program of the selected channel in one room.

22. A storage medium recorded with a computer-readable program for carrying out a method of receiving a broadcast program signal, the method comprising:
  selecting a particular channel from among a plurality of channels based on stored user preference information indicating a preference of a plurality of users in terms of one or more program genres;
  detecting in which room, of a plurality of rooms, a user is present who likes the genre of a program of the selected channel;
  selecting, from among a plurality of program display units disposed respectively in a plurality of spaces, a program display unit disposed in the space of the detected user, and displaying the program of the selected channel on the selected program display unit; and
  projecting, onto at least one of a wall, a floor, or a ceiling in the room of the detected user, an image of at least one other user who likes the genre of the program of the selected channel and who is viewing the program of the selected channel on another one of the plurality of program display units in a room other than the room of the detected user in a manner that enables the detected user to experience viewing the program as if the detected user and the at least one other user are viewing the program of the selected channel in one room.

23. A system, comprising:
  a processor operable to execute instructions for carrying out a method of receiving a broadcast program signal, the method including:
    selecting a particular channel from among a plurality of channels based on stored user preference information indicating a preference of a plurality of users in terms of one or more program genres,
    detecting in which room, of a plurality of rooms, a user is present who likes the genre of a program of the selected channel,
    selecting, from among a plurality of program display units disposed respectively in a plurality of spaces, a program display unit disposed in the space of the detected user, and displaying the program of the selected channel on the selected program display unit, and
    projecting, onto at least one of a wall, a floor, or a ceiling in the room of the detected user, an image of at least one other user who likes the genre of the program of the selected channel and who is viewing the program of the selected channel on another one of the plurality of program display units in a room other than the room of the detected user in a manner that enables the detected user to experience viewing the program as if the detected user and the at least one other user are viewing the program of the selected channel in one room.

24. A receiving apparatus for receiving a broadcast program signal, the receiving apparatus comprising:
  storage means for storing user preference information indicating preferences of each one of a plurality of users in terms of one or more genres of broadcast programs;
  channel selection means for selecting a particular channel from among a plurality of channels based on the user preference information stored in the storage means;
  detection means for detecting in which room, of a plurality of rooms, a user is present who likes the genre of a program of the selected channel;
  display selection means for selecting, from among a plurality of program display means disposed respectively in a plurality of rooms, program display means disposed in the room of the detected user, and for displaying the program of the selected channel on the selected program display means; and other-user-image display unit means for projecting, onto at least one of a wall, a floor, or a ceiling in the room of the detected user, an image of at least one other user who likes the genre of the program of the selected channel and who is viewing the program of the selected channel on another one of the plurality of program display units in a room other than the room of the detected user in a manner that enables the detected user to experience viewing the program as if the detected user and the at least one other user are viewing the program of the selected channel in one room.

* * * * *